US012656100B2

(12) United States Patent
Kawata et al.

(10) Patent No.: US 12,656,100 B2
(45) Date of Patent: Jun. 16, 2026

(54) ADJUSTMENT METHOD FOR SHAPE MEASURING DEVICE

(71) Applicant: Tokyo Seimitsu Co., Ltd., Tokyo (JP)

(72) Inventors: Yoshiyuki Kawata, Tsuchiura-city (JP); Katsufumi Moriyama, Tsuchiura-city (JP); Hideki Morii, Tsuchiura-city (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 67 days.

(21) Appl. No.: 18/795,910

(22) Filed: Aug. 6, 2024

(65) Prior Publication Data

US 2024/0393098 A1 Nov. 28, 2024

Related U.S. Application Data

(63) Continuation of application No. PCT/JP2023/003195, filed on Feb. 1, 2023.

(30) Foreign Application Priority Data

Feb. 7, 2022 (JP) ................................ 2022-017251
Feb. 7, 2022 (JP) ................................ 2022-017252
Feb. 7, 2022 (JP) ................................ 2022-017253

(51) Int. Cl.
*G01B 9/02055* (2022.01)
*G01B 11/24* (2006.01)

(52) U.S. Cl.
CPC ...... *G01B 9/02072* (2013.04); *G01B 11/2441* (2013.01)

(58) Field of Classification Search
CPC ............ G01B 9/02072; G01B 11/2441; G01B 9/02055; G01B 9/04; G01B 11/24
See application file for complete search history.

(56) References Cited

U.S. PATENT DOCUMENTS 9,234,814 B1 * 1/2016 Novak ................... G01M 11/02
2010/0265516 A1 10/2010 De Groot et al.
2016/0123719 A1 5/2016 Novak et al.

FOREIGN PATENT DOCUMENTS

JP 2004-309789 A 11/2004
JP 2009-516171 A 4/2009
(Continued)

OTHER PUBLICATIONS

English translation of the International Preliminary Report on Patentability (Form PCT/IPEA/409) for International Application No. PCT/JP2023/003195, dated Jan. 30, 2024.
(Continued)

*Primary Examiner* — Kara E. Geisel
*Assistant Examiner* — Roberto Fabian, Jr.
(74) *Attorney, Agent, or Firm* — Birch, Stewart, Kolasch & Birch, LLP

(57) ABSTRACT

An adjustment method for a shape measuring device that radiates light from a light source to a master for adjustment and a reference surface respectively as measurement light and reference light and measures a shape of a surface to be measured of a measurement target using multiplexed light of the measurement light and the reference light respectively reflected by the master for adjustment and the reference surface, the adjustment method including; measuring the master for adjustment in an adjusted state in which a focus position matches an interference position and calculating and storing a matching degree parameter indicating a matching degree between the focus position and the interference position as an adjustment matching degree parameter; when the measurement target is measured, measuring the master for adjustment, calculating the matching degree parameter and comparing the matching degree parameter with the (Continued)

adjustment matching degree parameter, to confirm the matching degree.

19 Claims, 36 Drawing Sheets

(56)                       References Cited

FOREIGN PATENT DOCUMENTS

| JP | 2011-99787  | A |   | 5/2011 | |
|----|-------------|---|---|--------|---|
| JP | 2018048914  | A | * | 3/2018 | |
| JP | 2018115988  | A | * | 7/2018 | |
| JP | 2020154167  | A | * | 9/2020 | ........... G01B 21/045 |

OTHER PUBLICATIONS

English translation of the International Search Report (Form PCT/ISA/210) for International Application No. PCT/JP2023/003195, dated Apr. 4, 2023.
Japanese Office Action for Japanese Application No. 2022-017251, dated Aug. 6, 2025, with English translation.
Japanese Office Action for Japanese Application No. 2022-017252, dated Aug. 6, 2025, with English translation.

* cited by examiner

FIG.5

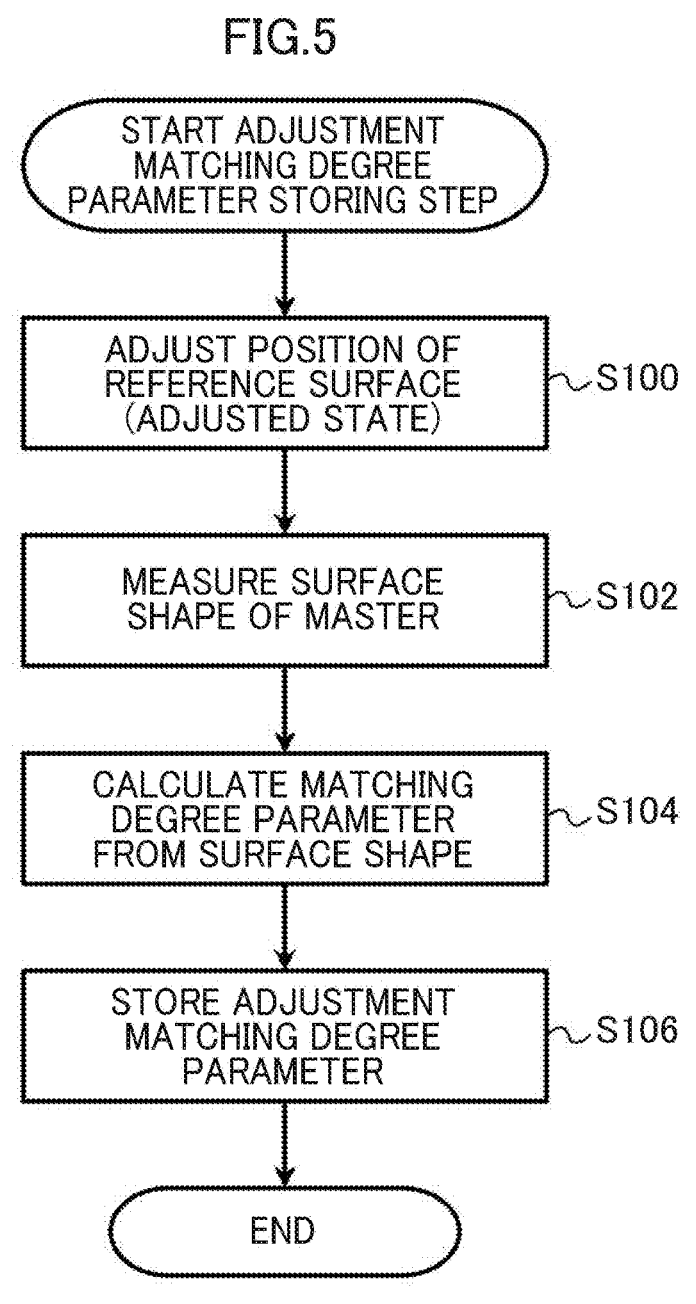

```
      ┌──────────────────────────┐
      │   START ADJUSTMENT       │
      │   MATCHING DEGREE        │
      │ PARAMETER STORING STEP   │
      └──────────────────────────┘
                  │
                  ▼
      ┌──────────────────────────┐
      │   ADJUST POSITION OF     │
      │   REFERENCE SURFACE      │ ～S100
      │    (ADJUSTED STATE)      │
      └──────────────────────────┘
                  │
                  ▼
      ┌──────────────────────────┐
      │    MEASURE SURFACE       │
      │    SHAPE OF MASTER       │ ～S102
      └──────────────────────────┘
                  │
                  ▼
      ┌──────────────────────────┐
      │   CALCULATE MATCHING     │
      │   DEGREE PARAMETER       │ ～S104
      │  FROM SURFACE SHAPE      │
      └──────────────────────────┘
                  │
                  ▼
      ┌──────────────────────────┐
      │    STORE ADJUSTMENT      │
      │   MATCHING DEGREE        │ ～S106
      │      PARAMETER           │
      └──────────────────────────┘
                  │
                  ▼
          ┌──────────────┐
          │     END      │
          └──────────────┘
```

FIG.25
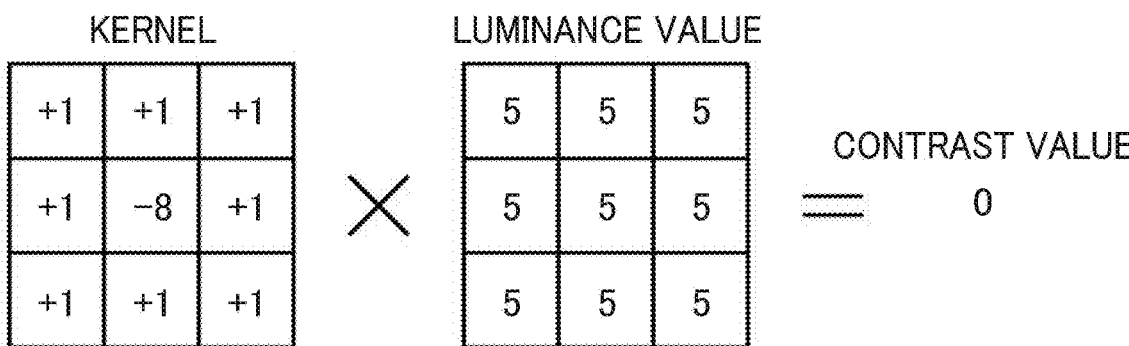
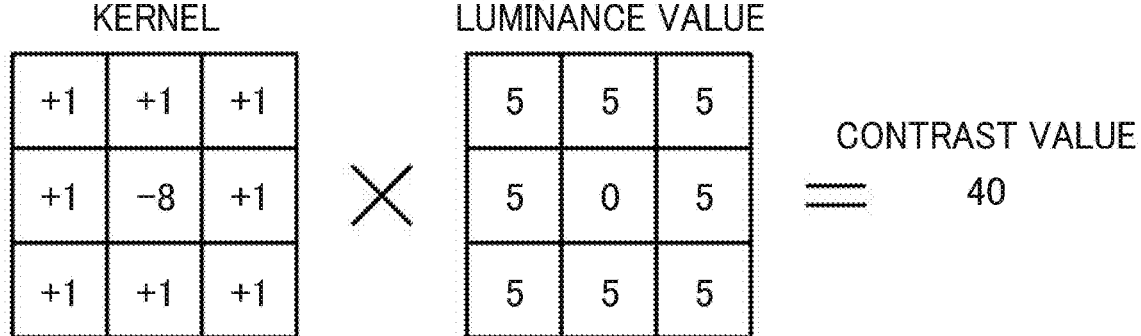

FIG.32
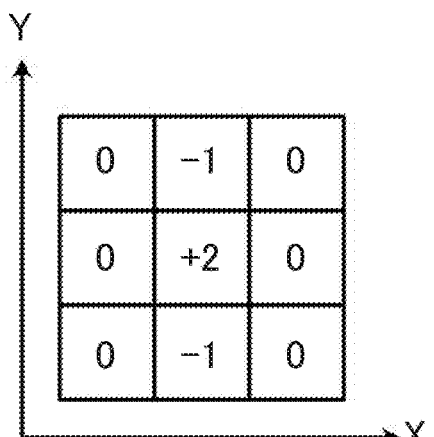
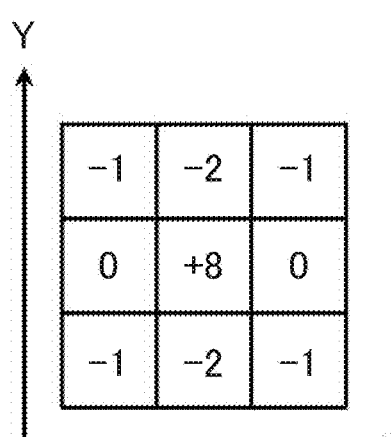

FIG.34

RELATED ART

F10

F12

RELATED ART

ADJUSTMENT METHOD FOR SHAPE MEASURING DEVICE

CROSS-REFERENCE TO RELATED APPLICATIONS

The present application is a Continuation of PCT International Application No. PCT/JP2023/003195 filed on Feb. 1, 2023 claiming priorities under 35 U.S.C § 119(a) of Japanese Patent Application Nos. 2022-017251, 2022-017252 and 2022-017253 filed on Feb. 7, 2022. Each of the above applications is hereby expressly incorporated by reference, in their entirety, into the present application.

BACKGROUND OF THE INVENTION

Field of the Invention

The present invention relates to an adjustment method for a shape measuring device, and particularly, to an adjustment method for a shape measuring device that measures a shape of a surface to be measured of a measurement target.

Description of the Related Art

As a device that measures a three-dimensional shape of a measurement target, a device using a scanning white light interferometry is known. The scanning white light interferometry measures a three-dimensional shape of a surface to be measured of a measurement target in a non-contact manner using a white light source as a light source by utilizing a Michelson-type or Mirau-type optical path interferometer.

Patent Literature 1 discloses a shape measuring device causes measurement light that is radiated on the surface to be measured of a measurement target from a light source via an objective lens and reflected by the surface to be measured, to interfere with reference light that is radiated on a reference surface from a light source via an objective lens and reflected by the reference surface, so as to measure a height of a surface to be measured in an optical axis direction.

CITATION LIST

Patent Literature 1: Japanese Patent Application Laid-Open No. 2011-099787

SUMMARY OF THE INVENTION

In a scanning white light interferometry (white light interferometry microscope) illustrated in FIGS. 35A and 35B, light L0 from a light source is split into measurement light L1$i$ and reference light L2$i$ by a beam splitter 24$b$ and respectively reflected by a surface to be measured Wa of a measurement target W and a reference surface 24$c$. Measurement light L1$r$ and reference light L2$r$ respectively reflected by the surface to be measured Wa and the reference surface 24$c$ are multiplexed on the same optical path by the beam splitter 24$b$ to be multiplexed light L3 (in the following description, the measurement light L1$i$, L1$r$ and the reference light L2$i$, L2$r$ may be sometimes collectively referred to as measurement light L1 and reference light L2). By obtaining contrast, change of a phase, or the like, of an interference pattern (interference fringes) obtained from the multiplexed light L3, a shape (such as, for example, a three-dimensional shape and a height) of the surface to be measured Wa of the measurement target W may be measured.

FIG. 35A illustrates an example where the measurement light L1$i$ collected by the objective lens 24$a$ focuses on the surface to be measured Wa of the measurement target W. In the following description, as illustrated in FIG. 35A, a position at which the measurement light L1$i$ focuses on the surface to be measured Wa (positional relationship between the objective lens 24$a$ and the measurement target W in a case where the measurement light L1$i$ focuses on the surface to be measured Wa) is referred to as a focus position. Note that in the example illustrated in FIG. 35A, an optical path length (measurement light path length) D1($a$) of the measurement light L1 differs from an optical path length (reference light path length) D2($a$) of the reference light L2 (D1($a$)+D2($a$)).

On the other hand, FIG. 35B illustrates an example where the measurement light path length D1($b$) is equal to the reference light path length D2($b$) (D1 ($b$)=D2($b$)). In this case, a phase of the measurement light L1$r$ matches a phase of the reference light L2$r$. In the following description, as illustrated in FIG. 35B, a position at which the measurement light path length D1 ($b$) is equal to the reference light path length D2($b$) (positional relationship among the objective lens 24$a$, the beam splitter 24$b$, the measurement target W and the reference surface 24$c$ in a case where the measurement light path length D1 ($b$) is equal to the reference light path length D2($b$)) is referred to as an interference position (interference fringe occurrence position). Note that in the example illustrated in FIG. 35B, the measurement light L1$i$ collected by the objective lens 24$a$ does not focus on the surface to be measured Wa of the measurement target W.

As illustrated in FIG. 35B, in a case where the measurement light L1$i$ does not focus on the surface to be measured Wa, a shape (measured shape F12 in FIG. 36) of the surface to be measured Wa obtained from the multiplexed light L3 collapses from an actual shape (actual shape F10 in FIG. 36). Further, light intensity of the multiplexed light L3 decreases, which may cause degradation of measurement accuracy due to decrease in sensitivity or which may make it impossible to perform measurement.

Thus, in the white light interferometry microscope as described above, adjustment is performed so that the focus position matches the reference position. Specifically, adjustment is performed so that the measurement light L1$i$ collected by the objective lens 24$a$ focuses on the surface to be measured Wa of the measurement target W, and the measurement light path length D1 becomes equal to the reference light path length D2.

In adjustment of the white light interferometry microscope as described above, an operator observes a planar substrate on which a pattern is printed and manually adjusts a position of each optical element while visually observing a focusing state. Then, the operator manually performs adjustment so that the focus position at which the objective lens 24$a$ focuses on the pattern matches the interference position and confirms the adjustment result.

To secure measurement accuracy of the white light interferometry microscope as described above, for example, it is preferable to frequently adjust the white light interferometry microscope and perform a confirmation work every time the measurement target W and a parts to be measured are changed. However, frequencies of adjustment of the white light interferometry microscope and implementation of the confirmation work depend on the operator, and thus, the measurement target W may be sometimes measured in a poor adjustment state in which adjustment is not sufficiently performed, which may cause a problem that low-reliable data with low accuracy is output.

The present invention has been made in view of such circumstances, and aims to provide an adjustment method for a shape measuring device capable of easily adjusting a white light interferometry microscope.

To achieve the above-described object, a first aspect of the present invention is an adjustment method for a shape measuring device that radiates light from a light source to a master for adjustment and a reference surface respectively as measurement light and reference light and measures a shape of a surface to be measured of a measurement target using multiplexed light of the measurement light and the reference light respectively reflected by the master for adjustment and the reference surface, the adjustment method including: a step of measuring the master for adjustment in an adjusted state in which a focus position matches an interference position, and calculating and storing a matching degree parameter indicating a matching degree between the focus position and the interference position as an adjustment matching degree parameter; and a step of, in a case where the measurement target is measured, measuring the master for adjustment, calculating the matching degree parameter and comparing the matching degree parameter with the adjustment matching degree parameter, to confirm the matching degree.

According to a second aspect, the adjustment method for a shape measuring device in the first aspect includes a step of making a notification of an abnormality in a case where the matching degree parameter is equal to or less than a threshold set based on the adjustment matching degree parameter.

According to a third aspect, the adjustment method for a shape measuring device in the first or the second aspect, includes a step of stopping the shape measuring device in a case where the matching degree parameter is equal to or less than a threshold set based on the adjustment matching degree parameter.

According to a fourth aspect, the adjustment method for a shape measuring device in any of the first to the third aspects, includes: a step of calculating the matching degree parameter based on a measurement result of the master for adjustment for each position of the reference surface; and a step of moving the reference surface to a position at which the matching degree parameter becomes maximum.

To achieve the above-described object, a fifth aspect of the present invention is an adjustment method for a shape measuring device that radiates light from a light source to a master for adjustment and a reference surface respectively as measurement light and reference light and measures a shape of a surface to be measured of a measurement target using multiplexed light of the measurement light and the reference light respectively reflected by the master for adjustment and the reference surface, the adjustment method including: a step of measuring the master for adjustment to calculate a roughness parameter; and a step of moving the refence surface to a position at which the roughness parameter becomes maximum.

According to a sixth aspect of the present invention, in the adjustment method for a shape measuring device in the fifth aspect, arithmetic mean roughness Ra or Sa is calculated as the roughness parameter.

According to a seventh aspect of the present invention, in the adjustment method for a shape measuring device in the fifth or the sixth aspect, a reference surface storing part that stores the reference surface is formed of a material that reversibly thermally deforms, and the reference surface is moved by controlling a temperature of the reference surface storing part.

According to an eighth aspect of the present invention, in the adjustment method for a shape measuring device in the fifth or the sixth aspect, the reference surface is moved by a linear motion mechanism.

According to a ninth aspect of the present invention, the adjustment method for a shape measuring device in any of the fifth to the eighth aspects, includes: a step of acquiring a relationship between the roughness parameter and a position of the reference surface; and a step of calculating the roughness parameter for each of one or more positions of the reference surface and calculating a position at which the roughness parameter becomes maximum based on the relationship between the roughness parameter and the position of the reference surface.

According to a tenth aspect of the present invention, in the adjustment method for a shape measuring device in any of the fifth to the ninth aspects, a master having a pattern in which an identical pattern is repeated in a range that covers a range of a field of view of an objective lens is used as the master for adjustment.

To achieve the above-described object, an eleventh aspect of the present invention is an adjustment method for a shape measuring device that radiates light from a light source to a master for adjustment and a reference surface respectively as measurement light and reference light and measures a shape of a surface to be measured of a measurement target using multiplexed light of the measurement light and the reference light respectively reflected by the master for adjustment and the reference surface, the adjustment method including: a step of acquiring an image of the master for adjustment for each of scanning positions along a scanning direction perpendicular to the master for adjustment and calculating a matching degree parameter indicating a matching degree between a focus position and an interference position from the image for each of the scanning positions; and a step of calculating a target set position of the reference surface based on the matching degree parameter.

According to a twelfth aspect of the present invention, in the adjustment method for a shape measuring device in the eleventh aspect, the matching degree parameter is calculated based on a first parameter that is a difference in luminance along a direction on a plane of pixels included in the image of the master for adjustment for each of the scanning positions, and a second parameter that is a difference in luminance along the scanning direction.

The adjustment method for a shape measuring device according to a thirteenth aspect of the present invention includes, in the eleventh or the twelfth aspect, a step of calculating the matching degree parameter for each position of the reference surface, and a step of calculating the target set position of the reference surface based on the matching degree parameter calculated for each position of the reference surface.

According to a fourteenth aspect of the present invention, in the adjustment method for a shape measuring device in the twelfth aspect, the target set position of the reference surface is set at a position of the reference surface moved by an amount corresponding to a difference between a peak value of the first parameter and a peak value of the second parameter, from a position of the reference surface at a time when the image used for calculation of the matching degree parameter is acquired.

According to the first to the fourth aspects of the present invention, the adjustment matching degree parameter is stored in advance, so that it is possible to easily adjust the white light interferometry microscope. According to the fifth to the tenth aspects of the present invention, the reference surface is moved to a position at which the roughness parameter becomes maximum, so that it is possible to easily adjust the shape measuring device so that the focus position of the shape measuring device matches the interference position. According to the eleventh to the fourteenth aspects of the present invention, the matching degree parameter is calculated from the image of the master for adjustment for each of the scanning positions, so that it is possible to easily adjust the shape measuring device.

BRIEF DESCRIPTION OF THE DRAWINGS

FIG. 5 is a flowchart showing an adjustment matching degree parameter storing step.

FIG. 6 is a flowchart showing a device using step.

FIG. 14 is a view illustrating a shape measuring device according to a modification of Example 2-2.

FIG. 15 is a graph showing a relationship between a roughness parameter and a position of a reference surface.

FIG. 20 is a view indicating an evaluation result of a focusing degree on a cross-section in each of X and Y directions in a case where the master illustrated in FIG. 19 is used.

FIG. 25 is a view illustrating a calculation example of the lateral contrast parameter.

FIG. 26 is a graph showing a relationship among the lateral contrast parameter, the longitudinal contrast parameter and a scanning position (Z position).

FIG. 27 is a graph showing a relationship between a matching degree parameter and a position of a reference surface.

FIG. 30 is a graph showing influence of the interference fringes on calculation of the lateral contrast parameter.

FIG. 32 is a view illustrating an example of a kernel according to Example 3-3.

FIG. 34 is a view illustrating a shape measuring device according to Modification 3-2.

DESCRIPTION OF EMBODIMENTS

Embodiments of an adjustment method for a shape measuring device according to the present invention will be described below in accordance with the accompanying drawings.

[Shape Measuring Device According to First Embodiment]

Figure 1:
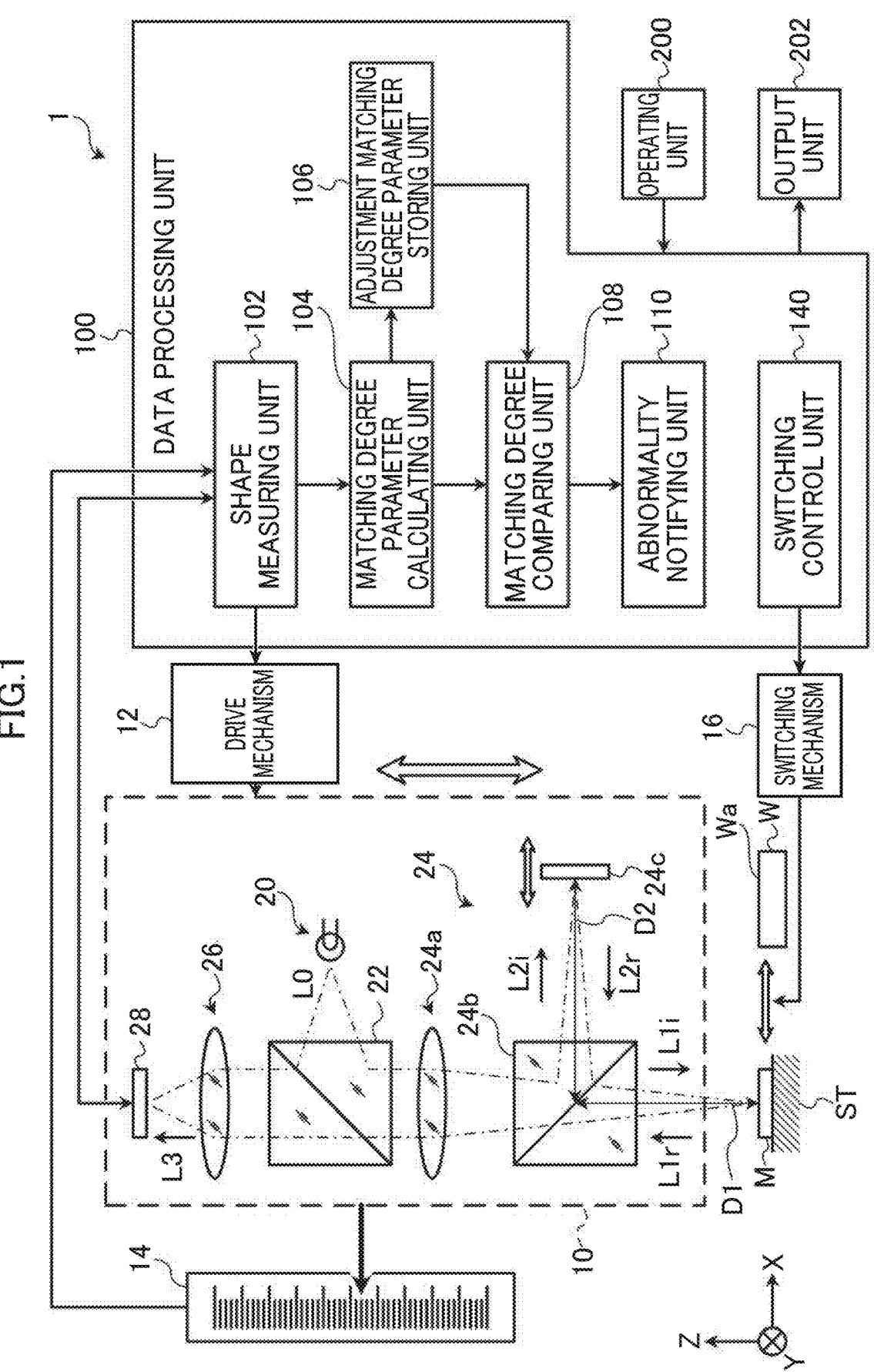
FIG. 1 is a view illustrating a shape measuring device according to a first embodiment of the present invention.

FIG. 1 is a view illustrating a shape measuring device according to a first embodiment of the present invention. Note that X and Y directions among X, Y and Z directions perpendicular to each other in the drawing are directions parallel to a horizontal direction, and the Z direction is a direction parallel to a vertical direction.

As illustrated in FIG. 1, a shape measuring device 1 includes a white light interferometry microscope 10, a drive mechanism 12, a scale 14, and a data processing unit 100.

The white light interferometry microscope 10 is a Michelson-type scanning white light interferometry microscope. The white light interferometry microscope 10 includes a light source unit 20, a beam splitter 22, an interference objective lens 24, an imaging lens 26 and a camera 28. The interference objective lens 24, the beam splitter 22, the imaging lens 26 and the camera 28 are arranged in this order from a surface to be measured Wa toward the upper side along the Z direction. Further, the light source unit 20 is arranged at a position facing the beam splitter 22 in the X direction (or may be the Y direction).

The light source unit 20 emits white light L0 (low-coherence light with low coherence) of a parallel light flux toward the beam splitter 22 under control of the data processing unit 100. While not illustrated, the light source unit 20 includes a light source capable of emitting the white light L0, such as a light-emitting diode, a semiconductor laser, a halogen lamp and a high-brightness discharge lamp, and a collector lens that converts the white light L0 emitted from the light source into a parallel light flux.

As the beam splitter 22, for example, a half mirror is used. The beam splitter 22 reflects part of the white light L0 incident from the light source unit 20 toward the interference objective lens 24 on a lower side in the Z direction as measurement light L1*i*. Further, the beam splitter 22 allows part of multiplexed light L3 (described later) which is incident from the interference objective lens 24 to pass therethrough toward the upper side in the Z direction, so as to emit the multiplexed light L3 toward the imaging lens 26.

The interference objective lens 24, which is a Michelson-type lens, includes an objective lens 24*a*, a beam splitter 24*b* and a reference surface 24*c*. The beam splitter 24*b* and the objective lens 24*a* are arranged in this order from the surface to be measured Wa, toward the upper side along the Z direction. The reference surface 24*c* is arranged at a position facing the beam splitter 24*b* in the X direction (or may be the Y direction). While description will be provided below using a Michelson-type interference optical system, the interference optical system is not limited to the Michelson type. Other publicly known interference optical systems such as a Mirau type and a Linic type may be employed.

The objective lens 24*a* has a focusing function and causes the measurement light L1 incident from the beam splitter 22 to focus on the surface to be measured Wa through the beam splitter 24*b*.

The beam splitter 24*b* corresponds to an interfering unit of the present invention. As the beam splitter 24*b*, for example, a half mirror is used. The beam splitter 24*b* splits part of the white light L0 incident from the objective lens 24*a* as reference light L2*i*, and reflects the reference light L2*i* toward the reference surface 24*c*. The beam splitter 24*b* allows the other part of the white light L0 as measurement light L1*i* to pass therethrough, so as to emit the measurement light L1*i* to the surface to be measured Wa. Note that a reference numeral D1 in the drawing designates a measurement light path length that is an optical path length of the measurement light L1 between the beam splitter 24*b* and the surface to be measured Wa. The measurement light L1*i* that has passed through the beam splitter 24*b* is radiated on the surface to be measured Wa, then reflected by the surface to be measured Wa and returns to the beam splitter 24*b*.

As the reference surface 24*c*, for example, a reflecting mirror is used, and the reference surface 24*c* reflects the reference light L2*i* incident from the beam splitter 24*b* toward the beam splitter 24*b*. A position of the reference surface 24*c* in the X direction may be manually adjusted using a position adjustment mechanism (not illustrated) (such as, for example, a ball screw mechanism and an actuator). This enables adjustment of a reference light path length D2 that is an optical path length of the reference light L2 between the beam splitter 24*b* and the reference surface 24*c*. The reference light path length D2 is adjusted so as to be equal (including roughly equal) to the measurement light path length D1.

The beam splitter 24*b* generates the multiplexed light L3 of the measurement light L1 returning from the surface to be measured Wa and the reference light L2 returning from on the upper side in the Z direction. The multiplexed light L3 passes through the objective lens 24*a* and the beam splitter 22, and is incident on the imaging lens 26.

The imaging lens 26 forms an image of the multiplexed light L3 incident from the beam splitter 22 on an imaging surface (not illustrated) of the camera 28. Specifically, the imaging lens 26 forms an image of a point on a focal plane of the objective lens 24*a* on the imaging surface of the camera 28 as an image point.

The camera 28 includes a charge coupled device (CCD)-type or a complementary metal oxide semiconductor (CMOS)-type imaging element (not illustrated). The camera 28 captures an image of the multiplexed light L3 formed on the imaging surface by the imaging lens 26, performs signal processing on an imaging signal of the multiplexed light L3 obtained by the imaging and outputs a captured image.

The drive mechanism 12 corresponds to a scanning unit of the present invention. The drive mechanism 12 includes a linear motor or a motor drive mechanism and holds the white light interferometry microscope 10 so as to be movable in the Z direction that is a scanning direction. The drive mechanism 12 causes the white light interferometry microscope 10 to scan along the Z direction under control of the data processing unit 100.

Note that the drive mechanism 12 is only required to be able to cause the white light interferometry microscope 10 to scan in the Z direction relatively with respect to the surface to be measured Wa. For example, the white light interferometry microscope 10 may be caused to scan the surface to be measured Wa (supporting part that supports the surface to be measured Wa) in the Z direction.

The scale 14 is a position detection sensor that detects a position of the white light interferometry microscope 10 in the Z direction. For example, a linear scale may be used as the scale 14. The scale 14 repeatedly detects the position of the white light interferometry microscope 10 in the Z direction and repeatedly outputs the position detection result to the data processing unit 100.

The data processing unit 100 controls operation of measuring a three-dimensional shape of the surface to be measured Wa by the white light interferometry microscope 10 (shape measuring device 1) and calculates, or the like, the three-dimensional shape of the surface to be measured Wa in accordance with input of operation from an operating unit 200. The data processing unit 100 includes a processor (such as, for example, a central processing unit (CPU), a graphics processing unit (GPU)) that executes various kinds of calculation, a memory (such as, for example, a read only memory (ROM) and a random access memory (RAM)) that becomes a work area of the processor), and a storage device (such as, for example, a solid state drive (SSD) and a hard disk drive (HDD)) for storing various kinds of programs and data.

The data processing unit 100 executes programs stored in the storage using the processor so as to implement various kinds of functions (a shape measuring unit 102, a matching degree parameter calculating unit 104, an adjustment matching degree parameter storing unit 106, a matching degree comparing unit 108, an abnormality notifying unit 110 and a switching control unit 140) which will be described later.

Note that the functions of the data processing unit 100 may be implemented by one processor or may be implemented by processors of the same type or different types. Further, the functions of the data processing unit 100 may be implemented by a general-purpose computer.

The operating unit 200 includes an operating member (such as, for example, a keyboard and a mouse) for accepting input of operation from the operator to the data processing unit 100.

An output unit 202 is a device for outputting execution results of the programs by the data processing unit 100, data of calculation results, and the like. The output unit 202 includes, for example, a monitor (such as, for example, a liquid crystal display) for displaying an operation user interface (UI) and detection results. Further, the output unit 202 may include a printer, a speaker, and the like, in addition to or in place of the monitor.

[Adjustment Procedure of Shape Measuring Device According to First Embodiment]

In the shape measuring device 1 according to the present embodiment, in a state where the focus position matches the interference position, that is, in a state where the measurement light L1*i* collected by the objective lens 24*a* focuses on the surface to be measured Wa of the measurement target W. Further, in a state where the measurement light path length D1 is equal to the reference light path length D2, the master M for adjustment (hereinafter, referred to as a "master M") is measured by the white light interferometry microscope 10.

Then, the data processing unit 100 calculates a matching degree parameter indicating a degree of match between the focus position and the interference position (matching degree parameter indicating a matching degree for causing the measurement light L1*i* to focus on the master M and for causing the measurement light L1*r* to interfere with the reference light L2*r*) using the measurement result of the master M. In the following description, the matching degree parameter calculated by measuring the master M in a state where the focus position matches the interference position is referred to as an adjustment matching degree parameter. The adjustment matching degree parameter is stored in the adjustment matching degree parameter storing unit 106 (an adjustment matching degree parameter storing step S10 which will be described later).

In the present embodiment, the shape measuring device 1 may refer to the adjustment matching degree parameter, when the shape measuring device 1 measures the measurement target W (a device using step S20 which will be described later). This makes it possible to evaluate a degree of match between the focus position and the interference position and adjust the shape measuring device 1 in a case where the matching degree becomes low.

(Measurement of Master M)

As illustrated in FIG. 1, the shape measuring device 1 according to the present embodiment includes a switching mechanism 16 which selectively inserts (moves) the master M and the measurement target W on an optical path of the measurement light L1*i*. In the shape measuring device 1, the switching mechanism 16 may perform switching between the master M and the measurement target W.

For example, as the switching mechanism 16, a mechanism for moving a stage ST on which the master M and the measurement target W are placed using an actuator, a motor, and the like, or, a robot arm for moving the master M and the measurement target W to the stage ST and the like, may be used.

The switching control unit 140 controls the switching mechanism 16 to perform switching between the master M and the measurement target W.

As the master M, for example, a flat material on which a predetermined pattern is formed on a surface may be used. As the pattern to be formed on the surface of the master M, for example, all or part of patterns to be used in various kinds of resolution charts, for example, a radial pattern (star chart), a checkered pattern, a grid chart, a United States Air Force MIL-STD-150A standard of 1951 (USAF 1951 target), a resolution chart complying with international organization for standardization (ISO) 12233 (a resolution chart of camera & imaging products association (CIPA)), and the like, may be used. Further, as the master M, a roughness scale (such as, for example, a pseudo roughness scale and a random shape roughness scale) may be also used.

The shape measuring unit 102 controls the drive mechanism 12 to cause the white light interferometry microscope 10 to scan along the Z direction. Then, the shape measuring unit 102 acquires a detection result of the position of the white light interferometry microscope 10 in the Z direction from the scale 14.

In the present embodiment, it is assumed that the position of the white light interferometry microscope 10 is adjusted in the Z direction by controlling the drive mechanism 12 and the position of the reference surface 24*c* is manually adjusted in the X direction, so that the focus position matches the interference position. Here, the state where the focus position matches the interference position refers to a state where the measurement light L1*i* collected by the objective lens 24*a* focuses on the pattern formed on the surface of the master M, and the measurement light path length D1 is equal to the reference light path length D2.

Then, the shape measuring unit 102 controls the light source unit 20 and the camera 28 in a state where the focus position matches the interference position and measures the pattern formed on the surface of the mater M.

Note that while in the present embodiment, the position of the reference surface 24*c* in the X direction is manually adjusted, the position of the reference surface 24*c* in the X direction may be able to be automatically adjusted by a position adjustment mechanism.

(Calculation of Adjustment Matching Degree Parameter)

The matching degree parameter calculating unit 104 calculates a matching degree parameter (adjustment matching degree parameter) indicating a degree of match between the focus position and the interference position using the measurement result of the master M. The adjustment matching degree parameter is stored in the adjustment matching degree parameter storing unit 106. Note that as the adjustment matching degree parameter storing unit 106, part of the storage of the data processing unit 100 may be used.

In adjustment of the shape measuring device 1, the matching degree parameter calculating unit 104 calculates the matching degree parameter by measuring the pattern formed on the surface of the master M in a state where the focus position matches the interference position. Then, the matching degree parameter calculated in a state where the focus position matches the interference position is set as the adjustment matching degree parameter and stored in the adjustment matching degree parameter storing unit 106 of the data processing unit 100.

Figure 2:
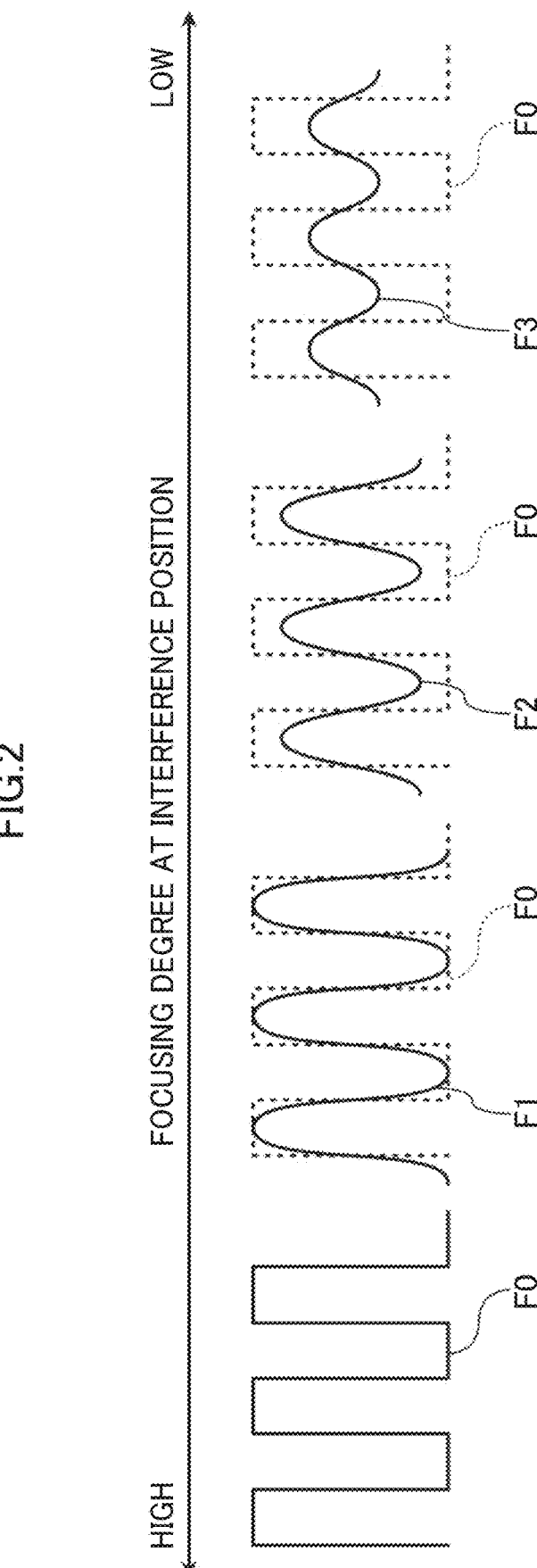
FIG. 2 is a view indicating a relationship between a focusing degree and a measured shape at an interference position.

FIG. 2 is a view indicating a relationship between a focusing degree and a measured shape at the interference position. In FIG. 2, an actual shape of the pattern is denoted as F0, and measured shapes are denoted as F1 to F3. As indicated in FIG. 2, at the interference position, as the focusing degree of the measurement light L1*i* with respect to the pattern decreases, the measured shapes F1 to F3 tend to collapse more largely. Considering characteristics of the measured shapes F1 to F3 with respect to the focusing degree, for example, the following examples may be utilized as the matching degree parameter indicating a degree of match between the focus position and the interference position.

(1) Contrast of Three-Dimensional Shape

Contrast of a three-dimensional shape is, for example, contrast of an image in a case where measured values of height of the pattern of the master M are converted into luminance and plotted.

As indicated in FIG. 2, as the focusing degree is higher, the measured shapes F1 to F3 of the pattern become closer to the actual shape F0, and as the focusing degree is lower, gaps of the measured shapes F1 to F3 from the actual shape F0 become greater. Thus, as the contrast of the three-dimensional shape is higher, the matching degree between the focus position and the interference position becomes higher, and as the contrast of the three-dimensional shape is lower, the matching degree between the focus position and the interference position becomes lower.

Thus, the focusing degree of the measurement light L1*i* may be easily and appropriately evaluated by using the contrast of the three-dimensional shape as the matching degree parameter.

(2) Curvature of Waveform

A curvature of a waveform is, for example, curvatures of waveforms of the measured shapes F1 to F3. As indicated in FIG. 2, as the focusing degree is higher, a curvature of a waveform of a measurement result of a rectangular pattern becomes smaller (closer to zero), and as the focusing degree is lower, the curvature becomes greater.

Thus, the focusing degree of the measurement light L1*i* may be easily and appropriately evaluated by using the curvature of the waveform of each of the measured shapes F1 to F3 as the matching degree parameter.

(3) Second Order Differential of Waveform

A second order differential of a waveform is, for example, values obtained by performing second order differentiation on waveforms of the measured shapes F1 to F3. As indicated in FIG. 2, in a case where a rectangular repeated pattern of the actual shape F0 is measured, a second order differential of the waveform becomes close to zero in substantially the entire region in a case where the measured shape is close to the actual shape F0, whereas, the second order differential of the waveform becomes a shape obtained by inverting the sign of the waveform in a case of the measured shapes F1 to F3.

Thus, the focusing degree of the measurement light L1*i* may be easily and appropriately evaluated by using the second order differential of the waveform as the matching degree parameter.

(4) Maximum Value–Minimum Value of Height of Waveform

A maximum value–a minimum value of a height of a waveform is, for example, a distance from the highest point to the lowest point in each of the measured shapes F1 to F3. As the maximum value–the minimum value of the height of the waveform, for example, a maximum height Rz specified in Japanese industrial standards (JIS) B 0601 (1994), a maximum height Sz specified in ISO 25178 or a combination thereof (Rz/Sz) may be used.

As indicated in FIG. 2, in a case where a rectangular repeated pattern of the actual shape F0 is measured, as the focusing degree is lower, gaps of the measured shapes F1 to F3 from the actual shape F0 become greater, and the maximum heights Rz and Sz become smaller.

Thus, the focusing degree of the measurement light L1*i* may be easily and appropriately evaluated by using the difference between the maximum value and the minimum value of the height of the waveform of each of the measured shapes F1 to F3 as the matching degree parameter.

(5) Arithmetic Mean Height from Mean Plane

An arithmetic mean height from a mean plane is, for example, an average of absolute values of differences in a height at respective points with respect to a mean plane of a surface in the measured shapes F1 to F3. As the arithmetic mean height from the mean plane, for example, an arithmetic mean height Ra specified in Japanese industrial standards (JIS) B 0601 (1994), an arithmetic mean height Sa specified in ISO 25178 or a combination thereof (Ra/Sa) may be used.

As indicated in FIG. 2, in a case where a rectangular repeated pattern of the actual shape F0 is measured, as the focusing degree is lower, gaps of the measured shapes F1 to F3 from the actual shape F0 become greater, and the arithmetic mean heights Ra and Sa become smaller.

Thus, the focusing degree of the measurement light L1*i* may be easily and appropriately evaluated by using the arithmetic mean height from the mean plane as the matching degree parameter.

Here, types of the matching degree parameter are not limited to the examples described above. For example, values obtained by statistically processing the parameters (1) to (5) described above (such as, for example, a maximum value and an average value or a median value of extreme values) may be also utilized as the matching degree parameter.

(Evaluation of Matching Degree)

In the shape measuring device 1 according to the present embodiment, the matching degree may be evaluated by comparing the matching degree parameter obtained by measuring the master M with the adjustment matching degree parameter, thereby whether or not the focus position matches the interference position may be confirmed.

The shape measuring device 1 measures the master M and calculates the matching degree parameter in a case where the number of times of measurement of the measurement target W set in advance or a time condition of confirmation such as an interval of confirmation time set in advance is satisfied.

The matching degree comparing unit 108 reads out the adjustment matching degree parameter from the adjustment matching degree parameter storing unit 106 and compares the adjustment matching degree parameter with the matching degree parameter and outputs a comparison result to the output unit 202. This enables the operator to confirm whether or not the focus position matches the interference position by referring to the comparison result.

Note that the matching degree comparing unit 108 may cause the shape measuring device 1 to automatically stop in a case where evaluation of the matching degree is low (matching degree parameter NG).

Further, the abnormality notifying unit 110 may notify the operator of occurrence of an abnormality, or the shape measuring device 1 may be caused to automatically stop along with notification of occurrence of the abnormality.

(Determination as to Quality of Matching Degree Parameter)

Next, a specific example (determination conditions) of determination as to quality of the matching degree parameter by the matching degree comparing unit 108 will be described.

Figure 3:
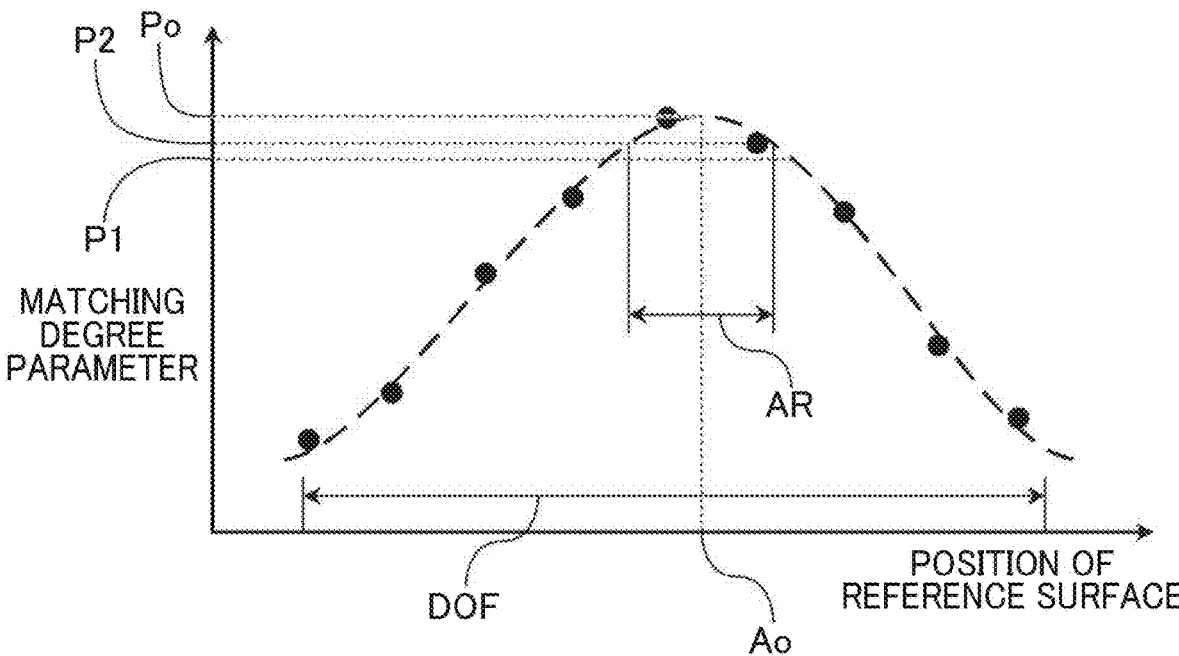
FIG. 3 is a graph showing a relationship between a position of a reference surface and a matching degree parameter.

FIG. 3 is a graph showing a relationship between the position of the reference surface and the matching degree parameter. FIG. 3 indicates measured values of the matching degree parameter with black points and indicates an approximate curve concerning measured values of the matching degree parameter with a dashed line.

As indicated in FIG. 3, an adjustment matching degree parameter Po obtained in a state where the focus position matches the interference position becomes substantially a maximum value in the approximate curve of the measured values of the matching degree parameter.

In the determination as to quality of matching degree parameter (whether the matching degree parameter is good or not good), for example, a numerical value obtained by multiplying the adjustment matching degree parameter Po by a fixed ratio (R1(%)) is set as a threshold P1 (=R1(%)× Po). Then, in a case where the matching degree parameter exceeds the threshold P1, it is considered that the matching degree is high (the matching degree meets criteria). Here, R1=20% is one example.

Further, it is conceivable that the threshold for the matching degree parameter is determined based on a range of movement DOF of the reference surface 24c. Specifically, a region AR that is R2(%) of a depth of field (DOF) in a ±X direction around the position A of the reference surface 24c corresponding to the adjustment matching degree parameter Po is obtained. Then, a value P2 of the matching degree parameter corresponding to the region AR is defined as the threshold. Here, R2=20% is one example.

(Timing for Confirming Matching Degree)

As a timing (time condition) for confirming the matching degree using the master M, the following examples may be considered.

(a) Confirmation is performed in a case where the number of times that measurement of the measurement target W is executed exceeds a fixed value. In this case, it is possible to limit a maximum number of times of measurement of the measurement target W executed in a poor adjustment state by limiting the number of times that measurement is executed.

(b) Confirmation is performed after a fixed period or a fixed number of days has elapsed. In this case, even in a case where measurement of the measurement target W is executed in a poor adjustment state, it is possible to specify the measurement target W and measurement data measured in the poor adjustment state by measurement date, or the like. This makes it possible to easily trace the measurement data measured in the poor adjustment state, so that it is possible to perform measurement again.

(c) Confirmation is performed when a batch (such as, for example, a lot) of measurement is started. In this case, the measurement target W for which measurement is executed in a poor adjustment state is limited in the batch. This makes it possible to easily trace measurement data measured in the poor adjustment state, so that it is possible to perform measurement again.

Note that the timing for performing confirmation is not limited to the examples described above. The shape measuring device 1 may be configured such that the operator may select or set one of (a) to (c) described above, or a combination of (a) to (c).

According to the present embodiment, the matching degree may be evaluated by comparing the matching degree parameter obtained by measuring the master M with the adjustment matching degree parameter, thereby whether or not the focus position matches the interference position may be confirmed.

(Another Example of Method for Calculating Adjustment Matching Degree Parameter)

Note that while in the present embodiment, the matching degree parameter obtained in a state where the focus position matches the interference position is set as the adjustment matching degree parameter Po, the present invention is not limited to this example.

For example, the adjustment matching degree parameter Po may be also obtained as follows. First, the reference surface 24c is moved, and the master M is measured at each of the positions to obtain matching degree parameters. Then, an approximate curve is obtained for measured values of the matching degree parameters, and the maximum value Po of the matching degree parameters is obtained and set as the adjustment matching degree parameter. Here, as a method for calculating the approximate curve of the matching degree parameter, for example, a method such as least-square approximation or polynomial approximation may be applied.

Next, a position Ao of the reference surface 24c corresponding to the maximum value Po of the matching degree parameter is set as a position at which the focus position matches the interference position. Then, the reference surface 24c is moved to the position Ao, thereby adjusting the shape measuring device 1.

This makes it possible to move the reference surface 24c to the position at which the matching degree becomes maximum, so that it is possible to easily adjust the shape measuring device 1.

Note that while in the above-described example, the reference surface 24c is moved to the position Ao of the reference surface 24c corresponding to the maximum value Po of the matching degree parameter, the present invention is not limited to this. For example, the reference surface 24c may be moved to a position corresponding to an allowable range (for example, Po×80%) of the matching degree parameter based on the maximum value Po of the matching degree parameter.

[Adjustment Method for Shape Measuring Device]

Figure 4:
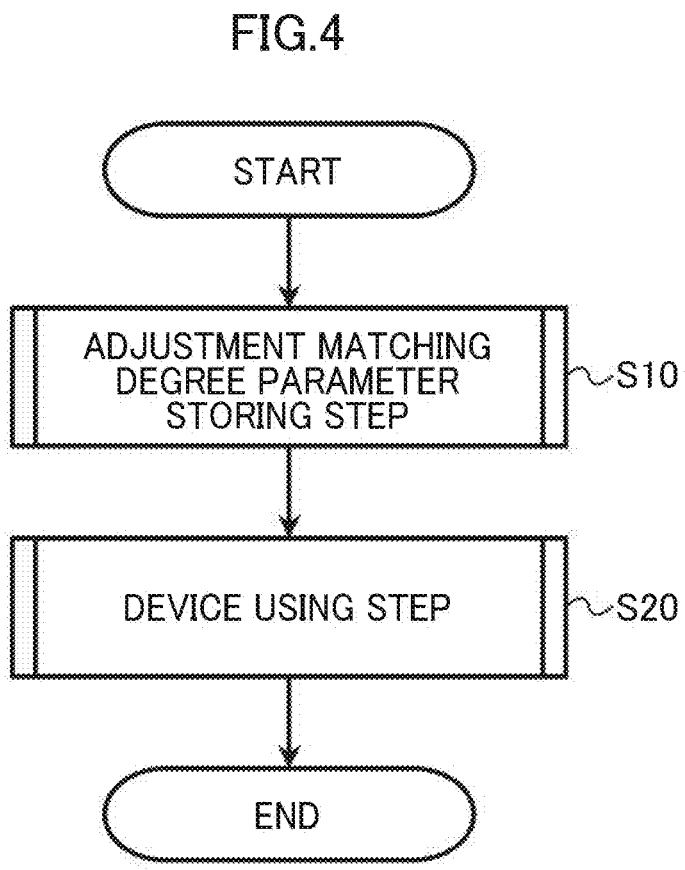
FIG. 4 is a flowchart showing an adjustment method for the shape measuring device according to the first embodiment of the preset invention.

FIG. 4 is a flowchart showing an adjustment method for the shape measuring device according to the first embodiment of the present invention.

In adjustment of the shape measuring device 1, first, in an adjustment matching degree parameter storing step (step S10), the master M is measured, and the adjustment matching degree parameter is calculated and stored in advance.

Then, in a device using step (step S20), the master M is measured, and the matching degree is determined by utilizing the adjustment matching degree parameter.

(Adjustment Matching Degree Parameter Storing Step)

The adjustment matching degree parameter storing step will be described next with reference to the flowchart in FIG. 5.

In the adjustment matching degree parameter storing step, first, the position of the reference surface 24c is adjusted so that the focus position matches the interference position (adjusted state) (step S100). Next, the master M is measured in the adjusted state (step S102). Then, the matching degree parameter calculating unit 104 calculates the matching degree parameter based on the measurement result of the master M (step S104).

Next, the matching degree parameter Po obtained in the adjusted state is stored in the adjustment matching degree parameter storing unit 106 as the adjustment matching degree parameter (step S106).

(Device Using Step)

The device using step will be described next using the flowchart in FIG. 6.

In the device using step, first, the switching mechanism 16 is operated by the switching control unit 140 to perform switching to the master M (step S200). Then, the white light interferometry microscope 10 measures a surface shape of the master M (step S202), and the matching degree parameter calculating unit 104 calculates the matching degree parameter from the surface shape of the master M (step S204).

Next, the matching degree comparing unit 108 compares the matching degree parameter calculated in step S204 with the adjustment matching degree parameter (step S206). Then, in a case where the matching degree parameter is equal to or less than a threshold (P1 or P2) which has been set based on the adjustment matching degree parameter, the matching degree comparing unit 108 determines that the matching degree between the focus position and the interference position is low. Then, the matching degree comparing unit 108 notifies occurrence of an abnormality using the abnormality notifying unit 110 and causes the shape measuring device 1 to automatically stop operation (step S208).

On the other hand, in a case where the matching degree parameter exceeds the threshold (P1 or P2) which has been set based on the adjustment matching degree parameter, the processing proceeds to step S210.

Next, the switching control unit 140 operates the switching mechanism 16 to perform switching to the measurement target W (step S210), and parts to be measured of the measurement target W are measured by the white light interferometry microscope 10 (step S212).

Next, in a case where the number of times of measurement for the measurement target W becomes equal to or larger than a reference value (step S214: Yes), the processing returns to step S200, and the master M is measured, and the matching degree is confirmed (step S200 to step S210).

Next, in a case where measurement has been performed for all the parts to be measured of the measurement target W (step S216: Yes), the processing ends.

Figure 6:
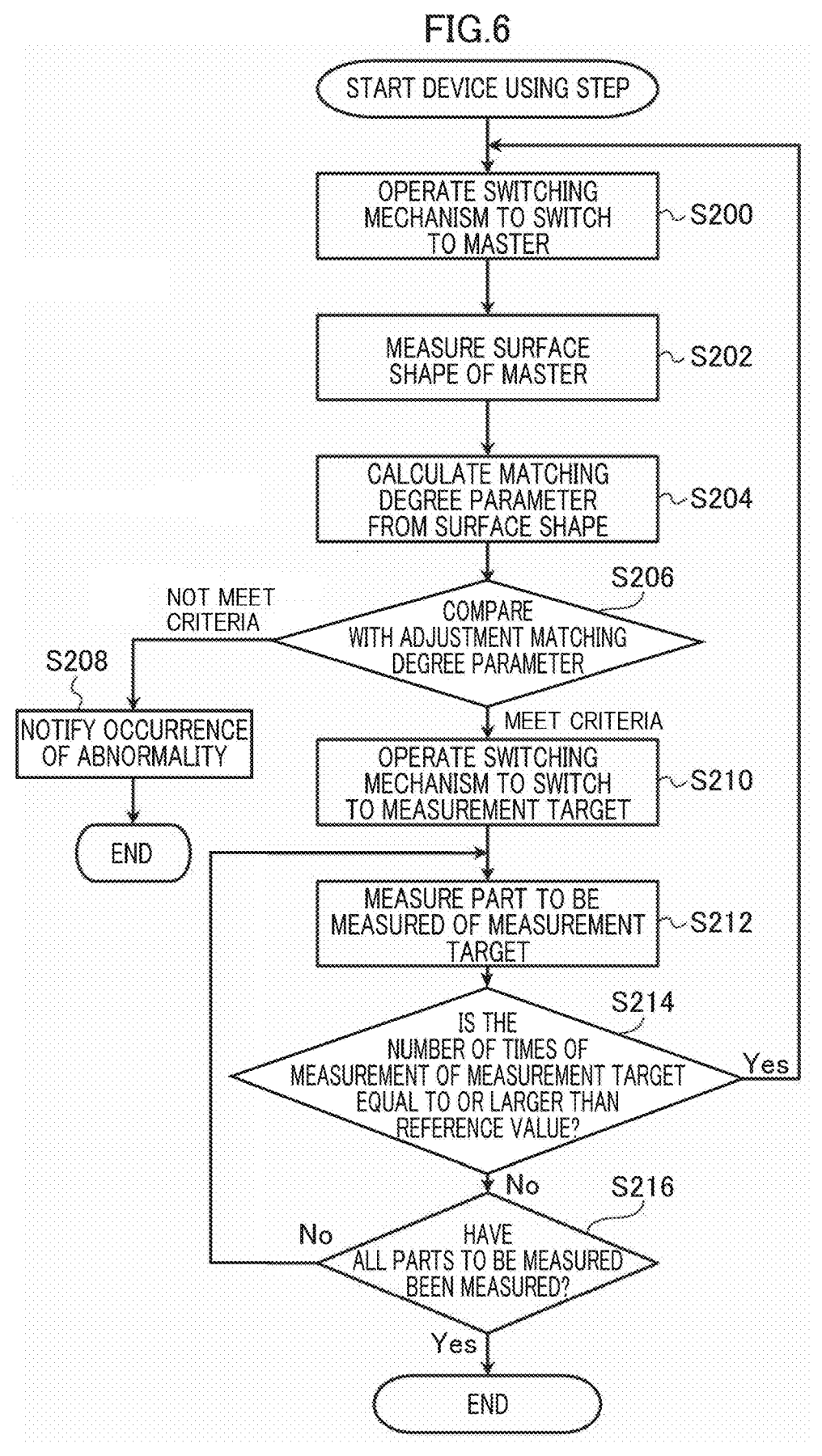

Here, in the example indicated in FIG. 6, the matching degree is confirmed prior to measurement of the measurement target W, and the matching degree is confirmed again based on the number of times of measurement of the measurement target W. However, the present invention is not limited to this. As described above, a timing for confirming the matching degree may be freely set by the operator.

Example 1-1

Note that in the above-described embodiment, in a case where a result of determination as to quality of the matching degree parameter indicates an abnormality (i.e., the matching degree parameter does not meet criteria), in addition to a notification of the abnormality, and movement of the reference surface 24c and calculation of the matching degree parameter may be repeatedly performed so as to automatically adjust the matching degree. Specifically, in a case where the matching degree parameter measured when the matching degree is confirmed becomes equal to or less than the threshold (P1 or P2) set in advance based on the adjustment matching degree parameter Po, readjustment may be automatically performed.

In this case, a threshold for readjustment may be set stricter than the threshold for determination of an abnormality, such that readjustment may be automatically performed before an abnormality occurs.

According to Example 1-1, adjustment of the matching degree may be automated so that it is possible to perform measurement with higher reliability.

Example 1-2

Further, it is also possible to acquire a correlation (such as, for example, a correlation graph or a maximum value) between the matching degree parameter and the position of the reference surface in advance, so that the correlation may be used in readjustment of the matching degree.

In this case, in a case where the result of determination as to quality of the matching degree parameter indicates an abnormality (the matching degree parameter does not meet criteria), measurement is performed at at least two positions on the reference surface 24c to calculate the matching degree parameters. Then, a position of the reference surface 24c at which the matching degree parameter becomes maximum is calculated based on the correlation between the known matching degree parameter and the position of the reference surface, and the matching degree parameters calculated at at least two positions. By this means, even in a case where an absolute value of the position of the reference surface 24c is unknown (in a case where only a relative value is known), the reference surface 24c may be moved to the position at which the matching degree parameter becomes the maximum.

Note that while in Example 1-2, the matching degree parameters are calculated at at least two positions, the present invention is not limited to this. In a case where an absolute value of the position of the reference surface 24c is known, or in a case where a polarity (positive or negative of a rate of change) of the correlation between the known matching degree parameter and the position of the reference surface is known, measurement may be performed only at one position.

Modification 1-1

Figure 7:
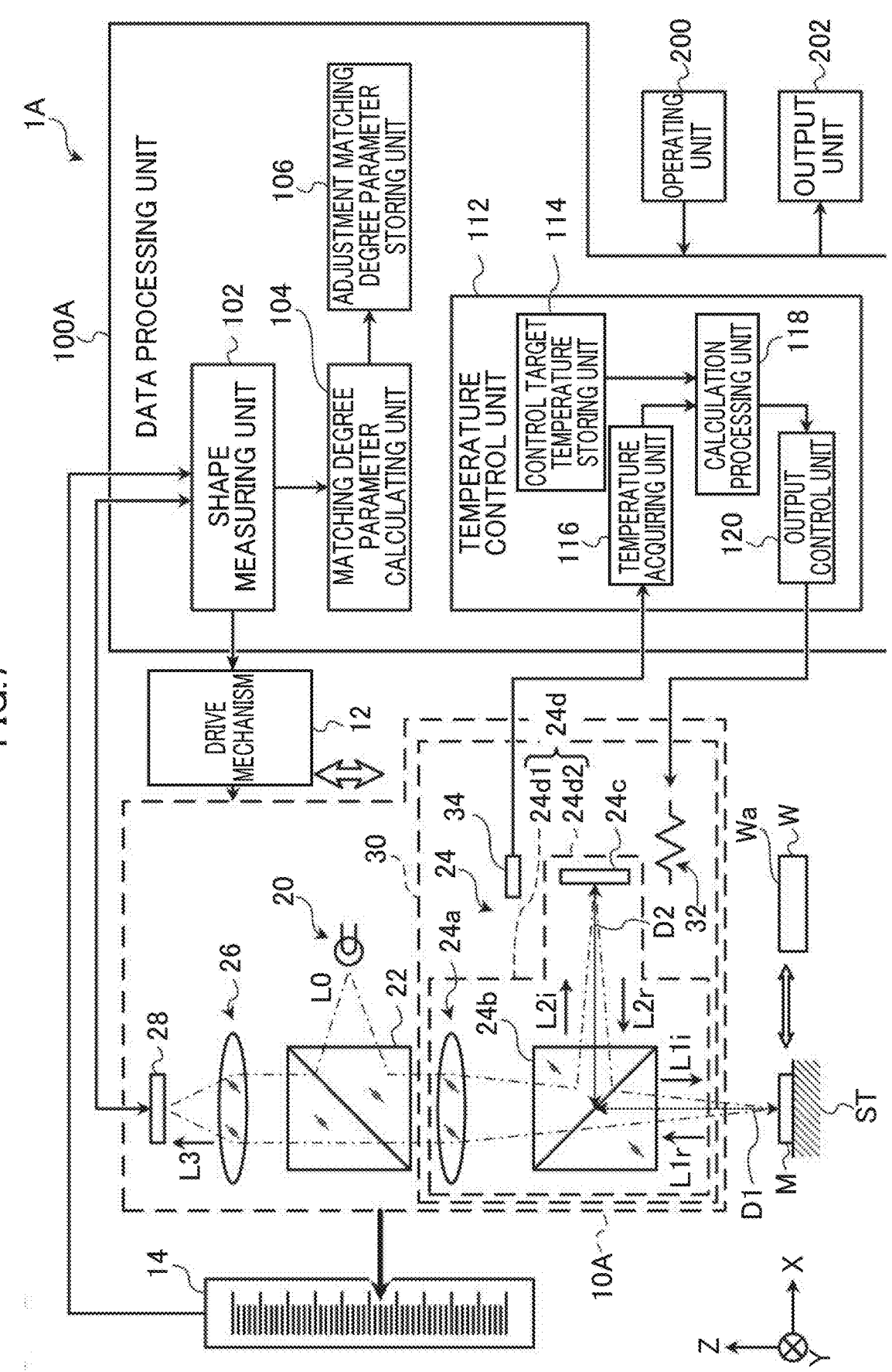
FIG. 7 is a view illustrating a shape measuring device according to Modification 1-1.

FIG. 7 is a view illustrating a shape measuring device according to Modification 1-1.

As illustrated in FIG. 7, a shape measuring device 1A according to Modification 1-1 adjusts the position of the reference surface 24c using a temperature controller (a temperature sensor 34 and a temperature control unit 112).

As illustrated in FIG. 7, in a white light interferometry microscope 10A of the shape measuring device 1A, the interference objective lens 24 includes a holder 24d.

The holder 24d is formed of a metal material like, for example, brass, that is, a material that reversibly thermally deforms. The holder 24d includes a lens barrel 24d1 and a reference surface storing part 24d2. The lens barrel 24d1 is formed in a cylindrical shape extending in the Z direction and stores (holds) the objective lens 24a and the beam splitter 24b. The reference surface storing part 24d2 is formed in a cylindrical shape extending in the X direction from a position at which the beam splitter 24b is held in the lens barrel 24d1 and stores (houses) the reference surface 24c.

The temperature adjusting unit 32, which is provided in the vicinity of the reference surface storing part 24d2, adjusts at least a temperature between the beam splitter 24b and the reference surface 24c, that is, a temperature of the reference surface storing part 24d2 under control of the temperature control unit 112. As the temperature adjusting unit 32, for example, a heater, a Peltier element, or the like, is used.

The reference surface storing part 24d2 is formed of a material that reversibly thermally deforms, and thus, reversibly thermally deforms (expands, shrinks) in accordance with temperature change. By this means, it is possible to thermally deform the reference surface storing part 24d2 according to the temperature of the reference surface storing part 24d2 changed by the temperature adjusting unit 32, thereby adjusting the position of the reference surface 24c in the X direction in accordance with the thermal deformation.

The temperature sensor 34 corresponds to a temperature measuring unit of the present invention. The temperature sensor 34, which is provided in the vicinity of the reference surface storing part 24d2, measures a temperature of at least the reference surface storing part 24d2 (between the beam splitter 24b and the reference surface 24c) in the holder 24d and outputs the temperature measurement result to a temperature acquiring unit 116 of the temperature control unit 112. The measurement result of the temperature sensor 34 is utilized for controlling the temperature adjusting unit 32 by the temperature control unit 112.

A heat insulating material 30 is provided to cover the whole of the interference objective lens 24, the temperature adjusting unit 32 and the temperature sensor 34. This prevents the temperature inside the heat insulating material 30, particularly, the temperature of the reference surface storing part 24d2 and in the vicinity of the reference surface storing part 24d2 from changing by being affected by outside.

As illustrated in FIG. 7, the temperature control unit 112 of the data processing unit 100A includes a control target temperature storing unit 114, the temperature acquiring unit 116, a calculation processing unit 118 and an output control unit 120.

The control target temperature storing unit 114 stores a look-up table LUT indicating a correspondence relationship between the temperature inside the holder 24d (for example, the temperature of the reference surface storing part 24d2, the temperature between the beam splitter 24b and the reference surface 24c) and the position of the reference surface 24c (position in the X direction).

The calculation processing unit 118 calculates an output of the temperature adjusting unit 32 necessary for moving the reference surface 24c to a target set position with reference to the LUT stored in the control target temperature storing unit 114. Specifically, the calculation processing unit 118 reads out a temperature inside the holder 24d (control target temperature) corresponding to the target set position of the reference surface 24c from the LUT and calculates the output of the temperature adjusting unit 32 for adjusting the temperature inside the holder 24d to the control target temperature.

The output control unit 120 controls the output of the temperature adjusting unit 32 based on the calculation result by the calculation processing unit 118 to adjust the temperature inside the holder 24d to the control target temperature. Here, the temperature inside the holder 24d may be controlled by, for example, feedback control, proportional-integral-differential controller (PID control), or the like.

According to Modification 1-1, the position of the reference surface 24c may be managed using a numerical value of the temperature, so that it is possible to perform adjustment with higher accuracy, higher resolution and higher reproducibility.

Modification 1-2

Figure 8:
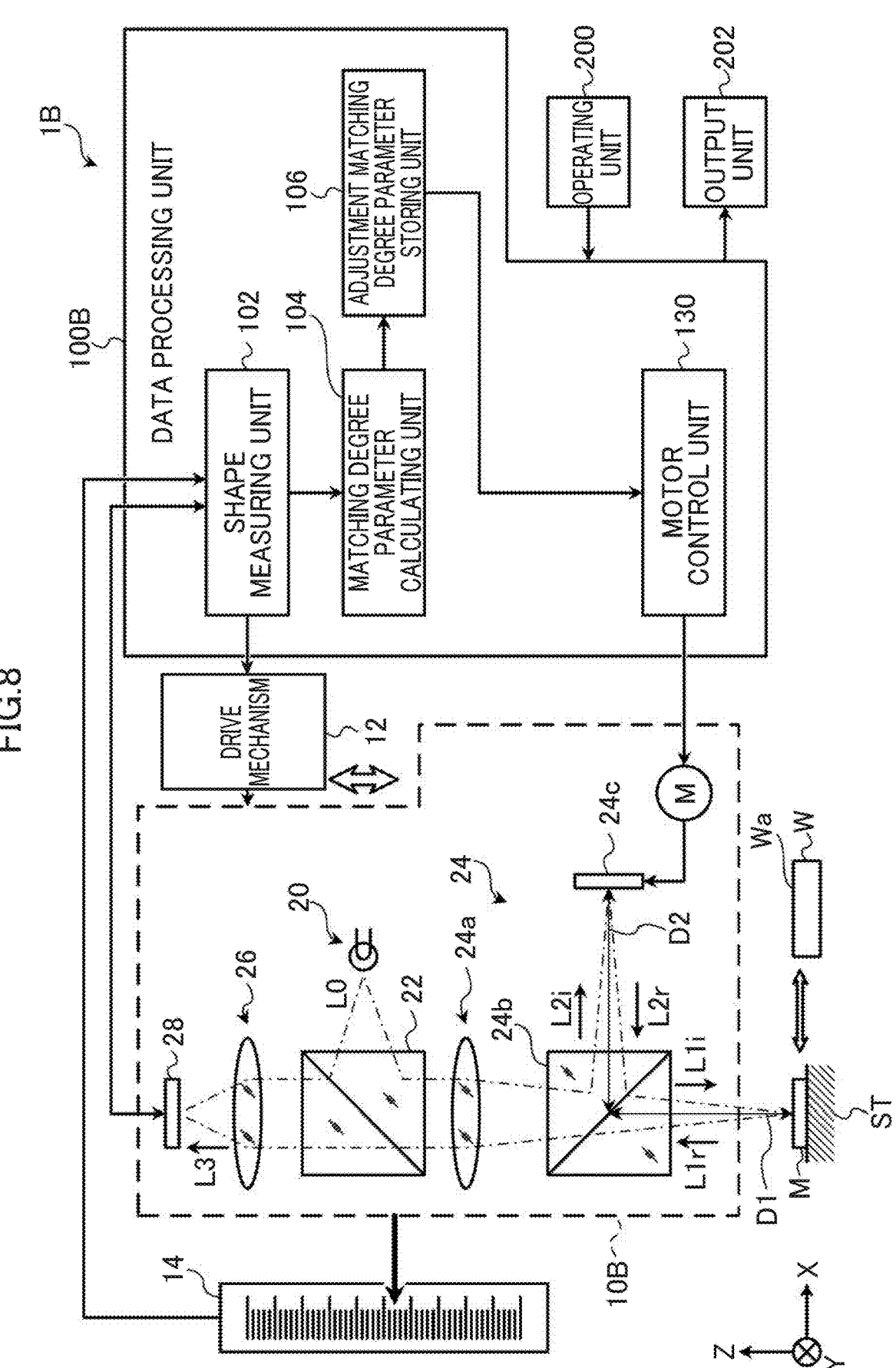
FIG. 8 is a view illustrating a shape measuring device according to Modification 1-2.

FIG. 8 is a view illustrating a shape measuring device according to Modification 1-2.

As illustrated in FIG. 8, a shape measuring device 1B according to Modification 1-2 adjusts the position of the reference surface 24c in a white light interferometry microscope 10B using a linear motion mechanism with the motor M.

A motor control unit 130 of a data processing unit 100B acquires the position of the reference surface 24c in the X direction and controls (feedback control, PID control) a rotation amount of the motor M to move the reference surface 24c to the target set position.

According to Modification 1-2, the position of the reference surface 24c may be controlled using the motor M, so that it is possible to perform adjustment with higher accuracy, higher resolution and higher reproducibility.

Note that while in Modification 1-2, the linear motion mechanism using the motor M is employed, the present invention is not limited to this. For example, a linear motion mechanism using an actuator such as a piezoelectric element may be also employed.

[Shape Measuring Device According to Second Embodiment]

Figure 9:
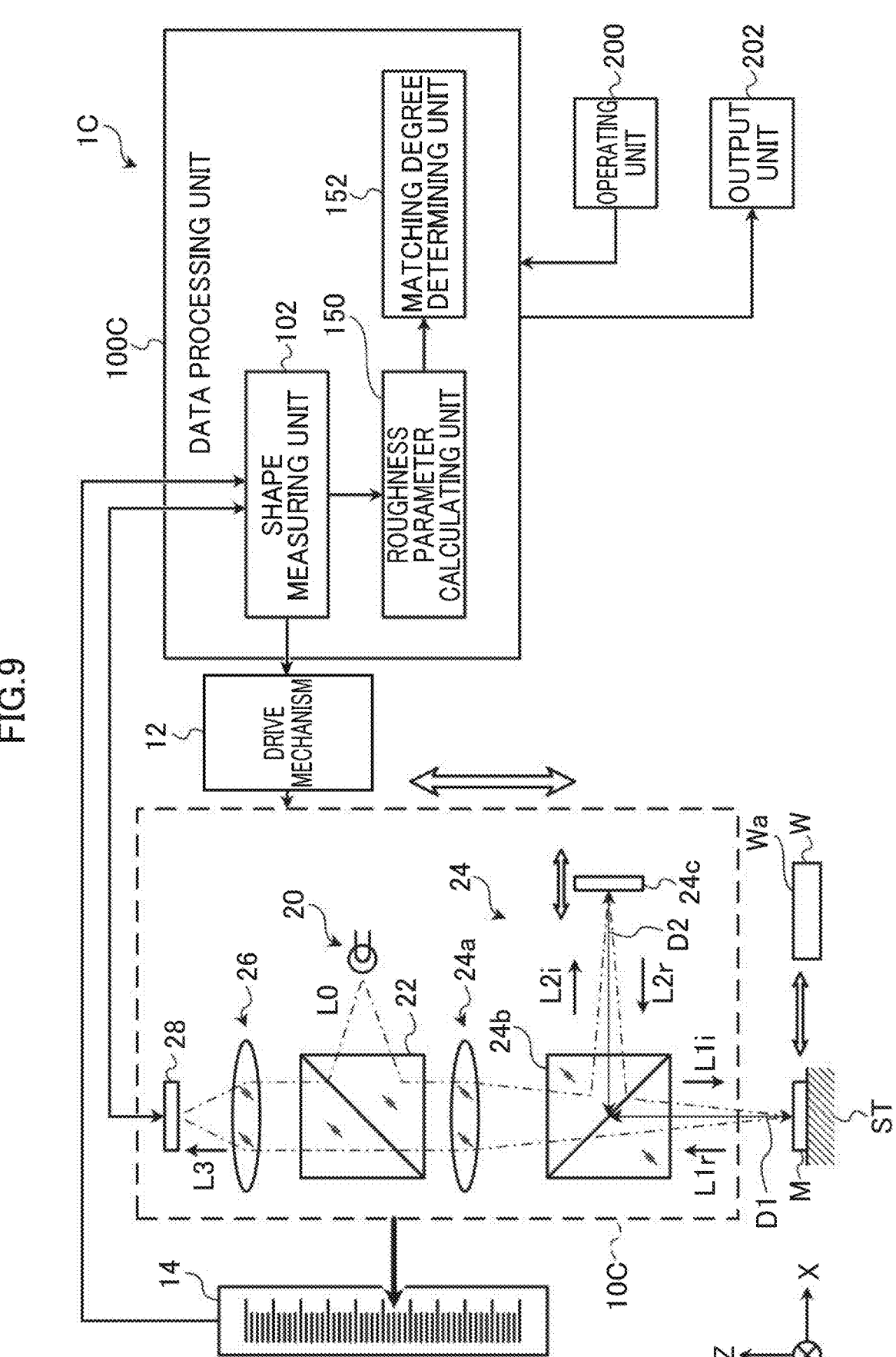
FIG. 9 is a view illustrating a shape measuring device according to a second embodiment of the present invention.

FIG. 9 is a view illustrating a shape measuring device according to a second embodiment of the present invention. Note that X and Y directions among X, Y and Z directions perpendicular to each other in the drawing are directions parallel to the horizontal direction, and the Z direction is a direction parallel to the vertical direction.

As illustrated in FIG. 9, a shape measuring device 1C includes a white light interferometry microscope 10C, the drive mechanism 12, the scale 14, and a data processing unit 100C.

The white light interferometry microscope 10C is a Michelson-type scanning white light interferometry microscope. The white light interferometry microscope 10C includes the light source unit 20, the beam splitter 22, the interference objective lens 24, the imaging lens 26, and the camera 28. The interference objective lens 24, the beam splitter 22, the imaging lens 26 and the camera 28 are arranged in this order from the surface to be measured Wa toward the upper side along the Z direction. Further, the light source unit 20 is arranged at a position facing the beam splitter 22 in the X direction (or may be the Y direction).

The light source unit 20 emits the white light L0 (low-coherence light with low coherence) of a parallel light flux toward the beam splitter 22 under control of the data processing unit 100C. While not illustrated, the light source unit 20 includes a light source capable of emitting the white light L0, such as a light-emitting diode, a semiconductor laser, a halogen lamp and a high-brightness discharge lamp, and a collector lens that converts the white light L0 emitted from the light source into a parallel light flux.

As the beam splitter 22, for example, a half mirror is used. The beam splitter 22 reflects part of the white light L0 incident from the light source unit 20 toward the interference objective lens 24 on the lower side in the Z direction as the measurement light L1i. Further, the beam splitter 22 allows part of the multiplexed light L3 (be described later) incident from the interference objective lens 24 to pass therethrough to the upper side in the Z direction so as to emit the multiplexed light L3 toward the imaging lens 26.

The interference objective lens 24 is a Michelson-type lens and includes the objective lens 24a, the beam splitter 24b and the reference surface 24c. The beam splitter 24b and the objective lens 24a are arranged in this order from the surface to be measured Wa, to the upper side along the Z direction. The reference surface 24c is arranged at a position facing the beam splitter 24b in the X direction (or may be the Y direction). While description will be provided below using a Michelson-type interference optical system, the interference optical system is not limited to the Michelson type. Publicly known interference optical systems such as a Mirau type and a Linic type may be employed as the interference objective lens 24.

The objective lens 24a has a focusing function and causes the measurement light L1 incident from the beam splitter 22 to focus on the surface to be measured Wa through the beam splitter 24b.

The beam splitter 24b corresponds to an interfering unit of the present invention. As the beam splitter 24b, for example, a half mirror is used. The beam splitter 24b splits part of the white light L0 incident from the objective lens 24a as reference light L2$i$, and reflects the reference light L2$i$ toward the reference surface 24$c$. The beam splitter 24$b$ allows the other part of the white light L0 as measurement light L1$i$ to pass therethrough, so as to emit the measurement light L1$i$ to the surface to be measured Wa. Note that a reference numeral D1 in the drawing designates a measurement light path length that is an optical path length of the measurement light L1 between the beam splitter 24$b$ and the surface to be measured Wa. The measurement light L1$i$ that has passed through the beam splitter 24$b$ is radiated on the surface to be measured Wa, then reflected by the surface to be measured Wa and returns to the beam splitter 24$b$.

As the reference surface 24$c$, for example, a reflecting mirror is used, and the reference surface 24$c$ reflects the reference light L2$i$ incident from the beam splitter 24$b$ toward the beam splitter 24$b$. A position of the reference surface 24$c$ in the X direction may be manually adjusted using a position adjustment mechanism (not illustrated) (such as, for example, a ball screw mechanism and an actuator). This enables adjustment of a reference light path length D2 that is an optical path length of the reference light L2 between the beam splitter 24$b$ and the reference surface 24$c$. The reference light path length D2 is adjusted so as to be equal (including roughly equal) to the measurement light path length D1.

The beam splitter 24$b$ generates the multiplexed light L3 of the measurement light L1 returning from the surface to be measured Wa and the reference light L2 returning from on the upper side in the Z direction. The multiplexed light L3 passes through the objective lens 24$a$ and the beam splitter 22, and is incident on the imaging lens 26.

The imaging lens 26 forms an image of the multiplexed light L3 incident from the beam splitter 22 on an imaging surface (not illustrated) of the camera 28. Specifically, the imaging lens 26 forms an image of a point on a focal plane of the objective lens 24$a$ on the imaging surface of the camera 28 as an image point.

The camera 28 includes a charge coupled device (CCD)-type or a complementary metal oxide semiconductor (CMOS)-type imaging element (not illustrated). The camera 28 captures an image of the multiplexed light L3 formed on the imaging surface by the imaging lens 26, performs signal processing on an imaging signal of the multiplexed light L3 obtained by the imaging and outputs a captured image.

The drive mechanism 12 corresponds to a scanning unit of the present invention. The drive mechanism 12, which includes a linear motor or a motor drive mechanism, holds the white light interferometry microscope 10C so as to be movable in the Z direction that is a scanning direction. The drive mechanism 12 causes the white light interferometry microscope 10C to scan along the Z direction under control of the data processing unit 100C.

Note that the drive mechanism 12 is only required to be able to cause the white light interferometry microscope 10C to scan in the Z direction relatively with respect to the surface to be measured Wa. For example, the white light interferometry microscope 10C may be caused to scan the surface to be measured Wa (supporting part that supports the surface to be measured Wa) in the Z direction.

The scale 14 is a position detection sensor that detects the position of the white light interferometry microscope 10C in the Z direction. For example, a linear scale may be used as the scale 14. The scale 14 repeatedly detects the position of the white light interferometry microscope 10C in the Z direction and repeatedly outputs the position detection result to the data processing unit 100C.

The data processing unit 100C controls operation of measuring a three-dimensional shape of the surface to be measured Wa by the white light interferometry microscope 10C (shape measuring device 1C) and calculates, or the like, the three-dimensional shape of the surface to be measured Wa in accordance with input of operation from the operating unit 200. The data processing unit 100C includes a processor (such as, for example, a central processing unit (CPU) and a graphics processing unit (GPU)) that executes various kinds of calculation, a memory (such as, for example, a read only memory (ROM) and a random access memory (RAM)) that becomes a work area of the processor, and a storage device (such as, for example, a solid state drive (SSD) and a hard disk drive (HDD)) for storing various kinds of programs and data.

The data processing unit 100C executes programs stored in the storage using the processor so as to implement various kinds of functions (the shape measuring unit 102, a roughness parameter calculating unit 150 and a matching degree determining unit 152) which will be described later.

Note that the functions of the data processing unit 100C may be implemented by one processor or may be implemented by processors of the same type or different types. Further, the functions of the data processing unit 100C may be implemented by a general-purpose computer.

The operating unit 200 includes an operating member (such as, for example, a keyboard and a mouse) for accepting input of operation of the operator to the data processing unit 100C.

The output unit 202 is a device for outputting execution results of the programs by the data processing unit 100C, data of calculation results, or the like. The output unit 202 includes, for example, a monitor (such as, for example, a liquid crystal display) for displaying an operation user interface (UI) and detection results. Further, the output unit 202 may include a printer, a speaker, and the like, in addition to or in place of the monitor.

[Adjustment Procedure of Shape Measuring Device]

Figure 36:
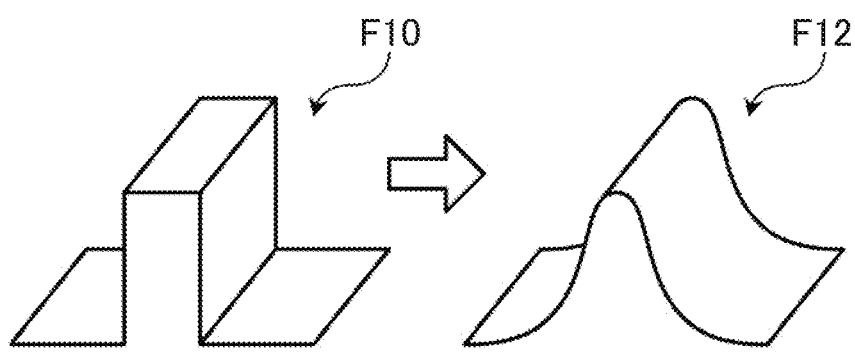
FIG. 36 is a view indicating a relationship between an actual shape and a measured waveform.

When a surface shape of a master M for adjustment (hereinafter, referred to as a "master") having a shape of a periodic concave-convex pattern is measured in a state where the focus position does not match the interference position, in a similar manner to the example illustrated in FIG. 36, a measured shape F12 collapses compared to an actual shape F10, and a roughness parameter obtained for the measured shape F12 becomes smaller than a roughness parameter obtained for the actual shape F10. Then, as the matching degree between the focus position and the interference position becomes lower (for example, as the matching degree of the measurement light L1$i$ with respect to the master M becomes lower or as a difference between the measurement light path length D1 and the reference light path length D2 becomes greater), a gap of the measured shape F12 from the actual shape F10 tends to become greater, and the roughness parameter tends to become smaller.

In the shape measuring device 1C according to the present embodiment, the shape measuring unit 102 measures a three-dimensional surface shape of the master M having a periodic concave-convex pattern, and the roughness parameter calculating unit 150 obtains a roughness parameter for the measured shape. Then, the matching degree determining unit 152 determines the matching degree between the focus position and the interference position using the roughness parameter as an index. Here, the roughness parameter is used as a matching degree parameter indicating a degree of match between the focus position and the interference position (matching degree parameter indicating a matching degree for causing the measurement light L1$i$ to focus on the master M and for causing the measurement light L1$r$ to interfere with the reference light L2$r$).

Here, as the master M, for example, a flat material on which a periodic concave-convex pattern is formed on its surface may be used. As the pattern to be formed on the surface of the master M, for example, all or part of patterns to be used in various kinds of resolution charts, for example, a radial pattern (star chart), a checkered pattern, a grid chart, the United States Air Force MIL-STD-150A standard of 1951 (USAF 1951 target), a resolution chart complying with international organization for standardization (ISO) 12233 (a resolution chart of camera & imaging products association (CIPA)), and the like, may be used. Further, as the master M, a roughness scale (such as, for example, a pseudo roughness scale and a random shape roughness scale) may be also used. Note that a type of the master M is not limited to those described above. The master M is only required to partially include a periodic pattern.

Further, as the roughness parameter, a parameter representing various kinds of roughness defined by ISO or Japanese industrial standards (JIS) may be utilized. Specifically, a line roughness parameter (JIS B0601:2013) or a surface roughness parameter (JIS B0681-2:2018) may be utilized. As the line roughness parameter, for example, Rz (maximum height roughness: a distance from the highest point to the lowest point in the measured shape), Ra (arithmetic mean roughness: an average of absolute values of differences in height of respective points with respect to a mean plane of a surface in the measured shape), or a statistic value, such as an average value and a median value, of Rz, or the like, calculated from cross-sections, and the like, may be used. As the surface roughness parameter, for example, Sz (maximum height roughness), Sa (arithmetic mean roughness), or the like, may be used.

(Specific Example of Determination of Matching Degree Based on Roughness Parameter)

Figure 10:
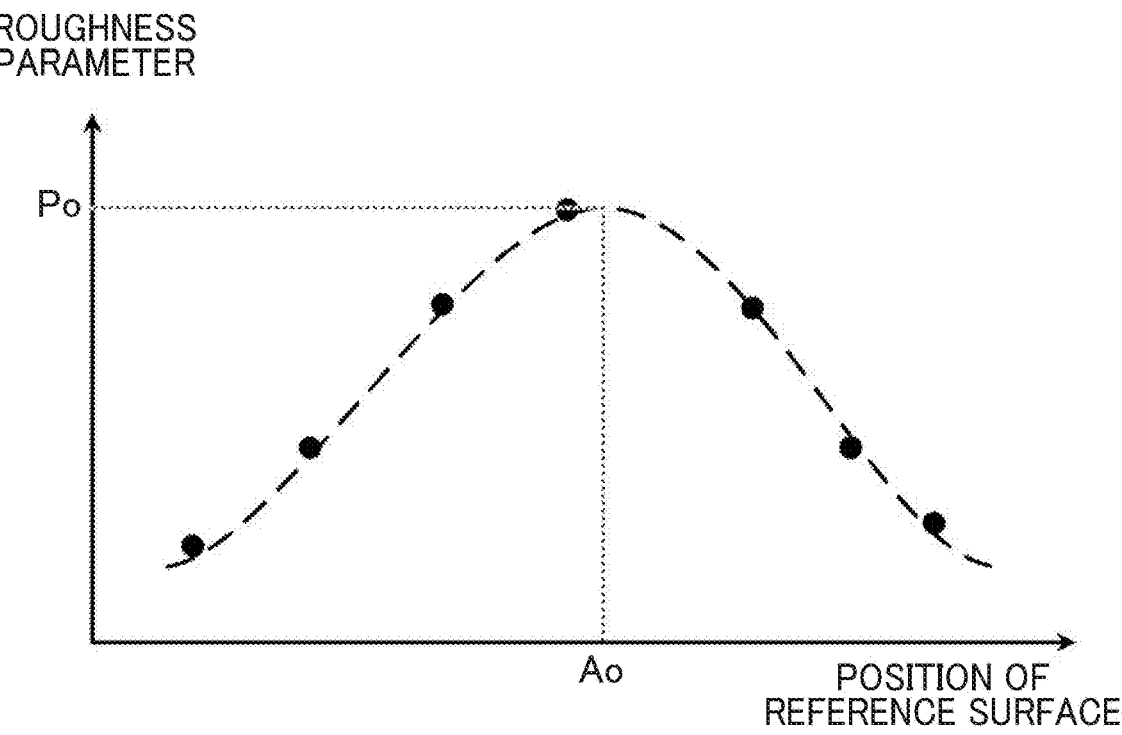
FIG. 10 is a graph showing a relationship between a roughness parameter and a position of a reference surface.

FIG. 10 is a graph showing a relationship between a roughness parameter and a position of the reference surface in a case where Sa is used as the roughness parameter.

In the present embodiment, first, the measurement light L1$i$ is caused to focus on the surface of the master M. Then, the master M is measured at each of positions while moving the reference surface 24$c$ in a state where the measurement light L1$i$ is caused to focus on the surface of the master M to obtain a roughness parameter and a maximum value (peak value) Po of the roughness parameter.

Then, the position Ao of the reference surface 24$c$ corresponding to the maximum value Po of the roughness parameter is set as a target set position of the reference surface 24$c$ at which the matching degree between the focus position and the interference position is the highest. Then, by moving the reference surface 24$c$ to the position Ao, the shape measuring device 1C is adjusted.

By this means, the reference surface 24$c$ may be moved to a position at which the matching degree becomes maximum, so that it is possible to easily adjust the shape measuring device 1C.

Here, while in the above-described example, the reference surface 24$c$ is moved to the position Ao of the reference surface 24$c$ corresponding to the maximum value Po of the roughness parameter, the present invention is not limited to this. For example, the reference surface 24$c$ may be moved to a position corresponding to an allowable range (for example, Po×80%) of the roughness parameter based on the maximum value Po of the roughness parameter.

[Adjustment Method for Shape Measuring Device According to Second Embodiment]

Figure 11:
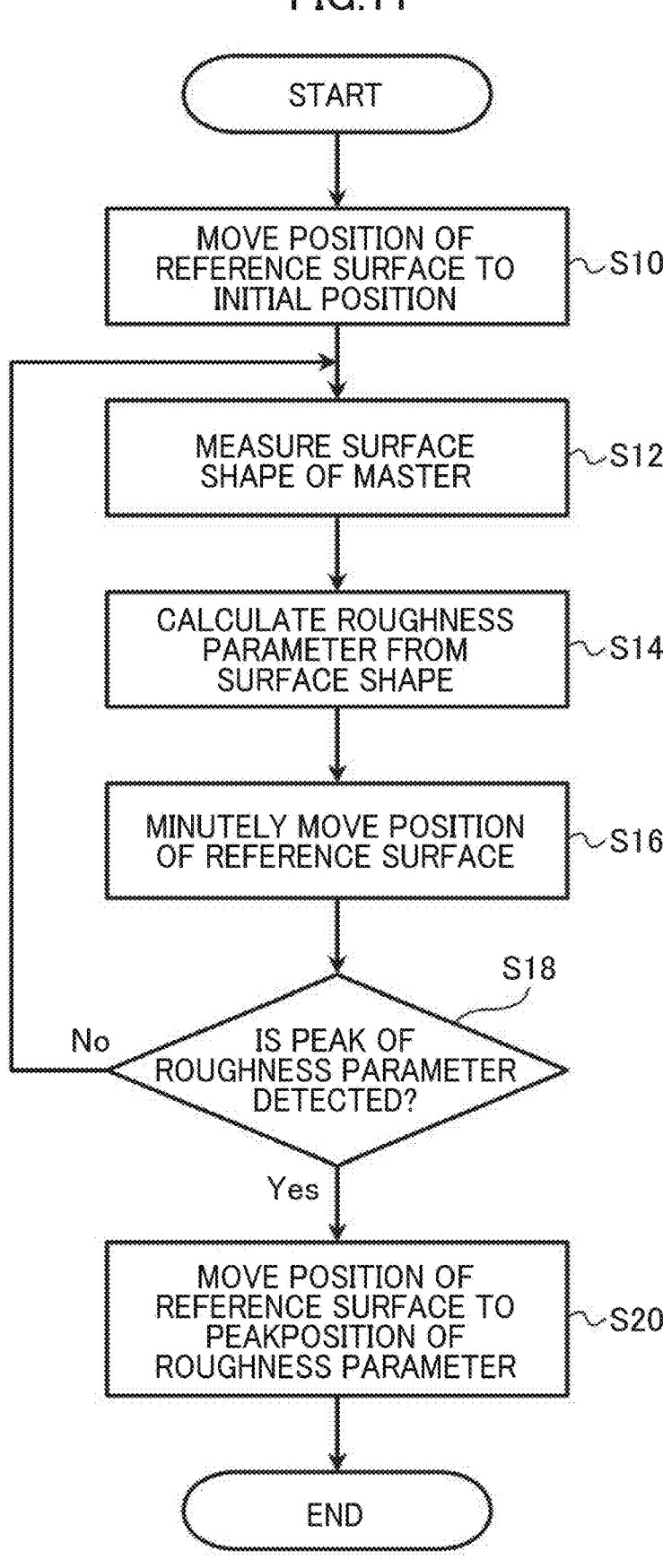
FIG. 11 is a flowchart showing an adjustment method for the shape measuring device according to the second embodiment of the present invention.

FIG. 11 is a flowchart showing an adjustment method for the shape measuring device according to the second embodiment of the present invention.

First, the position of the reference surface 24$c$ is moved to an initial position (step S10). Here, the initial position is a position of the reference surface 24$c$ upon start of adjustment of the shape measuring device 1C. Examples of the initial position of the reference surface 24$c$ include: an end part of a range (depth of field (DOF)) in which the reference surface 24$c$ can move in the ±X direction; a part in the vicinity of the position at which the roughness parameter becomes maximum in past adjustment (for example, an end part within a range of R1% of the DOF around the past peak position), or the like. Here, as one example, R1=20(%).

Then, the measurement light L1$i$ is caused to focus on the surface of the master M. Then, a surface shape of the master M is measured in a state where the measurement light L1$i$ is caused to focus on the surface of the master M (step S12), and a roughness parameter is calculated from a measurement result of the surface shape of the master M (step S14).

Then, the position of the reference surface 24$c$ is minutely moved (step S16), calculation of the roughness parameter is repeated, and a peak position of the roughness parameter (position at which the roughness parameter becomes maximum) is searched for (step S12 to step S18). Specifically, the peak position of the roughness parameter is searched for using a hill climbing method. In a case where the position of the reference surface 24$c$ at which the roughness parameter becomes a peak is detected (step S18: Yes), a loop from step S12 to step S18 ends.

Note that while in the present embodiment, an example of the hill climbing method has been described, the present invention is not limited to this, and local search algorithms other than the hill climbing method may be applied. Further, the maximum value (peak value) Po of the roughness parameter may be obtained by obtaining an approximate curve (such as, for example, least-square approximation or polynomial approximation) for the measured values of roughness parameters.

Then, in a case where the position of the reference surface 24$c$ at which the roughness parameter becomes a peak is detected, the reference surface 24$c$ is moved to the peak position of the roughness parameter (step S20).

According to the present embodiment, the master M having a periodic concave-convex pattern is used, so that it is possible to appropriately and effectively evaluate tendency using the roughness parameter. Further, an existing roughness parameter calculation program may be used, so that it is possible to implement adjustment of the shape measuring device 1C more easily. Still further, a filter is applied to the roughness parameter, and thus, the roughness parameter is not affected by inclination, distortion, or the like, of the master M, so that it is possible to evaluate the matching degree between the focus position and the interference position with high accuracy.

Further, an index indicating the matching degree between the focus position and the interference position may be calculated using a numerical value of the roughness parameter, so that it is possible to implement adjustment with high reproducibility and with high accuracy. Still further, adjustment of the shape measuring device 1C may be automated.

Example 2-1

Example 2-1 is an example in which particularly, arithmetic mean roughness Ra or Sa is utilized as the roughness parameter.

Figure 12:
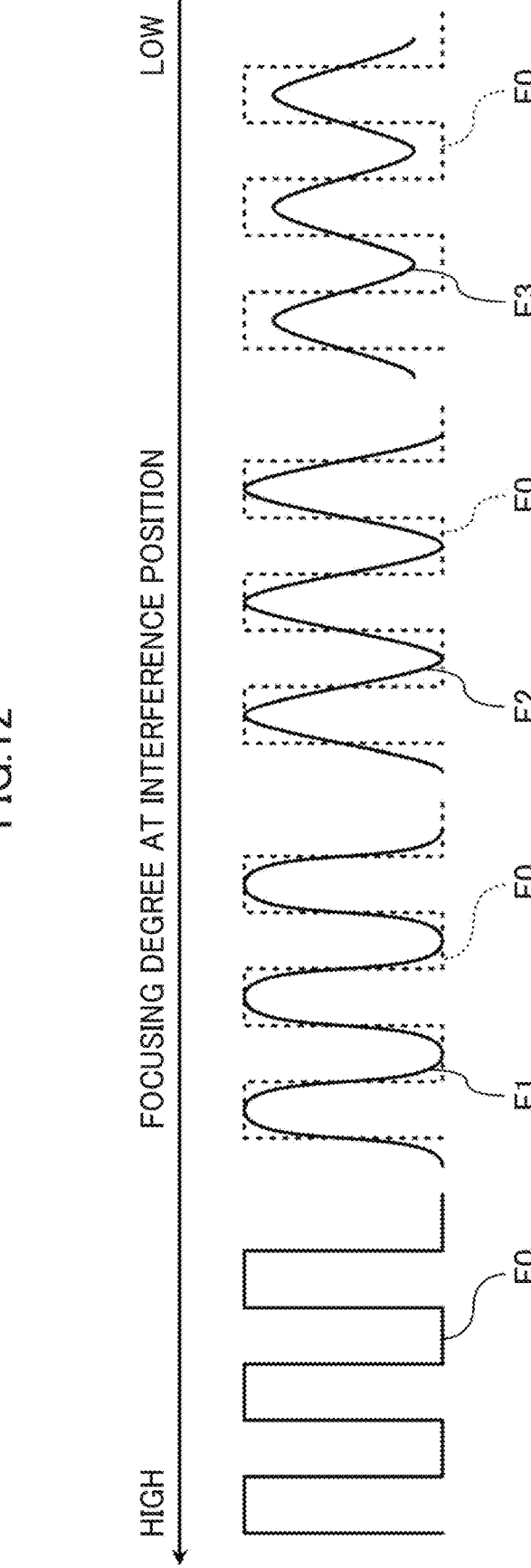
FIG. 12 is a view indicating a relationship between a focusing degree and a measured shape.

As illustrated in FIG. 12, as the focusing degree of the measurement light L1$i$ is made lower (if the measurement light L1$i$ is made more out of focus), gaps between the waveforms F1 to F3 of the measured shapes and the actual shape F0 become greater.

Here, at the interference position (in a case where the measurement light path length D1($b$) is equal to the reference light path length D2($b$)), in a case where the focusing degree is relatively high (in a case of the measurement shapes F1 and F2), there may be a case where a large difference does not occur in height of the peaks of the waveforms although the waveforms of the measured shapes collapse. In this case, it is sometimes difficult to accurately evaluate the focusing degree with the maximum height roughness Rz and Sz.

Thus, in Example 2-1, the arithmetic mean roughness Ra or Sa is used as the roughness parameter so as to make it possible to evaluate the roughness parameter in which collapse of the waveform is included. This enables adjustment of the interference position with higher accuracy.

Example 2-2

Figure 13:
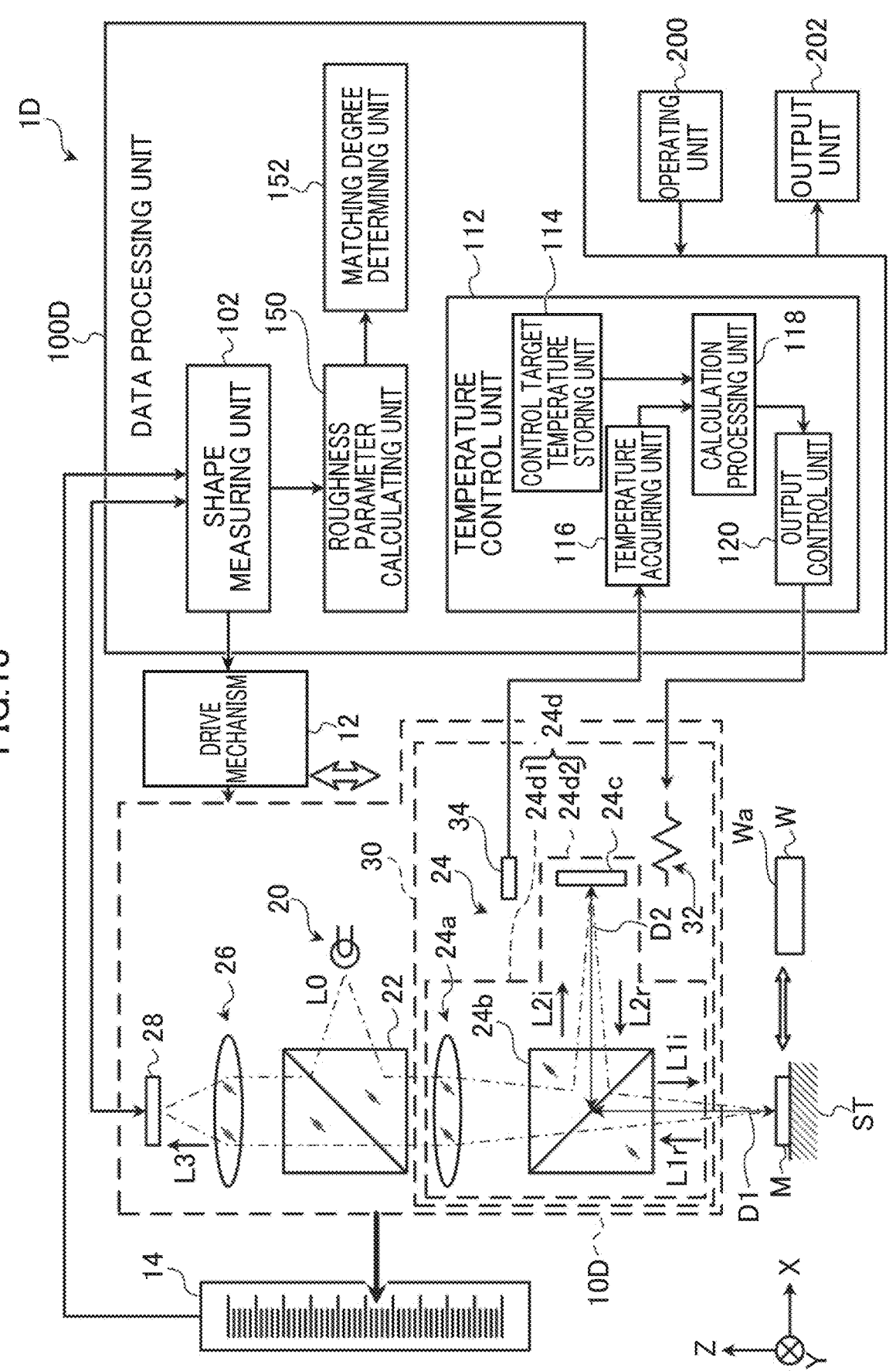
FIG. 13 is a view illustrating a shape measuring device according to Example 2-2.

FIG. 13 is a view illustrating a shape measuring device according to Example 2-2.

As illustrated in FIG. 13, a shape measuring device ID according to Example 2-2 adjusts the position of the reference surface 24$c$ using a temperature controller (the temperature sensor 34 and the temperature control unit 112)

As illustrated in FIG. 13, in a white light interferometry microscope 10D of the shape measuring device ID, the interference objective lens 24 includes the holder 24$d$.

The holder 24$d$ is formed of a metal material like, for example, brass, that is, a material that reversibly thermally deforms. The holder 24$d$ is provided with the lens barrel 24$d$1 and the reference surface storing part 24$d$2. The lens barrel 24$d$1 is formed in a cylindrical shape extending in the Z direction and stores (holds) the objective lens 24$a$ and the beam splitter 24$b$. The reference surface storing part 24$d$2 is formed in a cylindrical shape extending in the X direction from a position at which the beam splitter 24$b$ is held in the lens barrel 24$d$1, and stores the reference surface 24$c$.

The temperature adjusting unit 32, which is provided in the vicinity of the reference surface storing part 24$d$2, adjusts at least the temperature between the beam splitter 24$b$ and the reference surface 24$c$, that is, the temperature of the reference surface storing part 24$d$2 under control of the temperature control unit 112. As the temperature adjusting unit 32, for example, a heater, a Peltier element, or the like, is used.

The reference surface storing part 24$d$2 is formed of a material that reversibly thermally deforms, and thus, reversibly thermally deforms (expands, shrinks) in accordance with temperature change. By this means, it is possible to thermally deform the reference surface storing part 24$d$2 according to the temperature of the reference surface storing part 24$d$2 changed by the temperature adjusting unit 32, thereby adjusting the position of the reference surface 24$c$ in the X direction in accordance with the thermal deformation.

The temperature sensor 34 corresponds to a temperature measuring unit of the present invention. The temperature sensor 34, which is provided in the vicinity of the reference surface storing part 24$d$2, measures a temperature of at least the reference surface storing part 24$d$2 (between the beam splitter 24$b$ and the reference surface 24$c$) in the holder 24$d$ and outputs the temperature measurement result to the temperature acquiring unit 116 of the temperature control unit 112. The measurement result of the temperature sensor 34 is utilized for controlling the temperature adjusting unit 32 by the temperature control unit 112.

The heat insulating material 30 is provided to cover the whole of the interference objective lens 24, the temperature adjusting unit 32 and the temperature sensor 34. This prevents the temperature inside the heat insulating material 30, particularly, the temperature of the reference surface storing part 24$d$2 and in the vicinity of the reference surface storing part 24$d$2 from changing by being affected by outside.

As illustrated in FIG. 13, the temperature control unit 112 of the data processing unit 100D includes the control target temperature storing unit 114, the temperature acquiring unit 116, the calculation processing unit 118 and the output control unit 120.

The control target temperature storing unit 114 stores a look-up table LUT indicating a correspondence relationship among the temperature inside the holder 24$d$ (for example, the temperature of the reference surface storing part 24$d$2, the temperature between the beam splitter 24$b$ and the reference surface 24$c$), and the position of the reference surface 24$c$ (position in the X direction).

The calculation processing unit 118 calculates an output of the temperature adjusting unit 32 necessary for moving the reference surface 24$c$ to the target set position with reference to the LUT stored in the control target temperature storing unit 114. Specifically, the calculation processing unit 118 reads out the temperature inside the holder 24$d$ (control target temperature) corresponding to the target set position of the reference surface 24$c$ from the LUT and calculates an output of the temperature adjusting unit 32 for adjusting the temperature inside the holder 24$d$ to the control target temperature.

The output control unit 120 controls the output of the temperature adjusting unit 32 based on the calculation result by the calculation processing unit 118 to adjust the temperature inside the holder 24$d$ to the control target temperature. Here, the temperature inside the holder 24$d$ may be controlled by, for example, feedback control, proportional-integral-differential controller (PID) control, or the like.

According to Example 2-2, the position of the reference surface 24$c$ may be managed using a numerical value of the temperature, so that it is possible to perform adjustment with higher accuracy, higher resolution and higher reproducibility.

Modification

Figure 14:
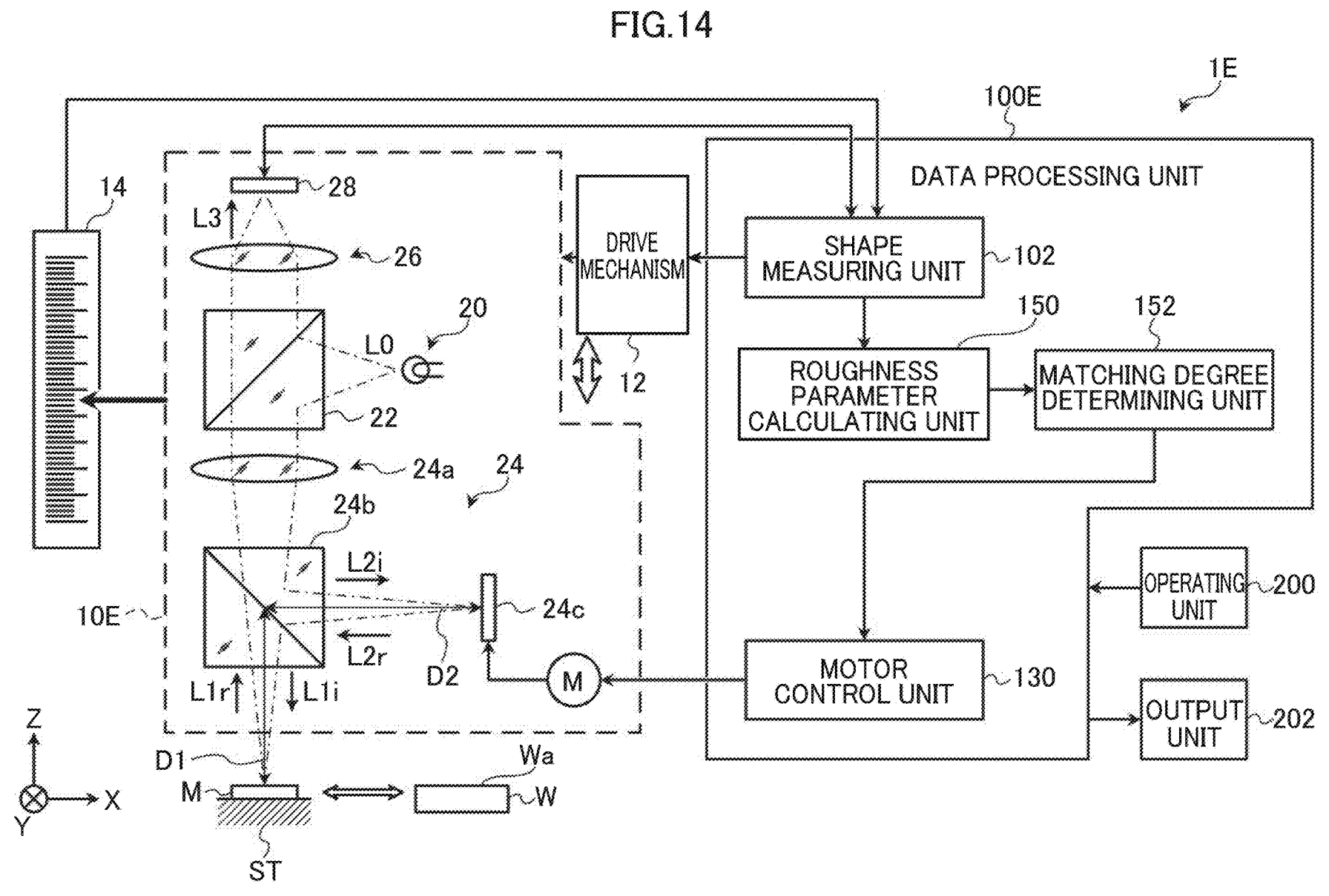

FIG. 14 is a view illustrating a shape measuring device according to a modification of Example 2-2.

As illustrated in FIG. 14, a shape measuring device 1E according to the modification adjusts the position of the reference surface 24$c$ in a white light interferometry microscope 10E using a linear motion mechanism with the motor M.

The motor control unit 130 of a data processing unit 100E acquires the position of the reference surface 24$c$ in the X direction, and controls (feedback control, PID control) a rotation amount of the motor M to move the reference surface 24$c$ to the target set position.

According to the modification, the position of the reference surface 24$c$ may be controlled using the motor M, so that it is possible to perform adjustment with higher accuracy, higher resolution and higher reproducibility.

Note that while in the present modification, the linear motion mechanism using the motor M is employed, the present invention is not limited to this. For example, a linear motion mechanism using an actuator such as a piezoelectric element may be also employed.

Example 2-3

According to Example 2-3, a relationship between the roughness parameter and the position of the reference surface 24c is acquired in advance, so that the position of the reference surface 24c may be confirmed with reference to the roughness parameter obtained by measuring the master M and the relationship. Here, as the relationship between the roughness parameter and the position of the reference surface 24c, one of the following examples may be used: a correlation graph (see a graph G1 in FIG. 15) indicating a correlation between the value of the roughness parameter and the position of the reference surface 24c (relative position); a table indicating a correspondence relationship between a maximum value of the roughness parameter and the target set position of the reference surface 24c; and the like.

In Example 2-3, first, the master M is measured by the data processing unit 100 (100C to 100E), and the value of the roughness parameter is calculated from the measurement result of the master M. Then, it is inspected whether the position of the reference surface 24c is displaced from the target set position, with reference to the relationship between the roughness parameter and the position of the reference surface 24c.

Figure 15:
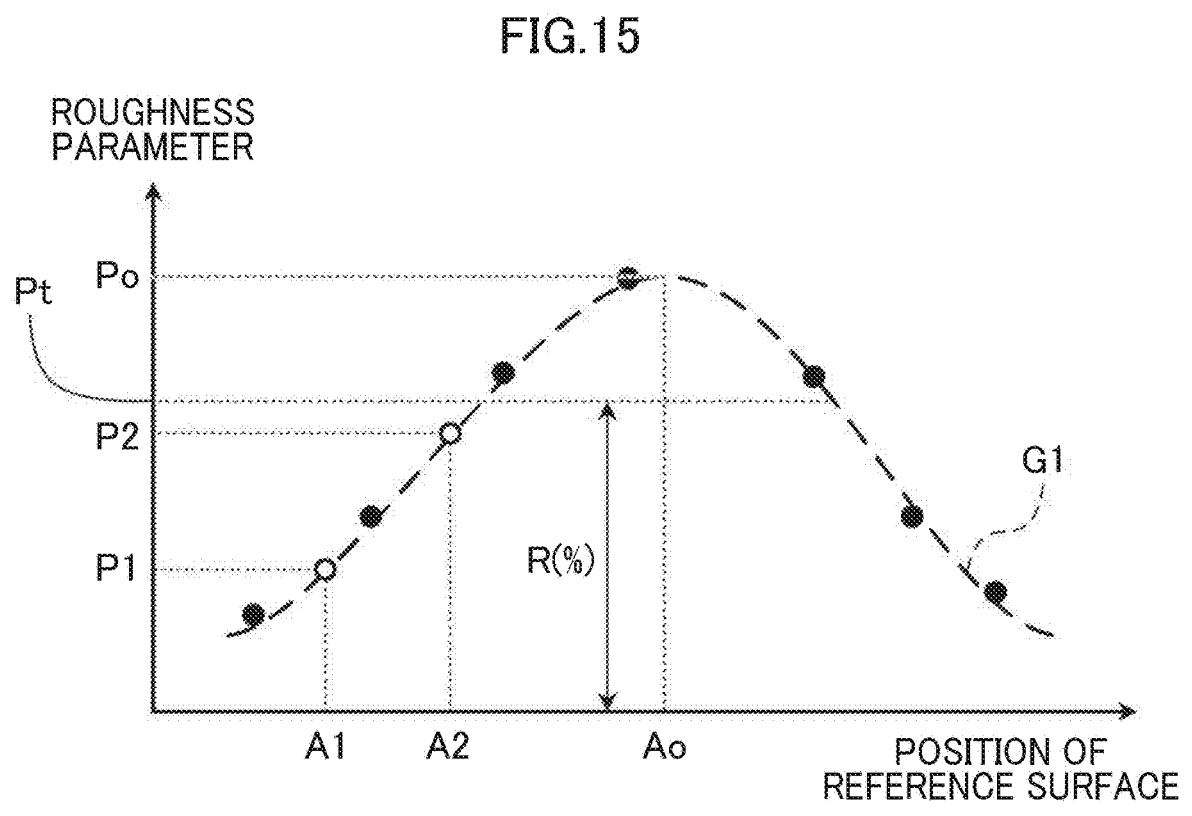

For example, inspection standards are created, such as "in a case where the roughness parameter becomes a value equal to or less than a predetermined ratio R (%) with respect to the maximum value Po of the roughness parameter, readjustment of the shape measuring device 1 (1C to 1E) is required" in the relationship between the roughness parameter and the position of the reference surface 24c illustrated in FIG. 15. Note that R=75% as one example.

In a case where the value of the roughness parameter obtained as a result of measurement of the master M is equal to or less than Pt=R×Po, the shape measuring device 1 (1C to 1E) starts adjustment of the position of the reference surface 24c. Specifically, first, the master M is measured while changing the position of the reference surface 24c to at least two positions, and the roughness parameter is calculated for each of the at least two positions of the reference surface 24c. Here, concerning the two positions A1 and A2 of the reference surface 24c, it is assumed that only a relative position A2–A1 (that is, a relative positional relationship (distance) between the position A1 and the position A2 in the X direction) is known, and absolute positions (coordinates in the X direction) are not known.

Then, the roughness parameters P1 and P2 respectively at the positions A1 and A2 are calculated. Then, as illustrated in FIG. 15, the roughness parameters P1 and P2 are superimposed on the correlation graph G1, to obtain a positional relationship (a direction and a distance of movement) between the position A1 or A2 of the reference surface 24c and the target set position Ao.

Next, the reference surface 24c is moved to the target set position Ao, from the position A1 or A2 as a point of origin (movement start position) based on this positional relationship.

According to Example 2-3, by using the correlation graph G1, a direction and a distance of movement from the movement start position (A1 or A2) of the reference surface 24c to the target set position Ao may be calculated.

Here, while in Example 2-3, the roughness parameters for at least two positions of the reference surface 24c are calculated, the present invention is not limited to this. For example, in a case where a direction of increase or decrease of the correlation graph G1 is known, a direction and a distance of movement to the target set position Ao may be calculated only from one position of the reference surface 24c. A direction of increase or decrease of the correlation graph G1 may be specified from a magnitude relationship between the roughness parameters P1 and P2, and a direction and a distance of the movement to the target set position Ao may be calculated from either one of (A1, P1) and (A2, P2), and the correlation graph G1.

Example 2-4

While in Example 2-3, the position of the reference surface 24c is readjusted by measuring the master M, it is also possible to inspect a state of the reference surface 24c by measuring the master M at a predetermined timing.

For example, there is be a case where the focus position is displaced from the interference position due to use for a long period or change of an environmental temperature. In such a case, there is a concern that the shape measuring device is continued to be used in a state where measurement accuracy is low.

Thus, because the master M is periodically measured and the roughness parameter is calculated to refer to the matching degree between the focus position and the interference position, it is possible to detect the state where sensitivity is low as described above. This makes it possible to improve reliability of the shape measuring device.

Further, it is also possible to automatically perform adjustment so that the focus position matches the interference position, based on decrease in the roughness parameter as a trigger. This makes it possible to provide a shape measuring device with higher reliability.

Figure 16:
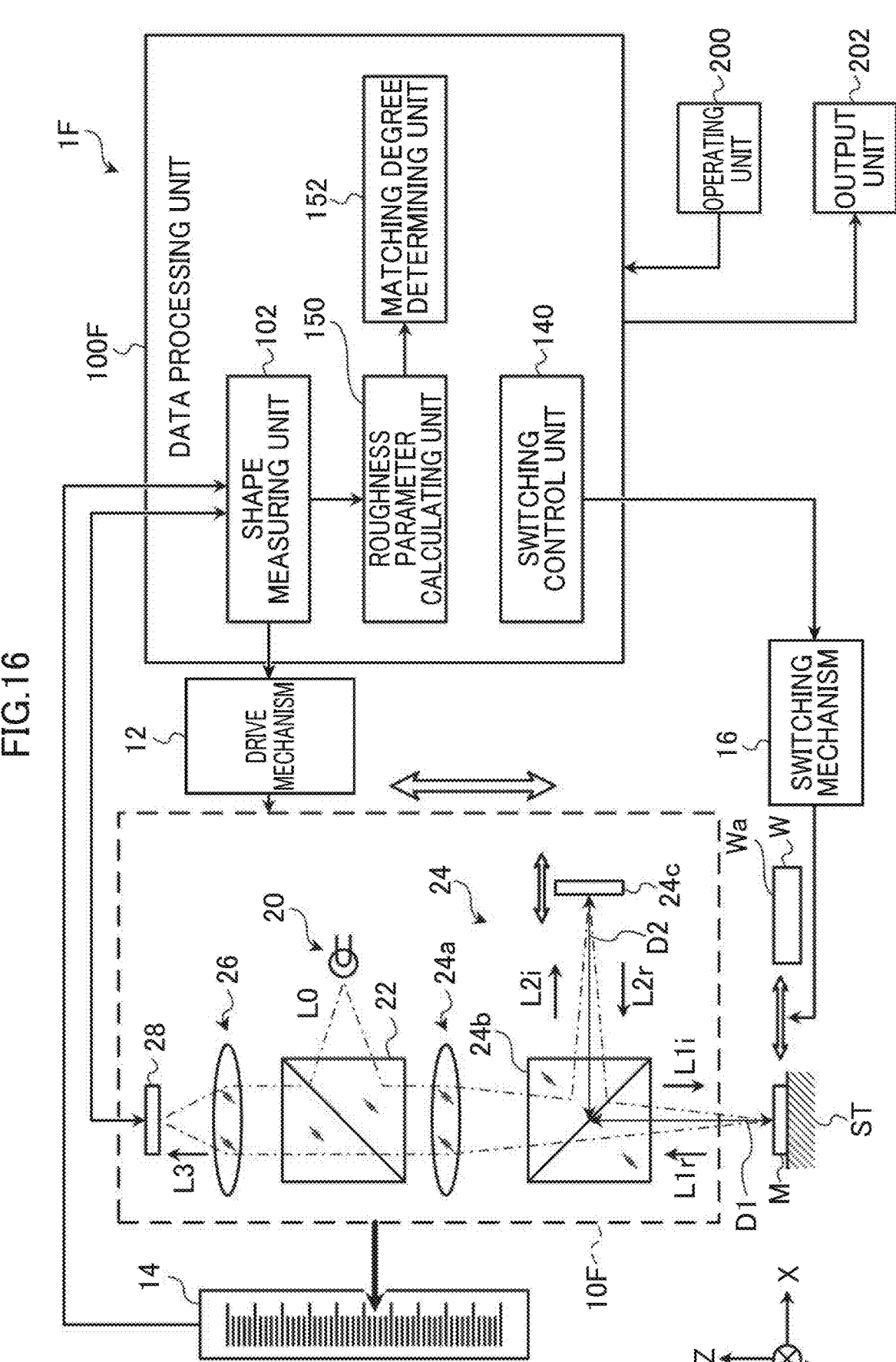
FIG. 16 is a view illustrating a shape measuring device according to Example 2-4.

A specific example of a shape measuring device according to Example 2-4 will be described below. FIG. 16 is a view illustrating the shape measuring device according to Example 2-4.

As illustrated in FIG. 16, a shape measuring device 1F according to the present example includes the switching mechanism 16 which selectively inserts (moves) the master M and the measurement target W on the optical path of the measurement light L1i. In the shape measuring device 1F, the switching mechanism 16 may perform switching between the master M and the measurement target W, so that the state of the reference surface 24c may be inspected by measuring the master M at a predetermined timing.

As the switching mechanism 16, for example, a mechanism for moving the stage ST on which the master M and the measurement target W are placed using an actuator, a motor, and the like, or, a robot arm for moving the master M and the measurement target W to the stage ST and the like, may be used.

The switching control unit 140 of a data processing unit 100F controls the switching mechanism 16 at a predetermined timing to perform switching between the master M and the measurement target W.

(Timing for Confirming Matching Degree)

As a timing (time condition) for confirming the matching degree using the master M, the following examples may be considered.

(a) Confirmation is performed in a case where the number of times that the measurement target W is measured exceeds a fixed value. In this case, it is possible to limit a maximum number of times of that the measurement target W is measured in a poor adjustment state by limiting the number of times that the measurement is performed.

(b) Confirmation is performed after a fixed period or a fixed number of days has elapsed. In this case, even in a case where the measurement target W is measured in a poor adjustment state, it is possible to specify the measurement target W and measurement data measured in the poor adjustment state according to measurement date, or the like. This makes it possible to easily trace the measurement data measured in the poor adjustment state, so that it is possible to perform measurement again.

(c) Confirmation is performed when a batch (such as, for example, a lot) of measurement is started. In this case, the measurement target W for which measurement is executed in a poor adjustment state is limited in the batch. This makes it possible to easily trace measurement data measured in the poor adjustment state, so that it is possible to perform measurement again.

Note that the timing for performing confirmation is not limited to the examples described above. The shape measuring device 1 (1C to 1F) may be configured such that the operator may select or set one of (a) to (c) described above, or a combination of (a) to (c).

Example 2-5

In Example 2-5, a master M1 in which the same pattern is repeated in a range that sufficiently covers a field of view of the objective lens 24a is used as the master M for adjusting the shape measuring device 1 (1C to 1F). As such a master M1, for example, a Ronchi-ruling, a phase grating, a diffraction grating, or the like, may be used.

Figure 17:
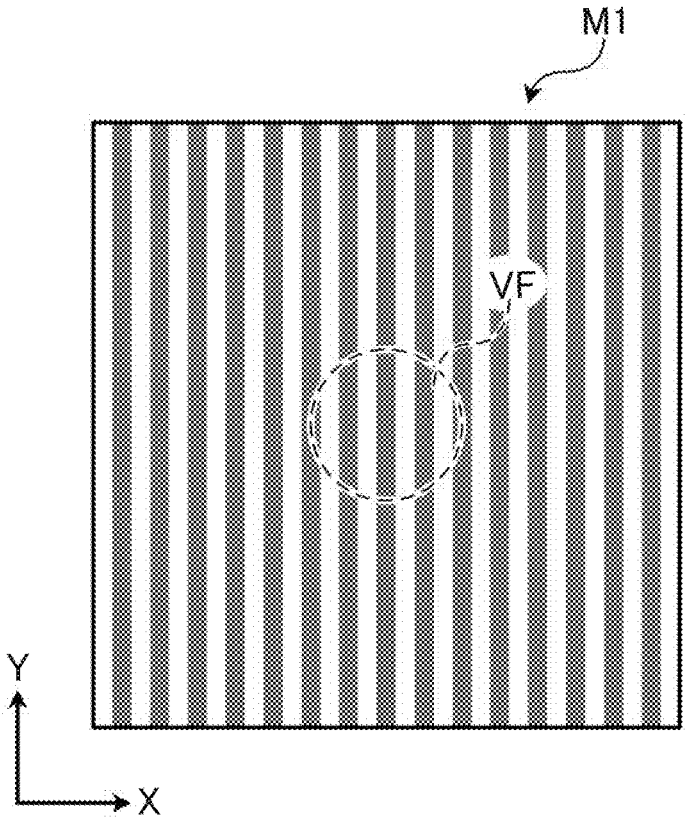
FIG. 17 is a plan view illustrating an example of a master according to Example 2-5.

FIG. 17 is a plan view illustrating an example of the master according to Example 2-5. The example illustrated in FIG. 17 is an example where a Ronchi-ruling is used as the master M1. In FIG. 17, a reference character VF designates a range of a field of view of the objective lens 24a. The Ronchi-ruling is, for example, a pattern with stripes at regular intervals formed by depositing chrome on a glass substrate, performing etching processing, and filling the substrate subjected to the etching processing with a black coating material.

According to Example 2-5, an image with a fixed pitch may be acquired in the entire region of the range of the field of view VF of the objective lens 24a. In other words, the same information may be utilized in the entire region of the range of the field of view VF, which facilitates statistical processing and enables high-accuracy adjustment.

Further, according to Example 2-5, the image obtained via the objective lens 24a does not depend on relative positioning accuracy between the master M1 and the white light interferometry microscope 10 (10C to 10F), so that it is possible to perform adjustment and confirmation with high reproducibility and high reliability.

Example 2-6

Example 2-6 enables measurement while rotating the master M1 that is similar to the master in Example 2-5. The shape measuring device 1 (1C to 1F) according to Example 2-6 may rotate the stage ST around the Z axis.

Figure 18:
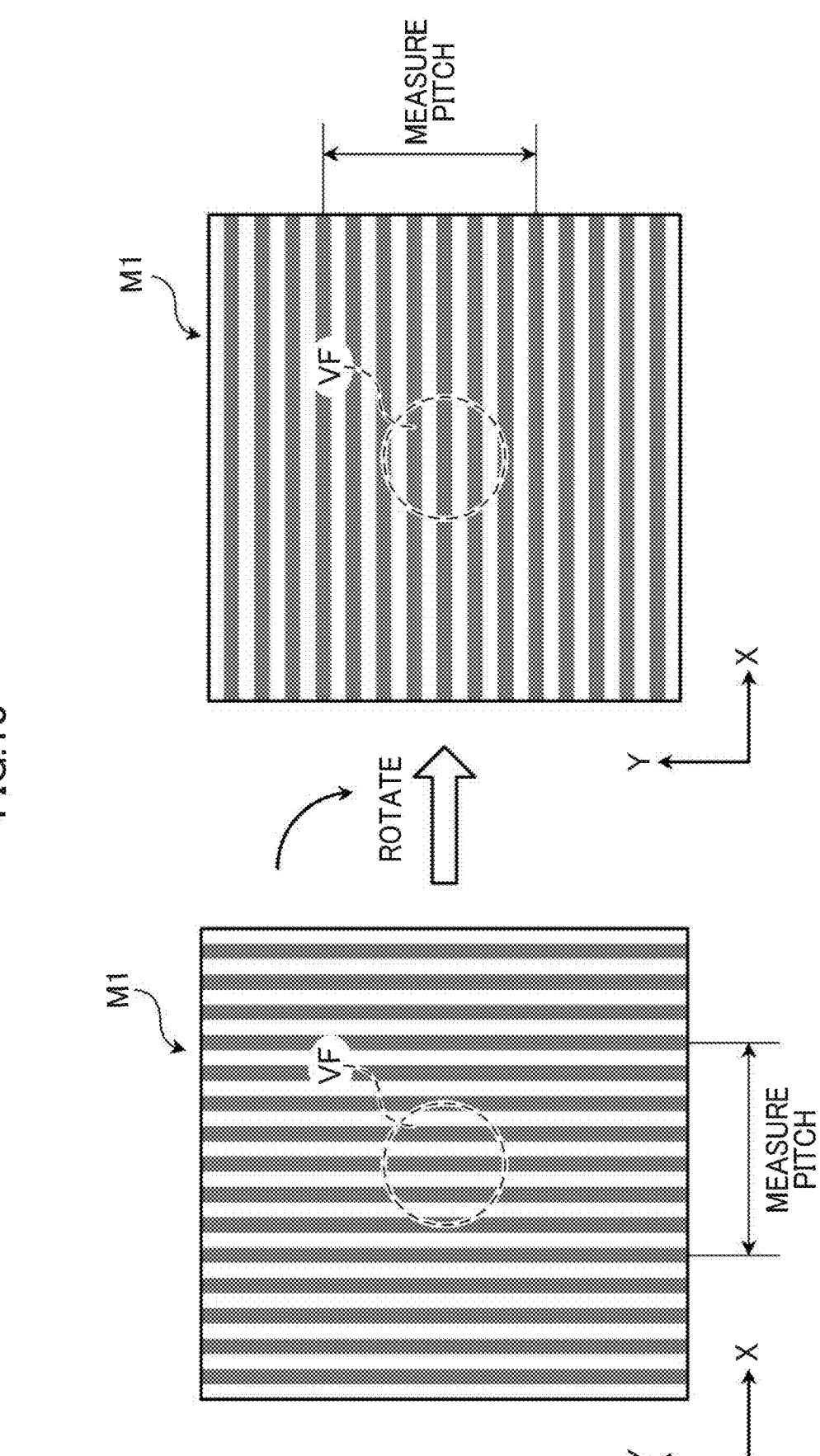
FIG. 18 is a plan view illustrating an example of a master according to Example 2-6.

According to Example 2-6, as illustrated in FIG. 18, the focus position and optical axis displacement in each of the X direction and the Y direction may be confirmed by rotating the master M1 by 90 degrees. By this means, it is possible to detect the optical axis displacement in the X direction and the Y direction of a lens barrel of the white light interferometry microscope 10 (10C to 10F). Further, it is possible to confirm pitch errors in the X direction and the Y direction at the same time.

Example 2-7

Example 2-7 is an example in which a master M2 in which the same pattern is repeated in two directions in a range that sufficiently covers a field of view of the objective lens 24a is used as the master M for adjusting the shape measuring device. As such a master M2, a master having a periodic structure along two directions that are perpendicular to each other may be employed. For example, a master in which a checkered pattern is formed on its surface may be employed.

Figure 19:
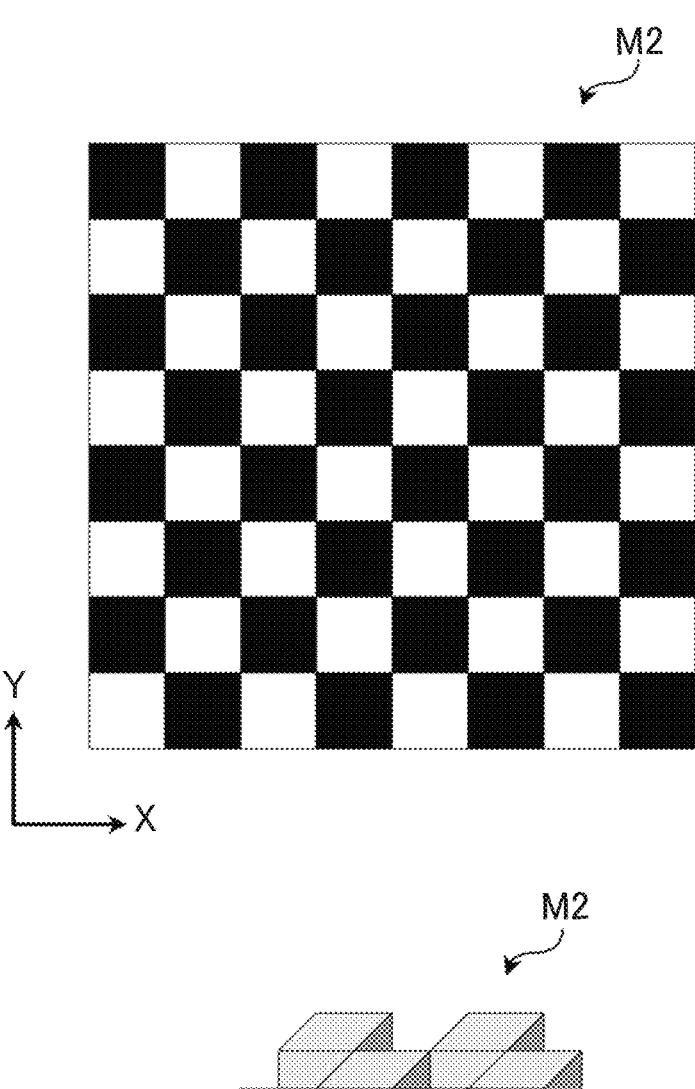
FIG. 19 is a plan view and a perspective view illustrating an example of a master according to Example 2-7.
Figure 20:
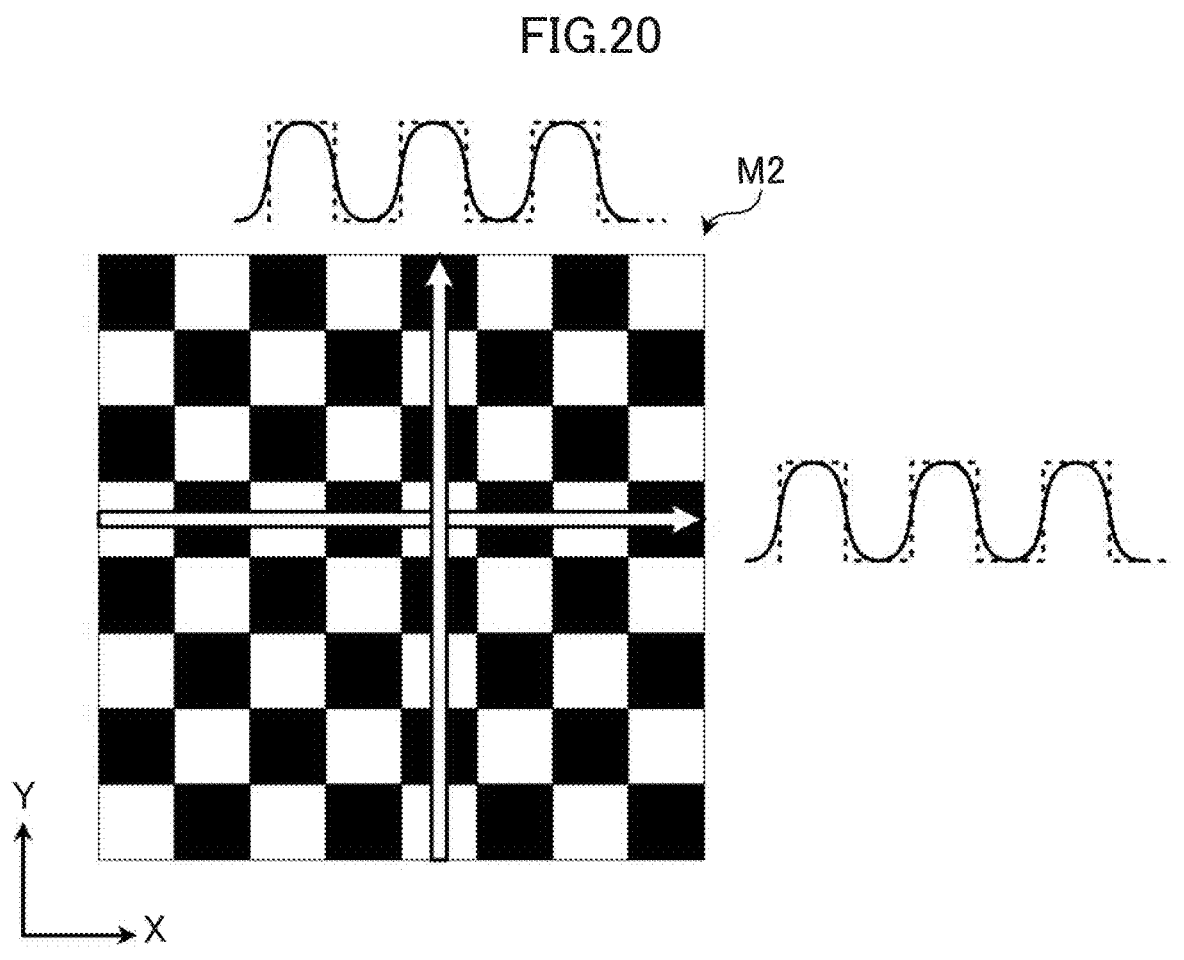

FIG. 19 is a plan view and a perspective view illustrating an example of the master on which a checkered pattern is formed. FIG. 20 is a view illustrating an evaluation result (gap between the actual shape and the measured shape) of the focusing degree in a cross-section in each of the X direction and the Y direction in a case where the master illustrated in FIG. 19 is used.

According to Example 2-7, it is possible to confirm the focus position and optical axis displacement in each of the X direction and the Y direction. This makes it possible to detect optical axis displacement in the X direction and the Y direction of the lens barrel of the white light interferometry microscope 10 (10C to 10F). Further, by limiting calculation of the measured shape to one of the X direction and the Y direction, it is possible to detect optical axis displacement for each direction. Still further, it is possible to confirm pitch errors in the X direction and the Y direction at the same time.

Here, while a case where a checkered pattern is used has been described in Example 2-7 similar effects may be obtained also with, for example, a grid chart in which grids are formed at equal intervals in directions perpendicular to each other. Further, while in the example illustrated in FIG. 19 and FIG. 20, a pattern in which a square pattern is repeated at equal intervals in the X direction and the Y direction is used, repetition of a rectangular pattern or repetition of a parallelogram pattern may also be used. Even in a case of repetition of a rectangular pattern or repetition of a parallelogram pattern, it is possible to detect optical axis displacement in a direction perpendicular to each side of the pattern.

[Shape Measuring Device According to Third Embodiment]

Figure 21:
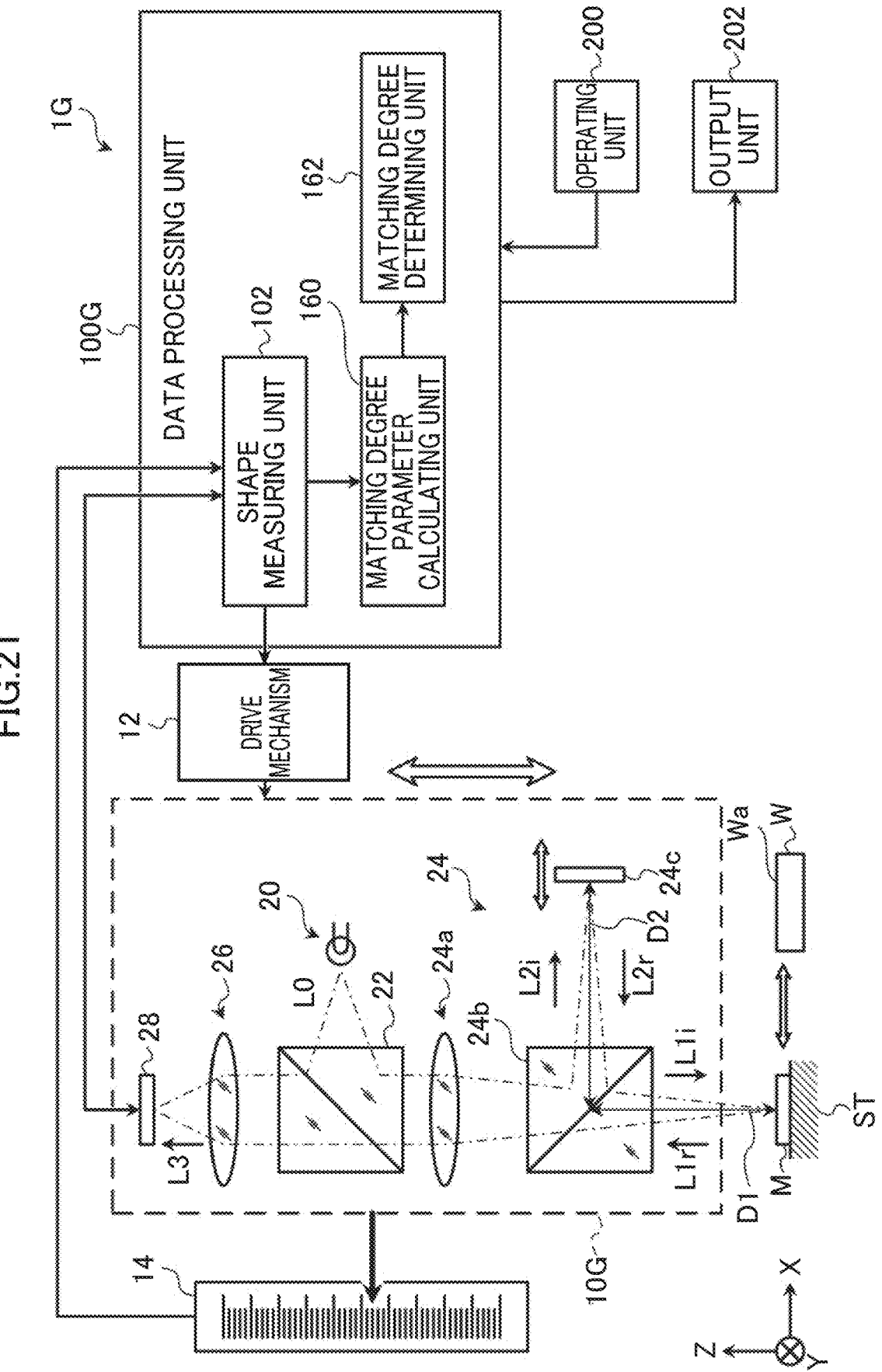
FIG. 21 is a view illustrating a shape measuring device according to a third embodiment of the present invention.

FIG. 21 is a view illustrating a shape measuring device according to a third embodiment of the present invention. Note that X and Y directions among X, Y and Z directions perpendicular to each other in the drawing are directions parallel to the horizontal direction, and the Z direction is a direction parallel to the vertical direction.

As illustrated in FIG. 21, a shape measuring device 1G includes a white light interferometry microscope 10G, the drive mechanism 12, the scale 14, and a data processing unit 100G.

The white light interferometry microscope 10G is a Michelson-type scanning white light interferometry microscope. The white light interferometry microscope 10G includes the light source unit 20, the beam splitter 22, the interference objective lens 24, the imaging lens 26 and the camera 28. The interference objective lens 24, the beam splitter 22, the imaging lens 26 and the camera 28 are arranged in this order from the surface to be measured Wa toward the upper side along the Z direction. Further, the light source unit 20 is arranged at a position facing the beam splitter 22 in the X direction (or may be the Y direction).

The light source unit 20 emits white light L0 (low-coherence light with low coherence) of a parallel light flux toward the beam splitter 22 under control of the data processing unit 100G. While not illustrated, the light source unit 20 includes a light source capable of emitting the white light L0, such as a light-emitting diode, a semiconductor laser, a halogen lamp and a high-brightness discharge lamp, and a collector lens that converts the white light L0 emitted from the light source into a parallel light flux.

As the beam splitter 22, for example, a half mirror is used. The beam splitter 22 reflects part of the white light L0 incident from the light source unit 20 toward the interference objective lens 24 on the lower side in the Z direction as the measurement light L1$i$. Further, the beam splitter 22 allows part of the multiplexed light L3 (described later) which is incident from the interference objective lens 24 to pass therethrough toward the upper side in the Z direction so as to emit the multiplexed light L3 toward the imaging lens 26.

The interference objective lens 24, which is a Michelson-type lens, includes the objective lens 24$a$, the beam splitter 24$b$ and the reference surface 24$c$. The beam splitter 24$b$ and the objective lens 24$a$ are arranged in this order from the surface to be measured Wa toward the upper side along the Z direction. The reference surface 24$c$ is arranged at a position facing the beam splitter 24$b$ in the X direction (or may be the Y direction). While description will be provided below using a Michelson-type interference optical system, the interference optical system is not limited to the Michelson type. Other publicly known interference optical systems such as a Mirau type and a Linic type may be employed. The objective lens 24$a$ has a focusing function and causes the measurement light L1 incident from the beam splitter 22 to focus on the surface to be measured Wa through the beam splitter 24$b$.

The beam splitter 24$b$ corresponds to an interfering unit of the present invention. As the beam splitter 24$b$, for example, a half mirror is used. The beam splitter 24$b$ splits part of the white light L0 incident from the objective lens 24$a$ as the reference light L2$i$, and reflects the reference light L2$i$ toward the reference surface 24$c$. The beam splitter 24$b$ allows the other part of the white light L0 as measurement light L1$i$ to pass therethrough so as to emit the remaining measurement light L1$i$ to the surface to be measured Wa. Note that a reference numeral D1 in the drawing designates a measurement light path length that is an optical path length of the measurement light L1 between the beam splitter 24$b$ and the surface to be measured Wa. The measurement light L1$i$ that has passed through the beam splitter 24$b$ is radiated on the surface to be measured Wa, then reflected by the surface to be measured Wa and returns to the beam splitter 24$b$.

As the reference surface 24$c$, for example, a reflecting mirror is used, and the reference surface 24$c$ reflects the reference light L2$i$ incident from the beam splitter 24$b$ toward the beam splitter 24$b$. A position of the reference surface 24$c$ in the X direction may be manually adjusted using a position adjustment mechanism (not illustrated) (such as, for example, a ball screw mechanism and an actuator). This enables adjustment of a reference light path length D2 that is an optical path length of the reference light L2 between the beam splitter 24$b$ and the reference surface 24$c$. The reference light path length D2 is adjusted so as to be equal (including roughly equal) to the measurement light path length D1.

The beam splitter 24$b$ generates the multiplexed light L3 of the measurement light L1 returning from the surface to be measured Wa and the reference light L2 returning from the reference surface 24$c$ and emits the multiplexed light L3 toward the objective lens 24$a$ on the upper side in the Z direction. The multiplexed light L3 passes through the objective lens 24$a$ and the beam splitter 22 and is incident on the imaging lens 26.

The imaging lens 26 forms an image of the multiplexed light L3 incident from the beam splitter 22 on an imaging surface (not illustrated) of the camera 28. Specifically, the imaging lens 26 forms an image of a point on a focal plane of the objective lens 24$a$ on the imaging surface of the camera 28 as an image point.

The camera 28 includes a charge coupled device (CCD)-type or a complementary metal oxide semiconductor (CMOS)-type imaging element (not illustrated). The camera 28 captures an image of the multiplexed light L3 formed on the imaging surface by the imaging lens 26, performs signal processing on an imaging signal of the multiplexed light L3 obtained by the imaging and outputs a captured image.

The drive mechanism 12 corresponds to a scanning unit of the present invention. The drive mechanism 12 includes a linear motor or a motor drive mechanism and holds the white light interferometry microscope 10G so as to be movable in the Z direction that is a scanning direction. The drive mechanism 12 causes the white light interferometry microscope 10G to scan along the Z direction under control of the data processing unit 100G.

Note that the drive mechanism 12 is only required to be able to cause the white light interferometry microscope 10G to scan in the Z direction relatively with respect to the surface to be measured Wa and, for example, may cause the surface to be measured Wa (supporting part that supports the surface to be measured Wa) to scan in the Z direction.

The scale 14 is a position detection sensor that detects a position of the white light interferometry microscope 10G in the Z direction. For example, a linear scale is used as the scale 14. The scale 14 repeatedly detects the position of the white light interferometry microscope 10G in the Z direction and repeatedly outputs the position detection result to the data processing unit 100G.

The data processing unit 100G controls operation of measuring a three-dimensional shape of the surface to be measured Wa by the white light interferometry microscope 10G (shape measuring device 1G) and calculates, or the like, the three-dimensional shape of the surface to be measured Wa in accordance with input of operation from the operating unit 200. The data processing unit 100G includes a processor (for example, a central processing unit (CPU), a graphics processing unit (GPU)) that executes various kinds of calculation, a memory (such as, for example, a read only memory (ROM) and a random access memory (RAM)) that becomes a work area of the processor, and a storage device (such as, for example, a solid state drive (SSD) and a hard disk drive (HDD)) for storing various kinds of programs and data.

The data processing unit 100G executes the programs stored in the storage using the processor so as to implement various kinds of functions (the shape measuring unit 102, the matching degree parameter calculating unit 160 and the matching degree determining unit 162) which will be described later.

Note that the functions of the data processing unit 100G may be implemented by one processor or may be implemented by processors of the same type or different types.

Further, the functions of the data processing unit 100G may be implemented by a general-purpose computer.

The operating unit 200 includes an operating member (such as, for example, a keyboard and a mouse) for accepting input of operation of the operator to the data processing unit 100G.

The output unit 202 is a device for outputting execution results of the programs by the data processing unit 100G, data of calculation results, and the like. The output unit 202 includes, for example, a monitor (such as, for example, a liquid crystal display) for displaying an operation user interface (UI) and detection results. Further, the output unit 202 may include a printer, a speaker, and the like, in addition to or in place of the monitor.

[Adjustment Procedure of Shape Measuring Device According to Third Embodiment]

The data processing unit 100G calculates a matching degree parameter indicating a degree of match between the focus position and the interference position (matching degree parameter indicating a matching degree for causing the measurement light L1*i* to focus on the master M and for causing the measurement light L1*r* to interfere with the reference light L2*r*) using the measurement result of the master M for adjustment (hereinafter, referred to as a "master M"). Then, the degree of match between the focus position and the interference position is evaluated using the matching degree parameter, and the shape measuring device 1G can be adjusted.

(Matching Degree Parameter)

Procedure of calculating the matching degree parameter will be described next.

In the present embodiment, using the master M on which the pattern is printed as a measurement target, an image of a pattern of the surface of the master M is repeatedly acquired while causing the white light interferometry microscope 10G to scan in the Z direction by the drive mechanism 12.

Here, as the master M, for example, a flat material in which any shape pattern is formed on its surface may be used. As the pattern to be formed on the surface of the master M, for example, all or part of patterns to be used in various kinds of resolution charts, for example, a radial pattern (star chart), a checkered pattern, a grid chart, the United States Air Force MIL-STD-150A standard of 1951 (USAF 1951 target), a resolution chart complying with international organization for standardization (ISO) 12233 (a resolution chart of camera & imaging products association (CIPA)), and the like, may be used. Further, as the master M, a roughness scale (such as, for example, a pseudo roughness scale and a random shape roughness scale) may be also used. Note that a type of the shape pattern is not limited to those described above.

Figure 22:
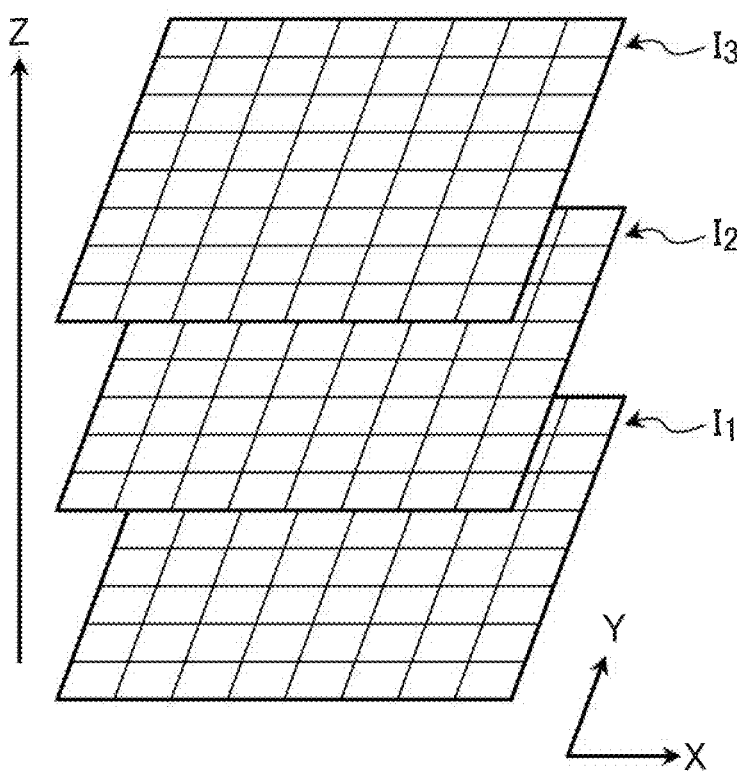
FIG. 22 is a view illustrating an image of the master acquired for each of scanning positions.

The data processing unit 100G acquires an image I*i* of the master M for each scanning position Z*i* from the white light interferometry microscope 10G. Here, i is a frame number indicating a scanning position in the Z direction, and i=1, 2, . . . , N (N≥2) (see FIG. 22).

The matching degree parameter calculating unit 160 calculates each of a first parameter (an evaluation parameter of lateral contrast. Hereinafter, referred to as a "lateral contrast parameter") regarding the X and the Y directions on a screen (XY plane) of the camera 28, and a second parameter (an evaluation parameter of longitudinal contrast. Hereinafter, referred to as a "longitudinal contrast parameter") regarding a time axis direction (that is, the frame number or the Z direction). Then, the matching degree parameter calculating unit 160 calculates a matching degree parameter for each scanning position Z*i* from the correlation between the lateral contrast parameter and the longitudinal contrast parameter, and the scanning position in the Z direction.

The matching degree determining unit 162 calculates a position of the reference surface 24*c* at which the matching degree becomes the maximum from the matching degree parameter for each scanning position Z*i*.

This makes it possible to move the reference surface 24*c* to a position at which the matching degree becomes the maximum, so that the shape measuring device 1G may be easily adjusted.

FIGS. 23A, 23B, 24A and 24B are views which respectively explain calculation examples of the lateral contrast parameter and the longitudinal contrast parameter. In the following description, luminance at a pixel (x, y) in the image I*i* is set as $P_{i(x, y)}$.

Figure 23A:
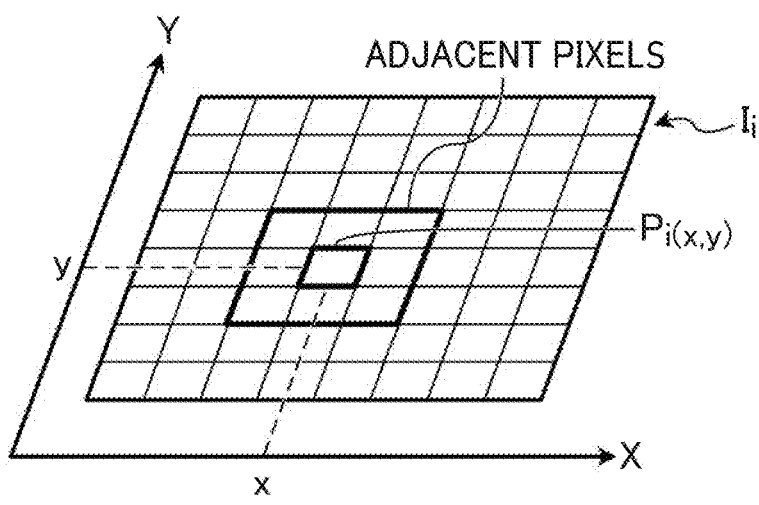
FIGS. 23A and 23B are views for explaining a calculation example of a lateral contrast parameter.

In a case where the lateral contrast parameter is calculated, a difference $Cp_{i(x, y)}$ in luminance between the pixel (x, y) in the image I*i* and each of adjacent pixels ((x−1, y−1), (x−1, y), (x−1, y+1), (x, y−1), (x, y+1), (x+1, y−1), (x+1, y), and (x+1, y+1)) illustrated in FIG. 23A is calculated.

Figure 23B:
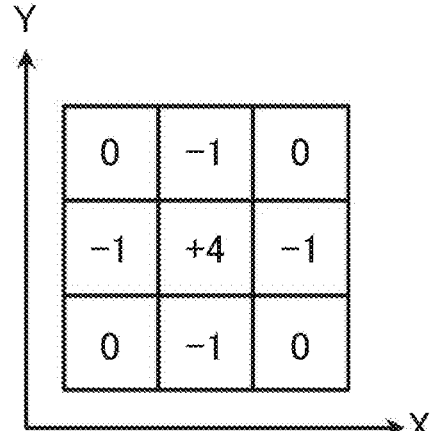

Specifically, $Cp_{i(x, y)}$ may be obtained by multiplying a luminance value $P_{i(x, y)}$ of the pixel (x, y) and its adjacent pixels by a kernel (coefficient) shown in FIG. 23B. In a case where the kernel (coefficient) shown in FIG. 23B is applied, $Cp_{i(x, y)}$ may be expressed with the following expression (1).

$$Cp_{i(x,y)} = |4 \times P_{i(x,y)} - P_{i(x-1,y)} - P_{i(x+1,y)} - P_{i(x,y-1)} - P_{i(x,y+1)}| \qquad (1)$$

Figure 24A:
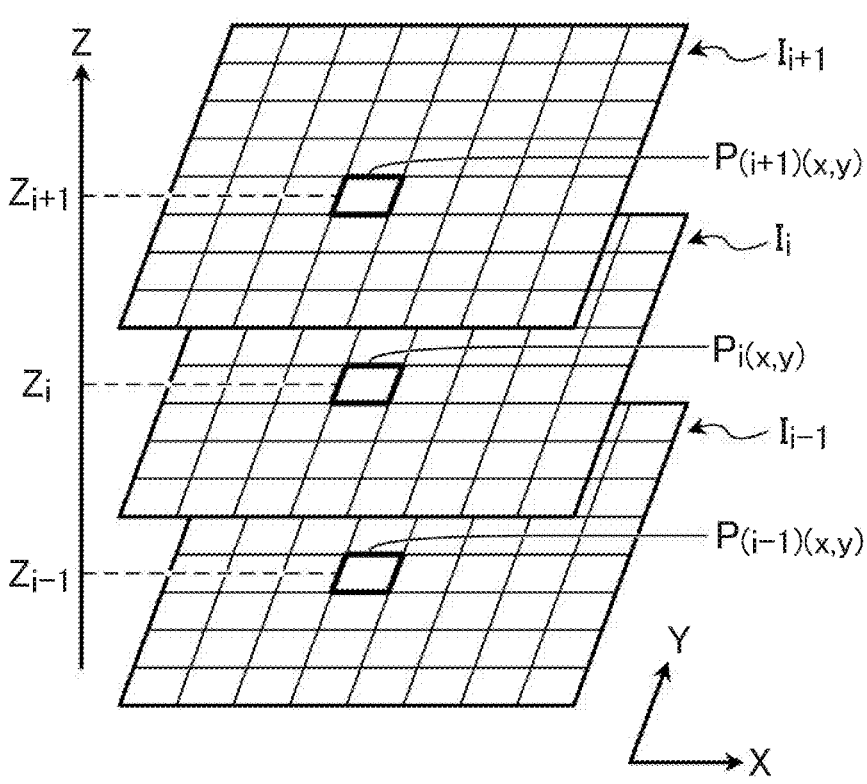
FIGS. 24A and 24B are views for explaining a calculation example of a longitudinal contrast parameter.

In a case where the longitudinal contrast parameter is calculated, a difference $Ct_{i(x, y)}$ in luminance between the pixel (x, y) in the image I*i* and each of pixels at the same position in previous and subsequent images $I_{i-1}$, $I_{i+1}$ in the Z direction illustrated in FIG. 24A is calculated.

Figure 24B:
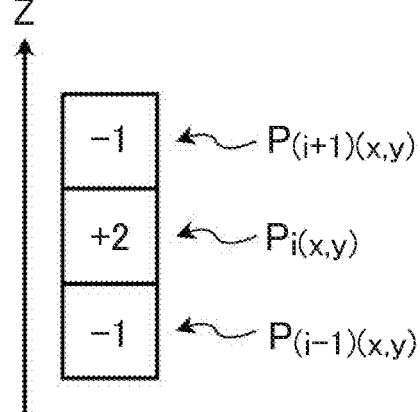

Specifically, $Ct_{i(x, y)}$ may be obtained by multiplying the luminance value $P_{i(x, y)}$ of the pixel (x, y) and its adjacent pixels by a kernel (coefficient) shown in FIG. 24B. In a case where the kernel (coefficient) indicated in FIG. 24B is applied, $Ct_{i(x, y)}$ may be expressed with the following expression (2).

$$Ct_{i(x,y)} = |2 \times P_{i(x,y)} - P_{(i-1)(x,y)} - P_{(i+1)(x,y)}| \qquad (2)$$

Note that a way of selecting adjacent pixels illustrated in FIGS. 23A and 24B, and the kernels shown in FIGS. 23B and 24B are one example, and a method for calculating the parameter is not limited to the example. For example, a way of selecting adjacent pixels or a kernel may be changed for pixels at end parts in the X and the Y directions or for pixels at an end parts in the Z direction.

FIG. 25 is a view illustrating a calculation example of the lateral contrast parameter $Cp_{i(x, y)}$. For example, as illustrated in FIG. 25, when $Cp_{i(x, y)}$ is calculated, luminance values of a pixel of interest (x, y) and its adjacent pixels ((x−1, y−1), (x−1, y), (x−1, y+1), (x, y−1), (x, y+1), (x+1, y−1), (x+1, y) and (x+1, y+1)) are respectively multiplied by the kernel to obtain multiplication results, and then the absolute value of the summation of the multiplication results is set as a contrast value (focusing degree).

The lateral contrast parameter and the longitudinal contrast parameter (Cp and Ct) described above are obtained by performing the above-described calculation for all the pixels or partially extracted pixels within the image Ii. A summation or a median value of the obtained contrast parameters Cp and Ct may be used for calculation of the matching degree parameter.

Then, as described above, the lateral contrast parameters $Cp_1$ to $Cp_N$ and the longitudinal contrast parameters $Ct_1$ to $Ct_N$ are calculated for respective images $I_1$ to $I_N$ to obtain a correlation with the scanning position $Z_i$.

Figure 26:
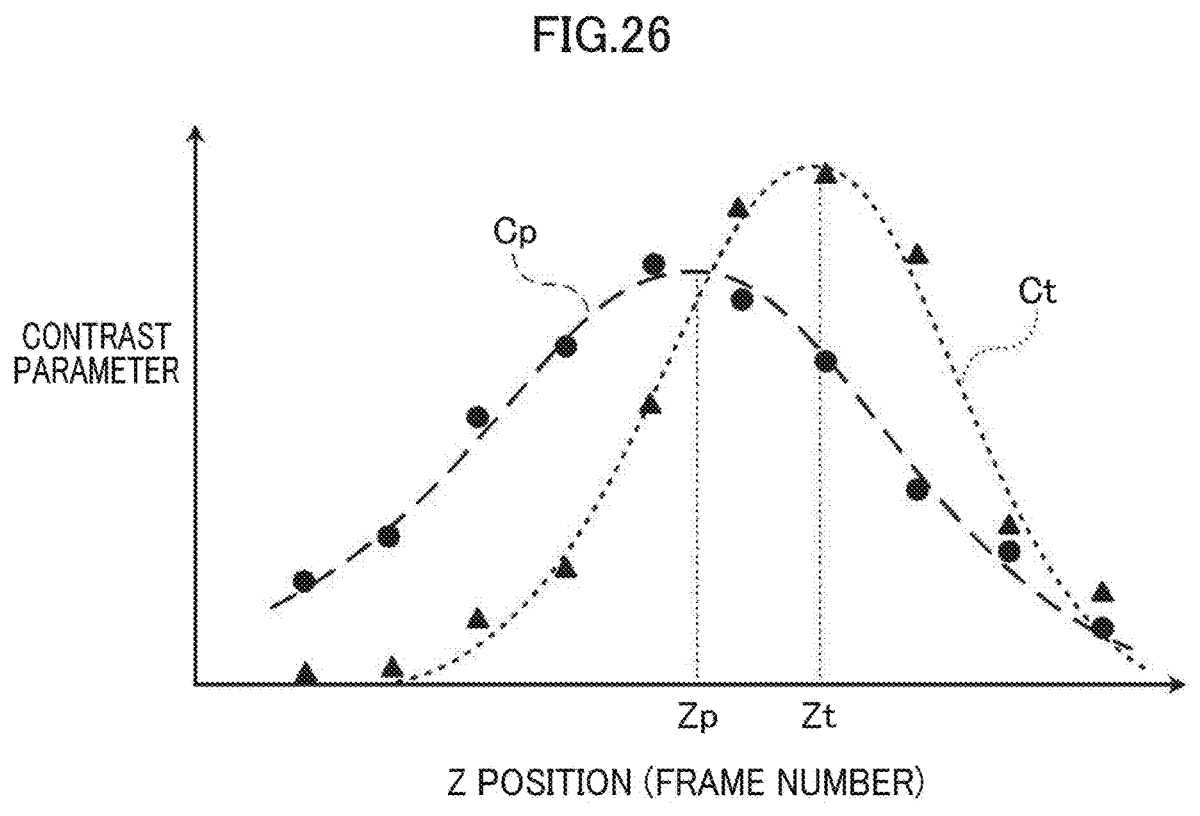

FIG. 26 is a graph showing a relationship between the lateral contrast parameter and the longitudinal contrast parameter, and the scanning position (Z position). In FIG. 26, curves Cp and Ct are respectively approximate curves (for example, curves obtained through least-square approximation or polynomial approximation) of the lateral contrast parameters $Cp_1$ to $Cp_N$ and the longitudinal contrast parameters $Ct_1$ to $Ct_N$.

The matching degree parameter calculating unit 160 calculates a scanning position (Zp, Zt) at which the lateral contrast parameter Cp and the longitudinal contrast parameter Ct respectively become peaks (maximum). Then, the matching degree parameter calculating unit 160 calculates a parameter |Zp−Zt| indicating a degree of match between Zp and Zt as a parameter indicating the matching degree between the focus position and the interference position.

Then, similar measurement is performed while changing the position of the reference surface 24c. Then, the matching degree determining unit 162 calculates a target set position of the reference surface 24c from a relationship between the position of the reference surface 24c and the matching degree parameter.

Figure 27:
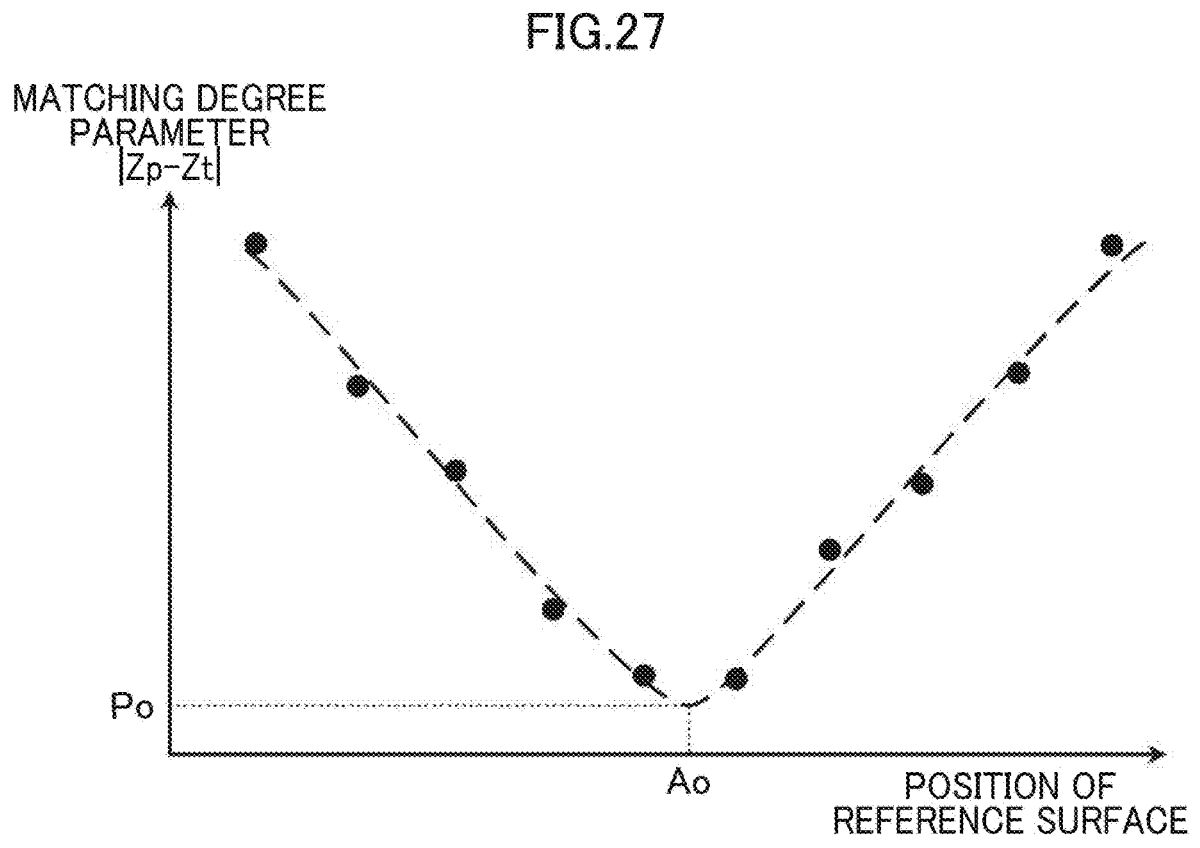

FIG. 27 is a graph showing the relationship between the matching degree parameter and the position of the reference surface. FIG. 27 indicates a value of the matching degree parameter |Zp−Zt| calculated for each position of the reference surface 24c and its approximate curve (for example, a curve obtained through least-square approximation or polynomial approximation).

The matching degree determining unit 162 searches for a position of the reference surface 24c at which the value of the matching degree parameter |Zp−Zt| becomes the minimum and employs the position as the specified target set position Ao of the reference surface.

While in the present embodiment, an absolute value of a difference |Zp−Zt| is employed as the matching degree parameter, the present invention is not limited to this. For example, a square of the difference (Zp−Zt), or any parameter indicating a degree of match between Zp and Zt such as {min (Zp, Zt)/max (Zp, Zt)} or [1−{min (Zp, Zt)/max (Zp, Zt)}] may be employed as the matching degree parameter. Note that in a case where a square of the difference (Zp−Zt) is employed as the matching degree parameter, a position of the reference surface 24c at which the matching degree parameter becomes the minimum may be set as the target set position. In a case where {min (Zp, Zt)/max (Zp, Zt)} is employed as the matching degree parameter, a position of the reference surface 24c at which the matching degree parameter becomes the closest to I may be set as the target set position. Further, in a case where [1−{min (Zp, Zt)/max (Zp, Zt)}] is employed as the matching degree parameter, a position of the reference surface 24c at which the matching degree parameter becomes the closest to 0 may be set as the target set position.

(Timing for Confirming Matching Degree)

Note that as a timing (time condition) for confirming the matching degree using the master M, the following examples may be considered.

(a) Confirmation is performed in a case where the number of times that measurement of the measurement target W is executed exceeds a fixed value. In this case, it is possible to limit a maximum number of times of measurement of the measurement target W executed in a poor adjustment state by limiting the number of times that measurement is executed.

(b) Confirmation is performed after a fixed period or a fixed number of days has elapsed. In this case, even in a case where measurement of the measurement target W is executed in a poor adjustment state, it is possible to specify the measurement target W and measurement data measured in the poor adjustment state by measurement date, or the like. This makes it possible to easily trace the measurement data measured in the poor adjustment state, so that it is possible to perform measurement again.

(c) Confirmation is performed when a batch (such as, for example, a lot) of measurement is started. In this case, the measurement target W for which measurement is executed in a poor adjustment state is limited in the batch. This makes it possible to easily trace measurement data measured in the poor adjustment state, so that it is possible to perform measurement again.

Note that the timing for performing confirmation is not limited to the examples described above. The shape measuring device 1G may be configured such that the operator may select or set one of (a) to (c) described above, or a combination of (a) to (c).

[Adjustment Method for Shape Measuring Device]

Figure 28:
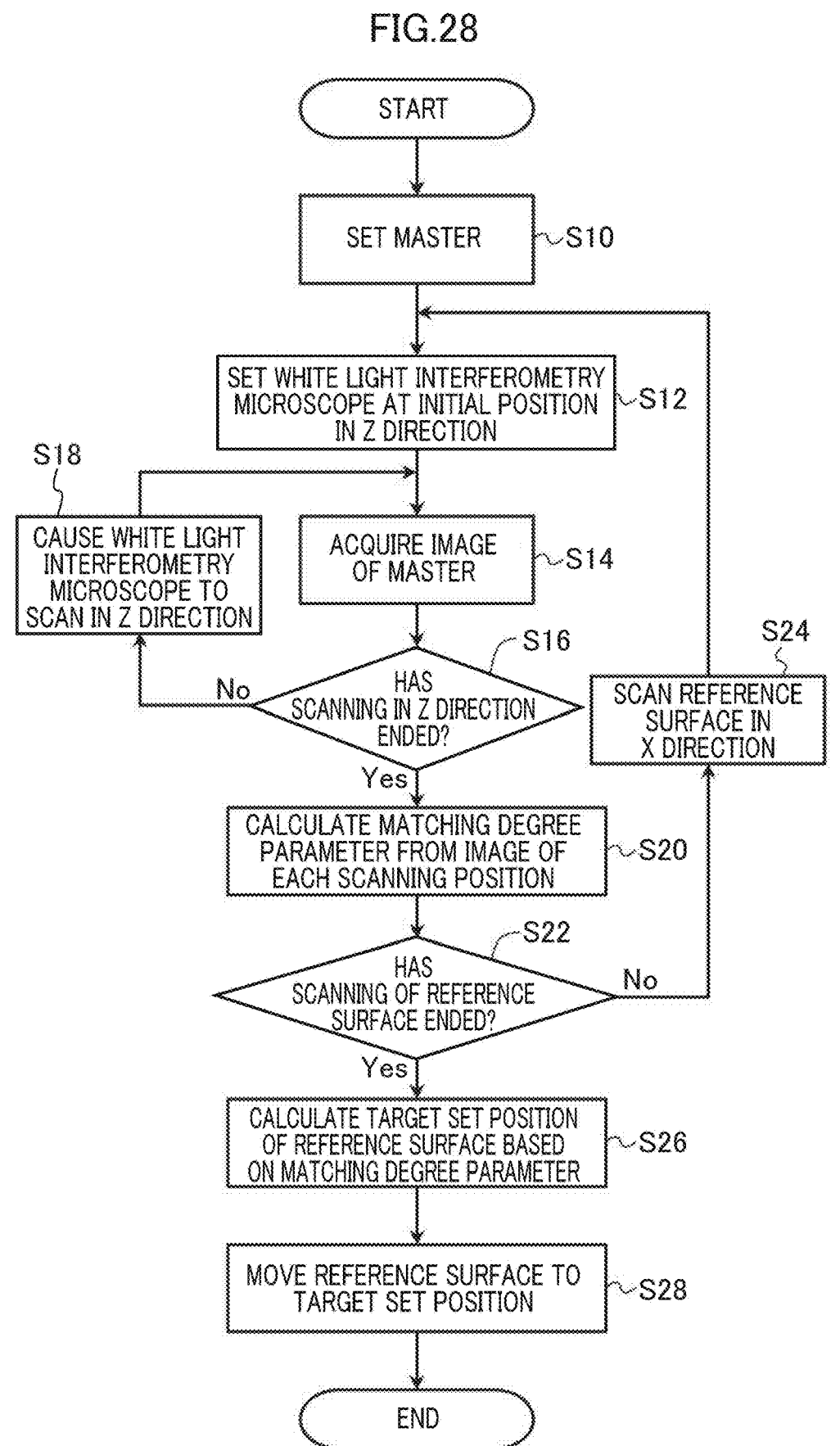
FIG. 28 is a flowchart showing an adjustment method for the shape measuring device according to the third embodiment of the present invention.

FIG. 28 is a flowchart showing an adjustment method for the shape measuring device according to the third embodiment of the present invention.

First, the master M is set on the stage ST of the white light interferometry microscope 10G (step S10), and the white light interferometry microscope 10G is set at an initial position in the Z direction by the drive mechanism 12 (step S12).

Then, acquisition of the image of the master M (step S14) and scanning of the white light interferometry microscope 10G in the Z direction (step S18) are repeated. When scanning in the Z direction is completed (step S16: Yes), the matching degree parameter is calculated from the images $I_i$ of respective scanning positions $Z_i$ (step S20).

Then, the reference surface 24c is caused to scan in the X direction (step S24), and the processing from step S12 to S20 is repeated. When scanning of the reference surface 24c is completed (step S22: Yes), the target set position Ao of the reference surface 24c is calculated based on the matching degree parameter (see FIG. 27) (step S26). Then, the reference surface 24c is moved to the target set position Ao, and adjustment of the shape measuring device 1G ends.

According to the present embodiment, the target set position of the reference surface 24c may be numerically calculated, so that the position of the reference surface 24c may be adjusted with high accuracy. Further, reproducibility of adjustment of the position of the reference surface 24c may be improved without depending on an individual difference or criterion of the operator.

Example 3-1

A distance difference between a peak position Zp (indicating the focus position) at which the lateral contrast parameter Cp becomes a peak value and a peak position Zt (indicating the interference position) at which the longitudinal contrast parameter Ct becomes a peak value indicated in FIG. 27 indicates an optical path difference between the measurement light path length D1 and the reference light path length D2.

The reference surface 24c may be set at the target set position Ao by moving the reference surface 24c by an amount corresponding to (Zp-Zt).

According to Example 3-1, there is no need to perform contrast measurement (loop from step S22 to step S24) while changing the position of the reference surface 24c, so that it is possible to adjust the shape measuring device 1G in a shorter period, which contributes to improvement in efficiency of the device.

Example 3-2

Figure 29:
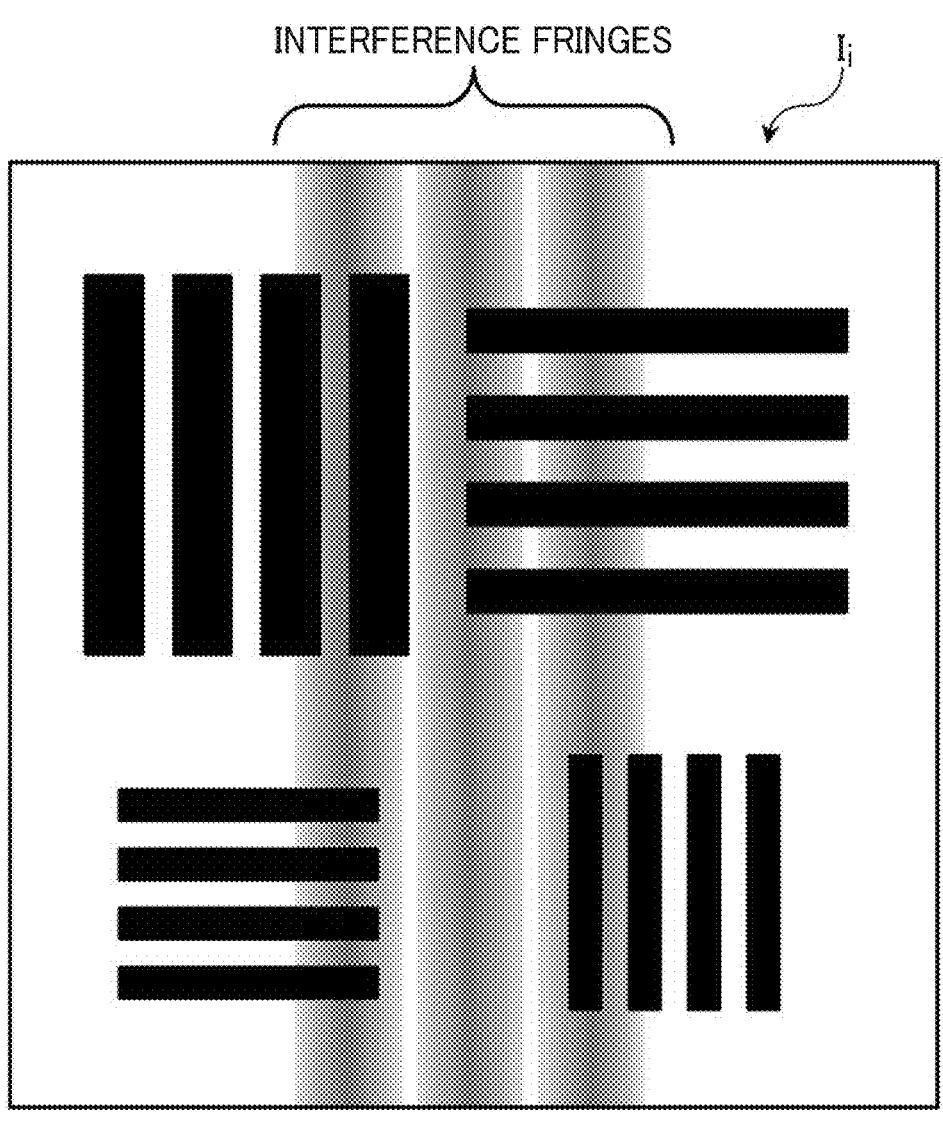
FIG. 29 is a view illustrating an example of interference fringes.
Figure 30:
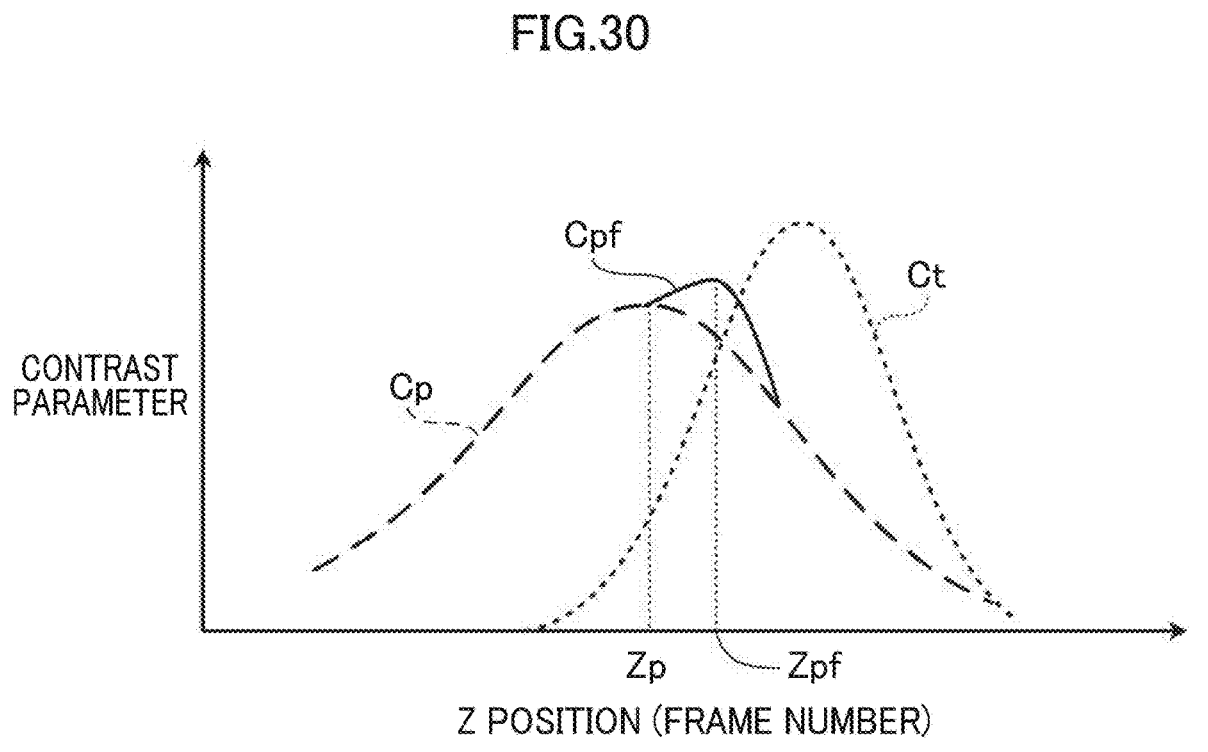

In a case where the interference position is close to the focus position (for example, in a case of displacement within a range of a depth of focus), when the lateral contrast parameter Cp is calculated, interference fringes are generated in the screen of the camera 28 as illustrated in FIG. 29. The interference fringes negatively affect calculation of the lateral contrast parameter Cp and cause a problem of decrease in calculation accuracy of Zp that indicates the focus position as illustrated in FIG. 30. In FIG. 30, a shape of the lateral contrast parameter Cp distorts as indicated with Cpf, and the peak position is displaced from Zp to Zpf. Particularly, in a case where the master M is installed in an inclined state by an angle of some degrees, light and dark parts are more likely to occur in the screen of the camera 28 due to the interference fringes.

In Example 3-2, when the lateral contrast parameter Cp is calculated, processing of excluding pixels at which the luminance is around the maximum value or around the minimum value of the camera 28 from calculation of the lateral contrast parameter Cp is performed. For example, in a case where resolution of each pixel is 8 bits (0 to 255), calculation is not performed for pixels at which luminance is around 0 (for example, 0 to 9) or around 255 (for example, 246 to 255), and values calculated for pixels at which luminance is not in the ranges are utilized.

According to Example 3-2, influence of halation (over exposure) and black crushing (under exposure) that cause degradation of accuracy in calculation of the lateral contrast parameter may be eliminated, so that it is possible to calculate a peak of the lateral contrast with higher accuracy. This can increase accuracy and reliability of the measurement result of the three-dimensional shape of the shape measuring device 1G.

Example 3-3

Figures 31A, 31B:
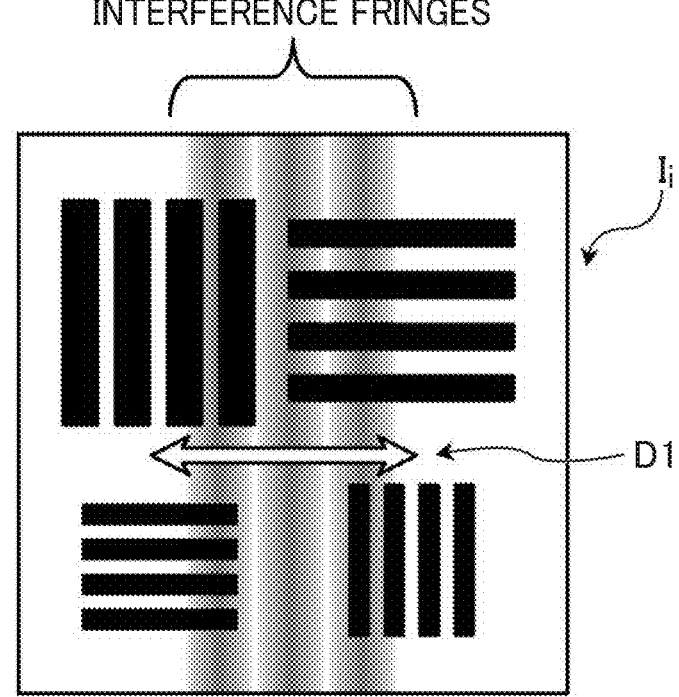
FIGS. 31A and 31B are views illustrating an installation form of a master according to Example 3-3.

In Example 3-3, as illustrated in FIG. 31B, the master M is installed so as to be inclined in a specific direction with respect to a measurement optical axis AX. Here, an inclination amount of the master M is preferably set, for example so that interference fringes are generated in one field of view. If a range of the field of view is set at 1 mm angle, a height becomes 0.55 μm (about the wavelength) with respect to 1 mm. In this case, the inclination angle φ illustrated in FIG. 31A becomes φ=arctan (0.55 μm/1 mm). Note that the range of the field of view differs depending on a magnification of the objective lens.

Then, as illustrated in FIG. 31A, lateral contrast is calculated in a direction perpendicular to a direction D1 in which the light and dark pattern of the interference fringes is generated.

Here, it is assumed in FIGS. 31A and 31B that the direction D1 in which the light and dark pattern of the interference fringes is generated is the X direction. In this case, for example, the lateral contrast parameter Cp is calculated using the kernel indicated in FIG. 32. In the kernel indicated in FIG. 32, a coefficient for a pixel adjacent in the X direction with respect to the central pixel of interest is 0. Use of such a kernel enables calculation of the lateral contrast in a direction perpendicular to the direction D1 in which the light and dark pattern of the interference fringes is generated.

According to Example 3-3, influence of contrast occurring by the interference fringes may be suppressed, so that it is possible to calculate a peak of the lateral contrast with higher accuracy.

Modification 3-1

Figure 33:
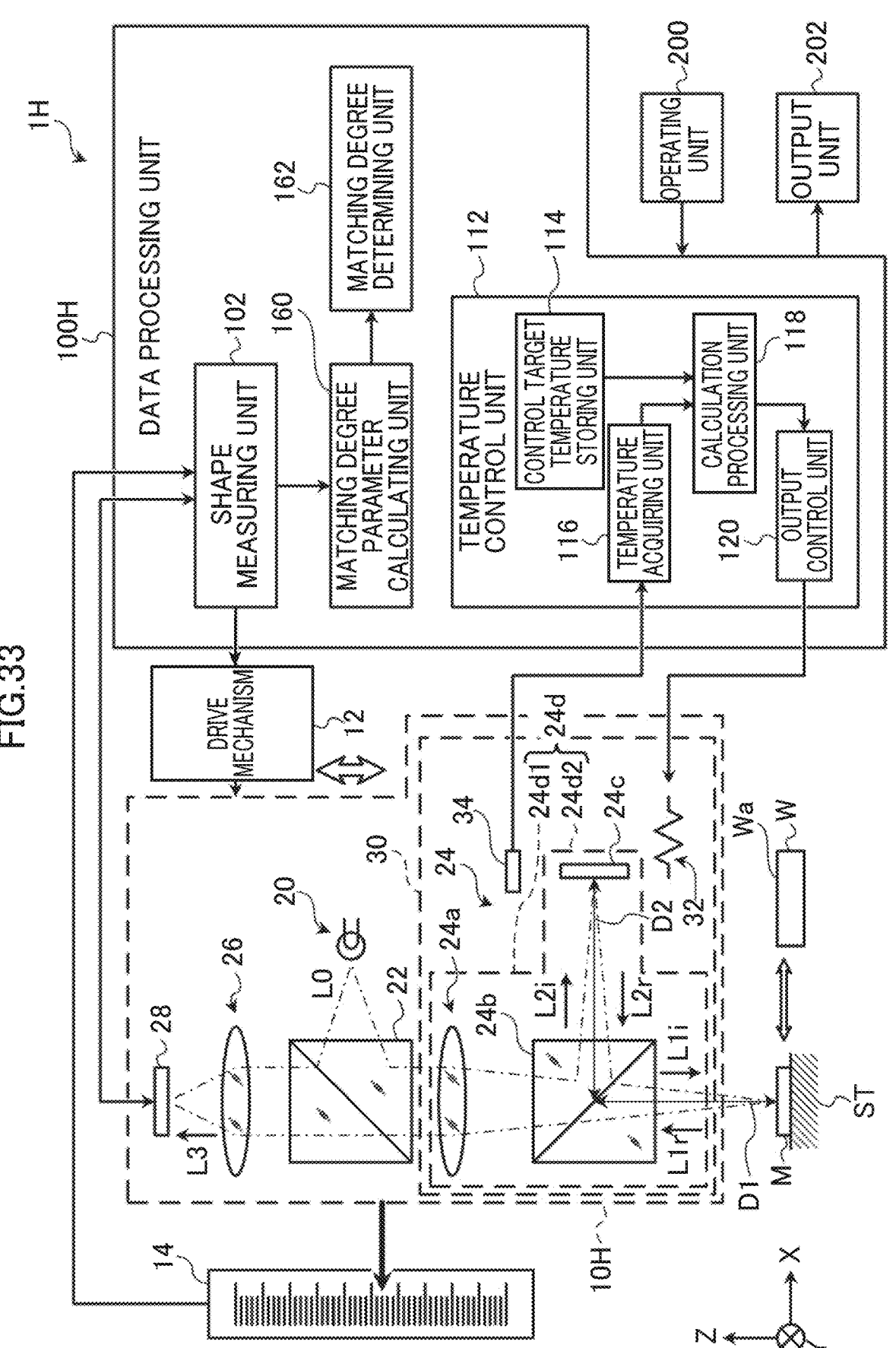
FIG. 33 is a view illustrating a shape measuring device according to Modification 3-1.
Figure 35A:
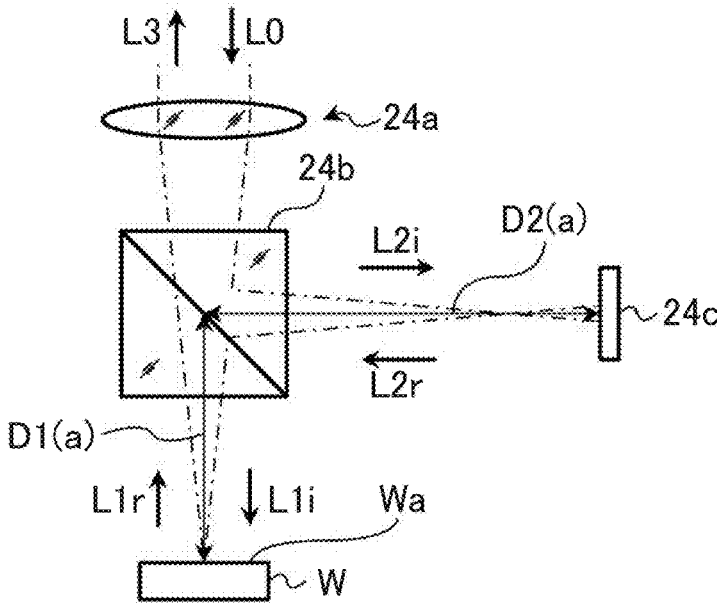
FIGS. 35A and 35B are views illustrating an example of a white light interferometry microscope.
Figure 35B:
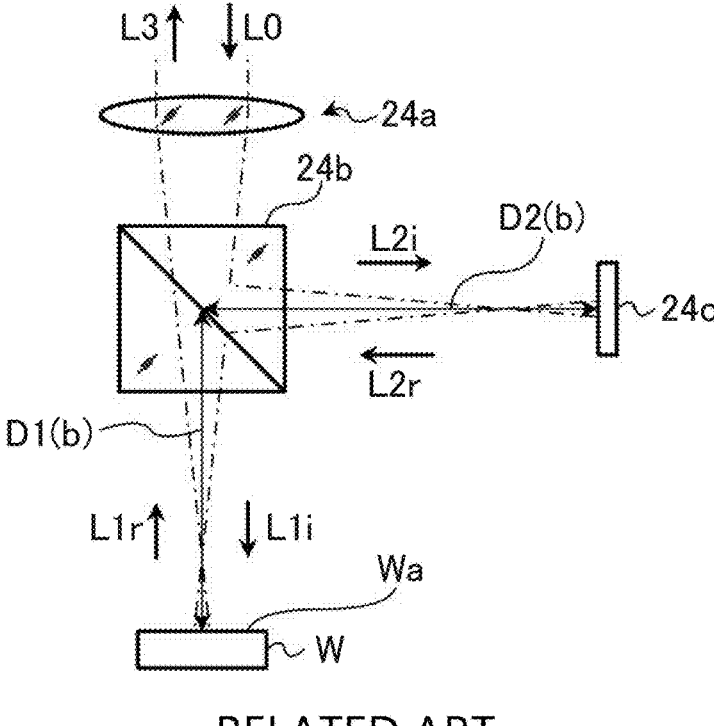

FIG. 33 is a view illustrating a shape measuring device according to Modification 3-1.

As illustrated in FIG. 33, a shape measuring device 1H according to Modification 3-1 adjusts the position of the reference surface 24c using the temperature controller (the temperature sensor 34 and the temperature control unit 112).

As illustrated in FIG. 33, in a white light interferometry microscope 10H of the shape measuring device 1H, the interference objective lens 24 includes the holder 24d.

The holder 24d is formed of a metal material like, for example, brass, that is, a material that reversibly thermally deforms. The holder 24d includes the lens barrel 24d1 and the reference surface storing part 24d2. The lens barrel 24d1 is formed in a cylindrical shape extending in the Z direction. The lens barrel 24d1 stores (holds) the objective lens 24a and the beam splitter 24b. The reference surface storing part 24d2 is formed in a cylindrical shape extending in the X direction from a position at which the beam splitter 24b is held in the lens barrel 24d1. The reference surface storing part 24d2 stores the reference surface 24c.

The temperature adjusting unit 32 is provided in the vicinity of the reference surface storing part 24d2. The temperature adjusting unit 32 adjusts at least the temperature between the beam splitter 24b and the reference surface 24c, that is, the temperature of the reference surface storing part 24d2 under control of the temperature control unit 112. As the temperature adjusting unit 32, for example, a heater, a Peltier element, or the like, is used.

The reference surface storing part 24d2 is formed of a material that reversibly thermally deforms, and thus, reversibly thermally deforms (expands, shrinks) in accordance with temperature change. By this means, it is possible to thermally deform the reference surface storing part 24d2 according to the temperature of the reference surface storing part 24d2 changed by the temperature adjusting unit 32, thereby adjusting the position of the reference surface 24c in the X direction in accordance with the thermal deformation.

The temperature sensor 34 corresponds to a temperature measuring unit of the present invention. The temperature sensor 34, which is provided in the vicinity of the reference surface storing part 24d2, measures a temperature of at least the reference surface storing part 24d2 (between the beam splitter 24b and the reference surface 24c) in the holder 24d and outputs the temperature measurement result to the temperature acquiring unit 116 of the temperature control unit 112. The measurement result of the temperature sensor 34 is utilized for controlling the temperature adjusting unit 32 by the temperature control unit 112.

The heat insulating material 30 is provided to cover the whole of the interference objective lens 24, the temperature adjusting unit 32 and the temperature sensor 34. This prevents the temperature inside the heat insulating material 30, particularly, the temperature of the reference surface storing part 24d2 and in the vicinity of the reference surface storing part 24d2 from changing by being affected by outside.

As illustrated in FIG. 33, the temperature control unit 112 of the data processing unit 100H includes the control target temperature storing unit 114, the temperature acquiring unit 116, the calculation processing unit 118 and the output control unit 120.

The control target temperature storing unit 114 stores a look-up table LUT indicating a correspondence relationship between the temperature inside the holder 24d (for example, the temperature of the reference surface storing part 24d2, the temperature between the beam splitter 24b and the reference surface 24c) and the position of the reference surface 24c (position in the X direction).

The calculation processing unit 118 calculates an output of the temperature adjusting unit 32 necessary for moving the reference surface 24c to the target set position with reference to the LUT stored in the control target temperature storing unit 114. Specifically, the calculation processing unit 118 reads out the temperature inside the holder 24d (control target temperature) corresponding to the target set position of the reference surface 24c from the LUT and calculates an output of the temperature adjusting unit 32 for adjusting the temperature inside the holder 24d to the control target temperature.

The output control unit 120 controls the output of the temperature adjusting unit 32 based on the calculation result by the calculation processing unit 118 to adjust the temperature inside the holder 24d to the control target temperature. Here, the temperature inside the holder 24d may be controlled by, for example, feedback control, proportional-integral-differential controller (PID control), or the like.

According to Modification 3-1, the position of the reference surface 24c may be managed using a numerical value of the temperature, so that it is possible to perform adjustment with higher accuracy, higher resolution and higher reproducibility.

Modification 3-2

Figure 34:
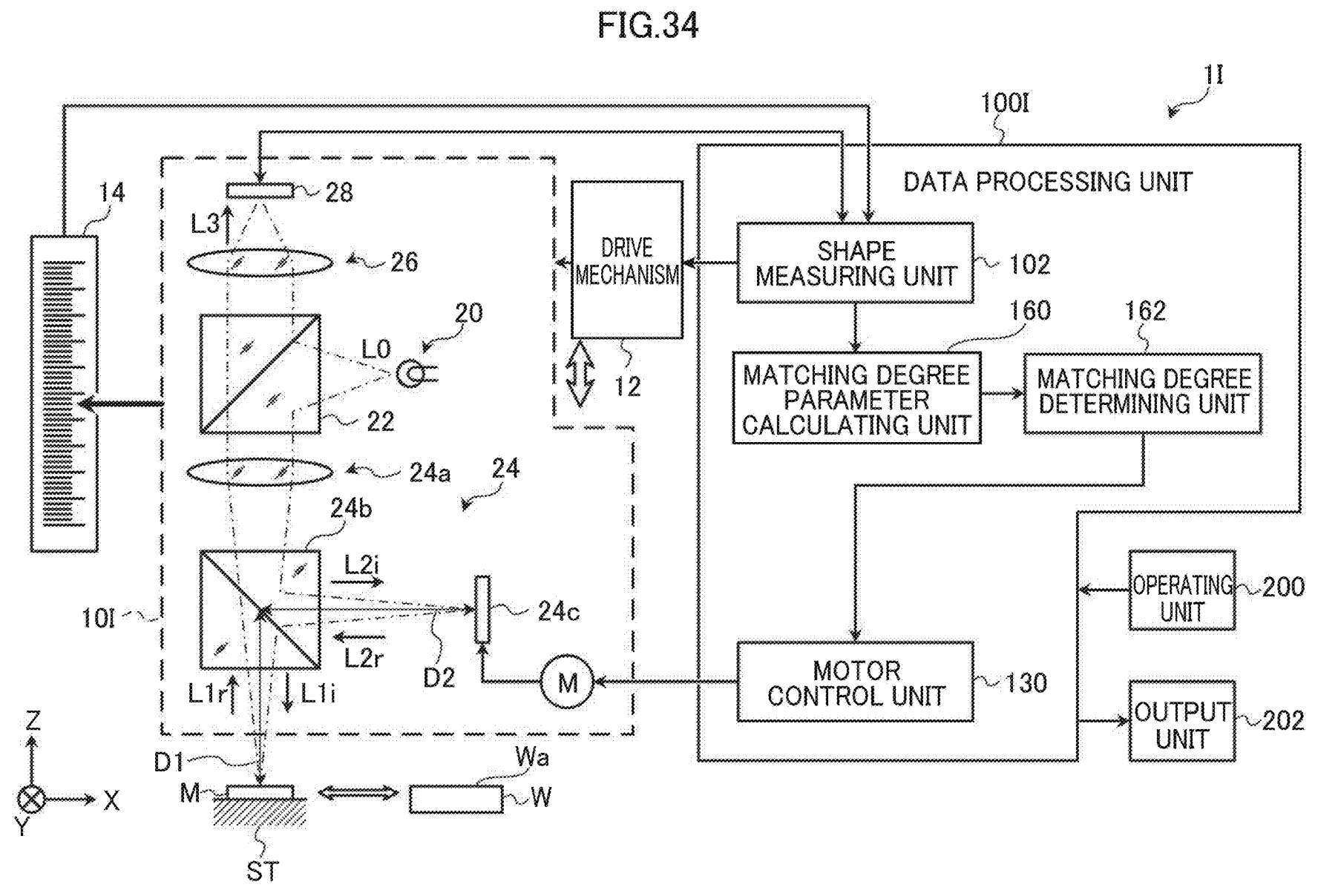

FIG. 34 is a view illustrating a shape measuring device according to Modification 3-2.

As illustrated in FIG. 34, a shape measuring device 1I according to Modification 3-2 adjusts the position of the reference surface 24c in a white light interferometry microscope 10I using a linear motion mechanism using the motor M.

The motor control unit 130 of the data processing unit 100I acquires the position of the reference surface 24c in the X direction and controls (feedback control, PID control) a rotation amount of the motor M to move the reference surface 24c to the target set position.

According to Modification 3-2, the position of the reference surface 24c may be controlled using the motor M, so that it is possible to perform adjustment with higher accuracy, higher resolution and higher reproducibility.

Note that while in Modification 3-2, the linear motion mechanism using the motor M is employed, the present invention is not limited to this. For example, a linear motion mechanism using an actuator such as a piezoelectric element may be also employed.

REFERENCE SIGNS LIST 1, 1A, 1B, 1C, ID, 1E, 1F, 1G, 1H, 1I . . . Shape measuring device, 10, 10A, 10B, 10C, 10D, 10E, 10F, 10G, 10H, 10I . . . White light interferometry microscope, 12 . . . Drive mechanism, 14 . . . Scale, 16 . . . Switching mechanism, 20 . . . Light source unit, 22 . . . Beam splitter, 24 . . . Interference objective lens, 24a . . . Objective lens, 24b . . . Beam splitter, 24c . . . Reference surface, 24d . . . Holder, 26 . . . Imaging lens, 28 . . . Camera, 30 . . . Heat insulating material, 32 . . . Temperature adjusting unit, 34 . . . Temperature sensor, 100, 100A, 100B, 100C, 100D, 100E, 100F, 100G, 100H, 100I . . . Data processing unit, 102 . . . Shape measuring unit, 104, 160 . . . Matching degree parameter calculating unit, 106 . . . Adjustment matching degree parameter storing unit, 108 . . . Matching degree comparing unit, 110 . . . Abnormality notifying unit, 112 . . . Temperature control unit, 114 . . . Control target temperature storing unit, 116 . . . Temperature acquiring unit, 118 . . . Calculation processing unit, 120 . . . Output control unit, 130 . . . Motor control unit, 140 . . . Switching control unit, 150 . . . Roughness parameter calculating unit, 152, 162 . . . Matching degree determining unit, 200 . . . Operating unit, 202 . . . Output unit

What is claimed is:

1. An adjustment method for a shape measuring device that radiates light from a light source to a master for adjustment and a reference surface respectively as measurement light and reference light and measures a shape of a surface to be measured of a measurement target using multiplexed light of the measurement light and the reference light respectively reflected by the master for adjustment and the reference surface, the adjustment method comprising:

measuring the master for adjustment in an adjusted state in which a focus position matches an interference position, and calculating and storing a matching degree parameter indicating a matching degree between the focus position and the interference position as an adjustment matching degree parameter;

in a case where the measurement target is measured, measuring the master for adjustment, calculating the matching degree parameter and comparing the matching degree parameter with the adjustment matching degree parameter, to confirm the matching degree; and in a case where only a relative value of a position of the reference surface is known, readjusting the matching degree based on a correlation between the matching degree parameter and the position of the reference surface, and matching degree parameters calculated at at least two positions of the reference surface.

2. The adjustment method for a shape measuring device according to claim 1, comprising:

notifying an abnormality in a case where the matching degree parameter is equal to or less than a threshold set based on the adjustment matching degree parameter.

3. The adjustment method for a shape measuring device according to claim 1, comprising:

stopping the shape measuring device in a case where the matching degree parameter is equal to or less than a threshold set based on the adjustment matching degree parameter.

4. The adjustment method for a shape measuring device according claim 1, comprising:

calculating the matching degree parameter based on a measurement result of the master for adjustment for each position of the reference surface; and moving the reference surface to a position at which the matching degree parameter becomes maximum.

5. An adjustment method for a shape measuring device that radiates light from a light source to a master for adjustment and a reference surface respectively as measurement light and reference light and measures a shape of a surface to be measured of a measurement target using multiplexed light of the measurement light and the reference light respectively reflected by the master for adjustment and the reference surface, the adjustment method comprising:

measuring the master for adjustment to calculate a roughness parameter;

moving the refence surface to a position at which the roughness parameter becomes maximum; and detecting an optical axis displacement in two directions perpendicular to each other, based on a result of measurement performed using as the master for adjustment, a master having a pattern in which an identical pattern is repeated in a direction in a range that covers a range of a field of view of an objective lens which emits a measurement light, and a result of measurement further performed in a state where the master is rotated by 90 degrees.

6. The adjustment method for a shape measuring device according to claim 5, wherein a reference surface storing part that stores the reference surface is formed of a material that reversibly thermally deforms, and the reference surface is moved by controlling a temperature of the reference surface storing part.

7. The adjustment method for a shape measuring device according to claim 5, wherein the reference surface is moved by a linear motion mechanism.

8. The adjustment method for a shape measuring device according to claim 5, comprising:

acquiring a relationship between the roughness parameter and a position of the reference surface; and calculating the roughness parameter for each of one or more positions of the reference surface and calculating a position at which the roughness parameter becomes maximum based on the relationship between the roughness parameter and the position of the reference surface.

9. The adjustment method for a shape measuring device according to claim 5, wherein a master having a pattern in which an identical pattern is repeated in a range that covers a range of a field of view of an objective lens is used as the master for adjustment.

10. An adjustment method for a shape measuring device that radiates light from a light source to a master for adjustment and a reference surface respectively as measurement light and reference light and measures a shape of a surface to be measured of a measurement target using multiplexed light of the measurement light and the reference light respectively reflected by the master for adjustment and the reference surface, the adjustment method comprising:

measuring the master for adjustment to calculate a roughness parameter;

moving the refence surface to a position at which the roughness parameter becomes maximum; and detecting an optical axis displacement in two directions different from each other, based on a result of measurement performed using as the master for adjustment, a master having a pattern in which an identical pattern is repeated in two directions different from each other, in a range that covers a range of a field of view of an objective lens which emits a measurement light.

11. The adjustment method for a shape measuring device according to claim 10, wherein a reference surface storing part that stores the reference surface is formed of a material that reversibly thermally deforms, and the reference surface is moved by controlling a temperature of the reference surface storing part.

12. The adjustment method for a shape measuring device according to claim 10, wherein the reference surface is moved by a linear motion mechanism.

13. The adjustment method for a shape measuring device according to claim 10, comprising:

acquiring a relationship between the roughness parameter and a position of the reference surface; and calculating the roughness parameter for each of one or more positions of the reference surface and calculating a position at which the roughness parameter becomes maximum based on the relationship between the roughness parameter and the position of the reference surface.

14. The adjustment method for a shape measuring device according to claim 10, wherein a master having a pattern in which an identical pattern is repeated in a range that covers a range of a field of view of an objective lens is used as the master for adjustment.

15. An adjustment method for a shape measuring device that radiates light from a light source to a master for adjustment and a reference surface respectively as measurement light and reference light and measures a shape of a surface to be measured of a measurement target using multiplexed light of the measurement light and the reference light respectively reflected by the master for adjustment and the reference surface, the adjustment method comprising:

acquiring an image of the master for adjustment for each of scanning positions along a scanning direction perpendicular to the master for adjustment and calculating a matching degree parameter indicating a matching degree between a focus position and an interference position from the image for each of the scanning positions; and calculating a target set position of the reference surface based on the matching degree parameter.

16. The adjustment method for a shape measuring device according to claim 15, wherein the matching degree parameter is calculated based on:

a first parameter that is a difference in luminance along a direction on a plane of pixels included in the image of the master for adjustment, for each of the scanning positions; and a second parameter that is a difference in luminance along the scanning direction for each of the scanning positions.

17. The adjustment method for a shape measuring device according to claim 15, comprising:

calculating the matching degree parameter for each position of the reference surface; and calculating the target set position of the reference surface based on the matching degree parameter calculated for each position of the reference surface.

18. The adjustment method for a shape measuring device according to claim 16, wherein the target set position of the reference surface is set at a position of the reference surface moved by an amount corresponding to a difference between a peak value of the first parameter and a peak value of the second parameter, from a position of the reference surface at a time when the image used for calculation of the matching degree parameter is acquired.

19. An adjustment method for a shape measuring device that radiates light from a light source to a master for adjustment and a reference surface respectively as measurement light and reference light and measures a shape of a surface to be measured of a measurement target using multiplexed light of the measurement light and the reference light respectively reflected by the master for adjustment and the reference surface, the adjustment method comprising:

measuring the master for adjustment in an adjusted state in which a focus position matches an interference position, and calculating and storing a matching degree parameter indicating a matching degree between the focus position and the interference position as an adjustment matching degree parameter;

in a case where the measurement target is measured, measuring the master for adjustment, calculating the matching degree parameter and comparing the matching degree parameter with the adjustment matching degree parameter, to confirm the matching degree; and in a case where only an absolute value of a position of the reference surface is known, readjusting the matching degree based on a polarity of a correlation between the matching degree parameter and the position of the reference surface, and a matching degree parameter calculated at one position of the reference surface.

* * * * *